United States Patent [19]
Goto et al.

[11] Patent Number: 5,434,810
[45] Date of Patent: Jul. 18, 1995

[54] BINARY OPERATOR USING BLOCK SELECT LOOK AHEAD SYSTEM WHICH SERVES AS PARALLEL ADDER/SUBTRACTER ABLE TO GREATLY REDUCE THE NUMBER OF ELEMENTS OF CIRCUIT WITH OUT SACRIFICE TO HIGH SPEED OF COMPUTATION

[75] Inventors: Gensuke Goto, Ebina; Hajime Kubosawa, Machida, both of Japan

[73] Assignee: Fujitsu Limited, Kanagawa, Japan

[21] Appl. No.: 883,247

[22] Filed: May 7, 1992

Related U.S. Application Data

[63] Continuation of Ser. No. 684,460, Apr. 11, 1991, abandoned, which is a continuation of Ser. No. 340,241, Apr. 19, 1989.

[30] Foreign Application Priority Data

Apr. 20, 1988 [JP] Japan .................................. 63-097754
May 7, 1988 [JP] Japan .................................. 63-110889

[51] Int. Cl.⁶ .................................................. G06F 7/50
[52] U.S. Cl. ...................................... 364/788; 364/787
[58] Field of Search ................................ 364/788, 787

[56] References Cited

U.S. PATENT DOCUMENTS

| | | | |
|---|---|---|---|
| 3,553,446 | 10/1971 | Kruy ............................. | 364/788 |
| 3,993,891 | 11/1976 | Beck et al. ................... | 364/788 |
| 4,525,797 | 6/1985 | Holden ......................... | 364/788 |
| 4,559,609 | 12/1985 | Robinson, Jr. et al. ...... | 364/784 |
| 4,639,888 | 1/1987 | Nussbaecher ................ | 364/788 |
| 4,761,760 | 8/1988 | Tomoji .......................... | 364/788 |

FOREIGN PATENT DOCUMENTS 60-105041 6/1985 Japan .
61-226836 10/1986 Japan .

OTHER PUBLICATIONS

Bedrig, "Carry -Select Adder" *IRE Trans. on Electronic Computers* Jun., 1962 pp. 340–346 364/788.
Anderson, "Fire-Level Combinations Sum Predict and Carry Propagate Adder" *IBM Tech. Disclosure Bulletin* vol. 14 No. 1 Jun. 1971 pp. 112–113 364/788.
Hwang, K., "Computer Arithmetic Principles, Architecture, and Design", 1979, pp. 78–91, John Wiley and Sons, New York, U.S.
Vabre, J. P., "La retenue anticipee dans les circuits d'addition", *L'Onde Electrique*, vol. 61, No. 1, Jan. 1981, pp. 57–64.
Patent Abstracts of Japan, vol. 9, No. 253 (p. 395), Jun. 10, 1985 for JP-A-60 105 041 (Nippon Denki), Jun. 10, 1985.
F. Okamoto et al "High–Speed CMOS Adder with CLA Organization", 1989 Spring National Convention Record, IEICE, p. 5–239, Mar. 1989.
Kai Hwang, Computer Arithmetic: "Principles, Architecture, and Design", John Wiley & Sons, Inc. (1979) pp. 69–96.

*Primary Examiner*—David M. Malzahr
*Attorney, Agent, or Firm*—Staas & Halsey

[57] ABSTRACT

A binary operator comprises a plurality of carry select adder circuits each including a cumulative carry propagate signal generating means and a cumulative carry generate signal generating means and/or a plurality of block look ahead carry generator circuits each including a cumulative block carry propagate signal and cumulative block carry generate signal generating means and a real carry signal generating means. The carry select adder circuit does not simultaneously generate two presumed sum signals and select and output one of the presumed sum signals, but directly performs operations on a carry propagate signal, a cumulative carry propagate signal and a cumulative carry generate signal which are necessary for generating the presumed sum signal pair and a real carry signal to calculate the real sum signal. The block look ahead carry generator circuit does not simultaneously generate two presumed carry signals and select and output one of the presumed carry signals, but uses a cumulative block carry propagate signal, a cumulative block carry generate signal and a carry signal to directly generate the real carry signal. The number of elements of the binary operator is greatly reduced without sacrificing the high speed of computation since two presumed sum or carry signals are never generated in parallel.

50 Claims, 21 Drawing Sheets

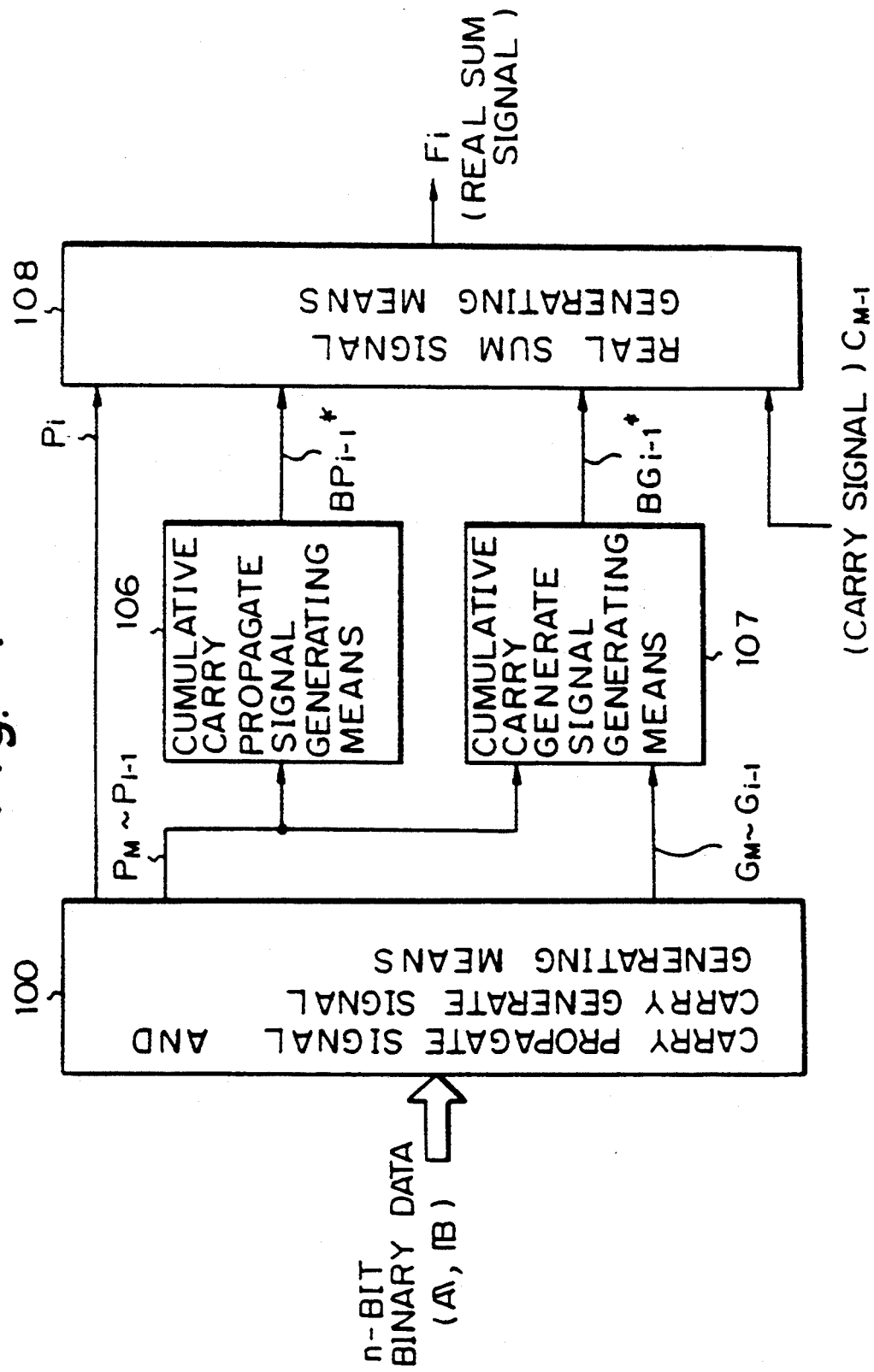

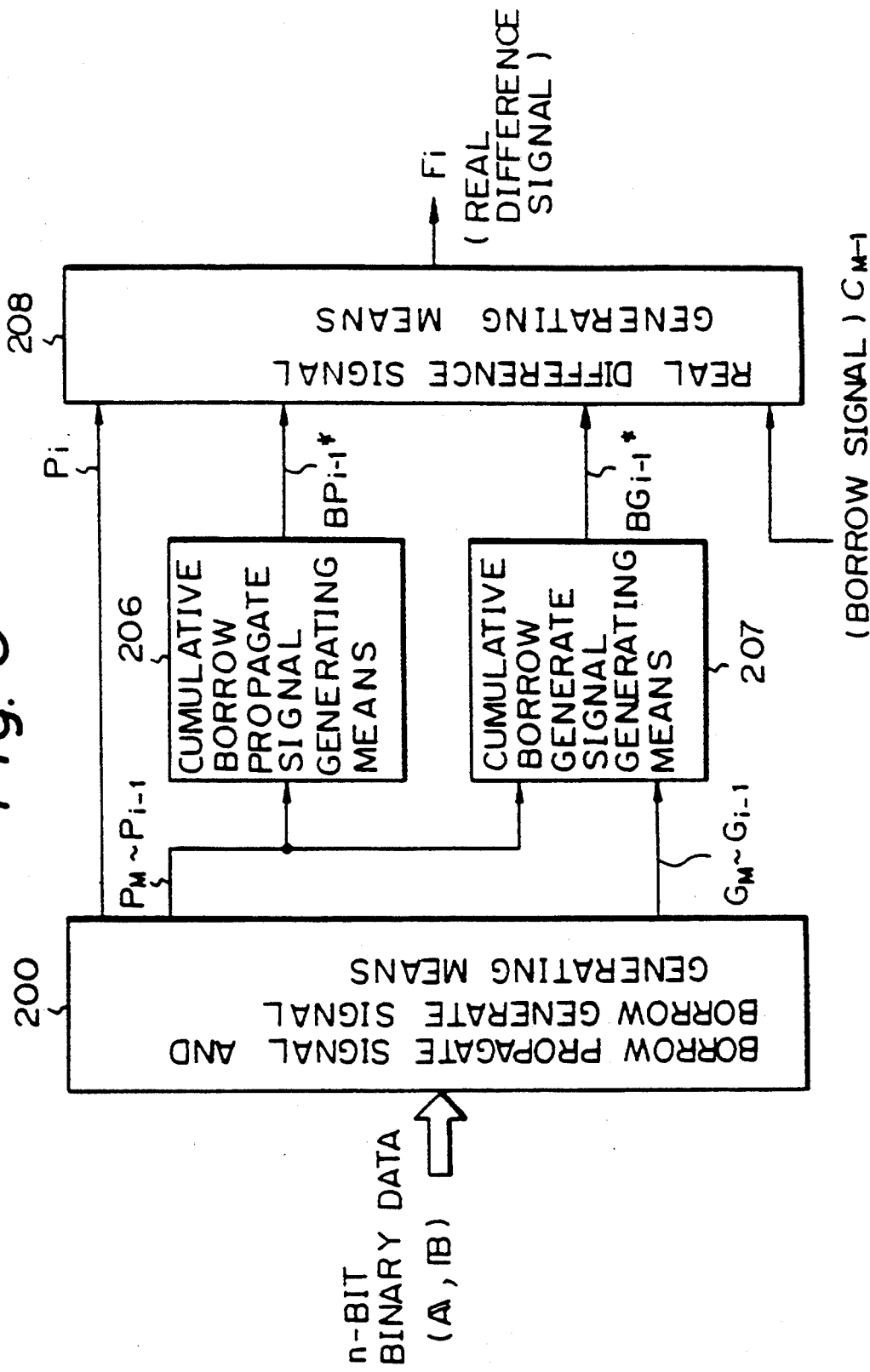

Fig. 7(a)
Fig. 7(b)
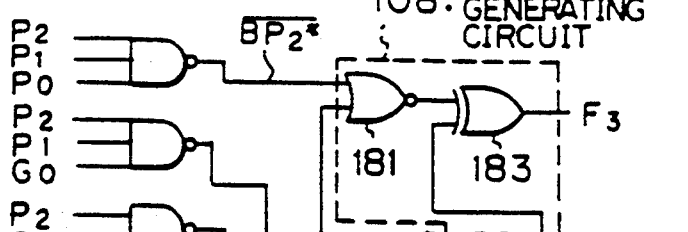
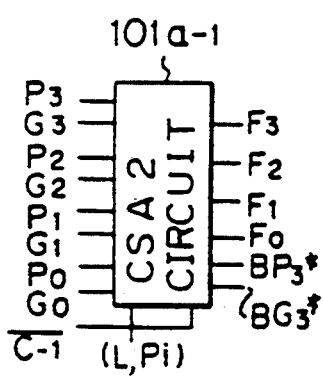
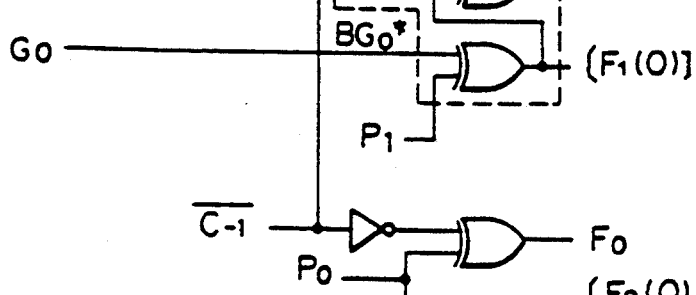

Fig. 13(a)
Fig. 13(b)
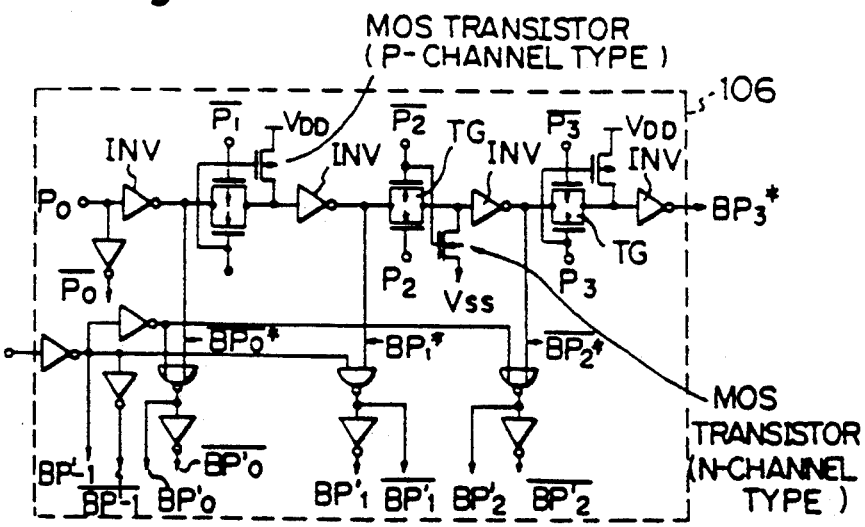
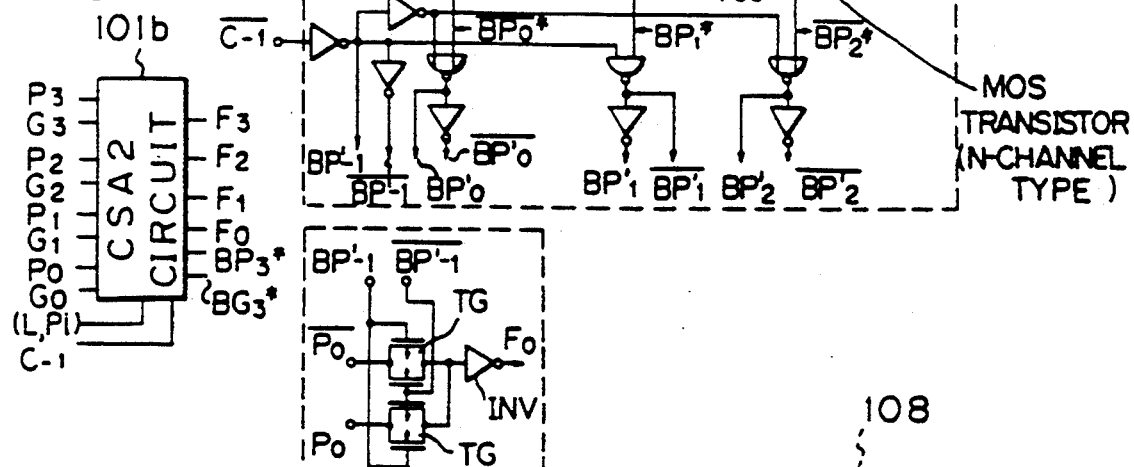
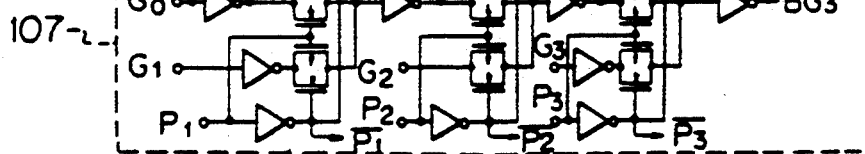

BINARY OPERATOR USING BLOCK SELECT LOOK AHEAD SYSTEM WHICH SERVES AS PARALLEL ADDER/SUBTRACTER ABLE TO GREATLY REDUCE THE NUMBER OF ELEMENTS OF CIRCUIT WITH OUT SACRIFICE TO HIGH SPEED OF COMPUTATION

This application is a continuation of application Ser. No. 07/684,460, filed Apr. 11, 1991, now abandoned, which in turn is a continuation of application Ser. No. 07/340,241, filed Apr. 19, 1989, now abandoned.

BACKGROUND OF THE INVENTION

1. Field of the Invention

The present invention relates to a binary operator, more particularly, to a carry select adder circuit (CSA: including a borrow select subtracter in a parallel full subtracter) and a block look ahead carry generator circuit (BLACG: including a block look ahead borrow generator circuit in a parallel full subtracter) in a parallel full adder.

2. Description of the Related Art

Recently, along with the increase in the amounts of data, a demand has arisen for higher speeds of data processing by operators. As one means for achieving high speed data processing, there is known the carry look ahead (CLA) method. This carry look ahead method attempts to achieve high speed in the speed of addition by looking ahead at the necessary carry operation for each digit in advance. However, according to this carry look ahead method, an increase in the data length is accompanied with an unlimited increase in the operation elements and so is not practical.

On the other hand, as a suitable method for when the data length is particularly long (for example, 32 bits, 64 bits), there is known the carry select adder (CSA) method. According to the carry select adder method, before the data is divided into a plurality of blocks and the real carry signal from the lower block is generated in the adders of the various blocks, a sum signal in the case of assumption of the carry being "0" and a sum signal in the case of assumption of the carry being "1" are respectively generated. At the point of time when the real carry signal coming up from the adder of the lower block is input, selection is made of the presumed sum signal (one of "0" or "1") corresponding to the logic of the real carry signal and that selected presumed sum signal is output as the real sum signal of the block adder.

In the prior art, a binary adder circuit using the block select look ahead system for cutting down on the number of elements of the circuit is shown in Japanese Unexamined Patent Publication (Kokai; JP, A) No. 60-105041. However, the adder circuit of JPA '041 is used for generating a real carry signal, and not generating a real sum signal. Further, the adder circuit does not generate directly by using a cumulative carry propagate signal and a cumulative carry generate signal, since the adder circuit does not comprise a cumulative carry propagate signal generating unit and a cumulative carry generate signal generating unit.

SUMMARY OF THE INVENTION

It is an object of the present invention to provide a binary operator using a carry select adder or subtracter method, in which it is possible to reduce the number of component elements of the circuit without sacrificing high speed.

According to the present invention, there is provided a binary operator, having a carry propagate signal and a carry generate signal generating unit which receives two pieces of n-bit binary data and generates a carry propagate signal and a carry generate signal of various digits. The two pieces of n-bit binary data are divided into blocks of a predetermined number of bits, each data of the divided blocks is processed in parallel by a plurality of block adders based on the corresponding carry propagate signal and carry generate signal, and a real sum signal is output by calculating the arithmetic sum of the two n-bit binary data. The binary operator comprises a cumulative carry propagate signal generating unit, a cumulative carry generate signal generating unit and a real sum signal generating unit.

The cumulative carry propagate signal generating unit is connected to the carry propagate signal and carry generate signal generating unit and receives carry propagate signals of the various digits in the block adders to generate a cumulative carry propagate signal by calculating the carry propagate signals. The cumulative carry generate signal generating unit is connected to the carry propagate signal and carry generate signal generating unit and receives the carry propagate signals and carry generate signals of the various digits in the block adders to generate a cumulative carry generate signal by calculating the carry propagate signals and the carry generate signals.

The real sum signal generating unit is connected to the carry propagate signal and carry generate signal generating unit, the cumulative carry propagate signal generating unit and the cumulative carry generate signal generating unit, and receives the carry propagate signal of various digits, the cumulative carry propagate signal from the cumulative carry propagate signal generating unit, the cumulative carry generate signal from the cumulative carry generate signal generating unit and a real carry signal to generate the real sum signal by calculating the carry propagate signal, the cumulative carry propagate signal, the cumulative carry generate signal and the real carry signal.

An i-th digit of the real sum signal generating unit may generate the real sum signal of the i-th digit by calculating the carry propagate signal of the i-th digit, the cumulative carry propagate signal of the $(i-1)$-th digit, the cumulative carry generate signal of the $(i-1)$-th digit and a real carry signal advanced from the lower digit to the block adder to which it belongs.

The binary operator may comprise a plurality of carry select adder circuits, and each carry select adder circuit may include the cumulative carry propagate signal generating unit, the cumulative carry generate signal generating unit and the real sum signal generating unit made of combinations of logic gate circuits using, for instance, CMOS transistors.

The cumulative carry propagate signal generating unit and the cumulative carry generate signal generating unit may comprise a chain circuit mutually connected with a transfer gate circuit and an inverter circuit, if they are implemented in CMOS circuits.

According to the present invention, there is also provided a binary operator, having a borrow propagate signal and borrow generate signal generating unit which receives two pieces of n-bit binary data and generates a borrow propagate signal and a borrow generate signal of various digits. The two pieces of n-bit binary data are divided into blocks of predetermined number of bits, each data of the divided blocks is processed in parallel by a plurality of block subtracters based on the corresponding borrow propagate signal and borrow generate signal, and a real difference signal is output by calculating the arithmetic difference of the two n-bit binary data. The binary operator comprises a cumulative borrow propagate signal generating unit, a cumulative borrow generate signal generating unit and a real difference signal generating unit.

The cumulative borrow propagate signal generating unit is connected to the borrow propagate signal and borrow generate signal generating unit and receives borrow propagate signals of the various digits in the block subtracters to generate a cumulative borrow propagate signal by calculating the borrow propagate signals. The cumulative borrow generate signal generating unit is connected to the borrow propagate signal and borrow generate signal generating unit and receives the borrow propagate signals and borrow generate signals of the various digits in the block subtracters to generate a cumulative borrow generate signal by calculating the borrow propagate signals and the borrow generate signals.

The real difference signal generating unit is connected to the borrow propagate signal and borrow generate signal generating unit, the cumulative borrow propagate signal generating unit and the cumulative borrow generate signal generating unit, and receives the borrow propagate signal of various digits, the cumulative borrow propagate signal from the cumulative borrow propagate signal generating unit, the cumulative borrow generate signal from the cumulative borrow generate signal generating unit and a real borrow signal to generate the real difference signal by calculating the borrow propagate signal, the cumulative borrow propagate signal, the cumulative borrow generate signal and the real borrow signal.

An i-th digit of the real difference signal generating unit may generate the real difference signal of the i-th digit by calculating the borrow propagate signal of the i-th digit, the cumulative borrow propagate signal of the i-th digit, the cumulative borrow generate signal of the (i−1)-th digit and a real borrow signal advanced from the lower digit to the block subtracter to which it belongs.

The binary operator may include a plurality of borrow select subtracter circuits, each of the borrow select subtracter circuits may include the cumulative borrow propagate signal generating unit, the cumulative borrow generate signal generating unit and the real difference signal generating unit made of combinations of logic gate circuits using, for instance, CMOS transistors.

The cumulative borrow propagate signal generating unit and the cumulative borrow generate signal generating unit may include a chain circuit mutually connected with a transfer gate circuit and an inverter circuit, if they are implemented in CMOS circuits.

According to the present invention, there is provided a binary operator which includes a carry propagate signal and carry generate signal generating unit, a block addition unit, connected to the carry propagate signal and carry generate signal generating unit, a block carry propagate signal and block carry generate signal generating unit, a cumulative block carry propagate signal and cumulative block carry generate signal generating unit and a real carry signal generating unit. The carry propagate signal and carry generate signal generating unit receives two pieces of n-bit binary data to generate a carry propagate signal and a carry generate signal of various digits.

The block addition unit is connected to the carry propagate signal and carry generate signal generating unit and receives a real carry signal and the carry propagate signal and the carry generate signal from the carry propagate signal and carry generate signal generating unit to divide the two pieces of n-bit binary data into blocks of predetermined number of bits, and to process in parallel based on the carry propagate signal and the carry generate signal corresponding to each data of the divided blocks and generate a real sum signal by calculating the arithmetic sum of the two n-bit binary data. The block carry propagate signal and block carry generate signal generating unit is connected to the carry propagate signal and carry generate signal generating unit and receives the carry propagate signal and the carry generate signal from the carry propagate signal and carry generate signal generating unit to generate a block carry propagate signal and a block carry generate signal by the carry propagate signal and the carry generate signal corresponding to each data of the divided blocks.

The cumulative block carry propagate signal and cumulative block carry generate signal generating unit is connected to the block carry propagate signal and block carry generate signal generating unit and receives the block carry propagate signal and the block carry generate signal from the block carry propagate signal and block carry generate signal generating unit to generate a cumulative block carry propagate signal and a cumulative block carry generate signal using the block carry propagate signal and the block carry generate signal. The real carry signal generating unit is connected to the cumulative block carry propagate signal and cumulative block carry generate signal generating unit and the block addition unit and receives a carry signal, the cumulative block carry propagate signal and the cumulative block carry generate signal from the cumulative block carry propagate signal and cumulative block carry generate signal generating unit to generate a real carry signal by the carry signal, the cumulative block carry propagate signal and the cumulative block carry generate signal.

The block addition unit may generate presumed sum signals in the cases of the carry signal output from the real carry signal generating unit being "0" and "1", and selects one of said presumed sum signals in accordance with the content of the real carry signal from the real carry signal generating means.

The binary operator may comprise a plurality of block look ahead carry generator circuits, and each block look ahead carry generator circuit may include the cumulative block carry propagate signal and cumulative block carry generate signal generating unit and the real carry signal generating unit made of combinations of logic gate circuits and transfer gate circuits using CMOS transistors.

The binary operator may include a plurality of block look ahead carry generator circuits made of a chain circuit mutually connected with a transfer gate circuit and an inverter circuit. The binary operator may comprise a plurality of block look ahead carry generator circuit constructed by one or more stages.

According to the present invention, there is also provided a binary operator which includes a borrow propagate signal and borrow generate signal generating unit, a block subtraction unit, connected to the borrow propagate signal and borrow generate signal generating unit, a block borrow propagate signal and block borrow generate signal generating unit, a cumulative block borrow propagate signal and cumulative block borrow generate signal generating unit and a real borrow signal generating unit. The borrow propagate signal and borrow generate signal generating unit receives two pieces of n-bit binary data to generate a borrow propagate signal and a borrow generate signal of various digits.

The block subtraction unit is connected to the borrow propagate signal and borrow generate signal generating unit and receives a real borrow signal and the borrow propagate signal and the borrow generate signal from the borrow propagate signal and borrow generate signal generating unit to divide the two pieces of n-bit binary data into blocks of a predetermined number of bits, and to process in parallel based on the borrow propagate signal and the borrow generate signal corresponding to each data of the divided blocks and generate a real difference signal by calculating the arithmetic difference of the two n-bit binary data. The block borrow propagate signal and block borrow generate signal generating unit is connected to the borrow propagate signal and borrow generate signal generating unit and receives the borrow propagate signal and the borrow generate signal from the borrow propagate signal and borrow generate signal generating unit to generate a block borrow propagate signal and a block borrow generate signal by the borrow propagate signal and the borrow generate signal corresponding to each data of the divided blocks.

The cumulative block borrow propagate signal and cumulative block borrow generate signal generating unit is connected to the block borrow propagate signal and block borrow generate signal generating unit and receives the block borrow propagate signal and the block borrow generate signal from the block borrow propagate signal and block borrow generate signal generating unit to generate a cumulative block borrow propagate signal and a cumulative block borrow generate signal using the block borrow propagate signal and the block borrow generate signal. The real borrow signal generating unit is connected to the cumulative block borrow propagate signal and cumulative block borrow generate signal generating unit and the block subtraction unit and receives a borrow signal, the cumulative block borrow propagate signal and the cumulative block borrow generate signal from the cumulative block borrow propagate signal and cumulative block borrow generate signal generating unit to generate a real borrow signal by the borrow signal, the cumulative block borrow propagate signal and the cumulative block borrow generate signal.

The block subtraction unit may generate presumed difference signals in the cases of the borrow signal output from the real borrow signal generating unit being "0" and "1", and selects one of said presumed difference signals in accordance with the content of the real borrow signal from the real borrow signal generating means.

The binary operator may include a plurality of block look ahead borrow generator circuits, each of the block look ahead borrow generator circuit may include the cumulative block borrow propagate signal and cumulative block borrow generate signal generating unit and the real borrow signal generating unit made of combinations of logic gate circuits and transfer gate circuit using CMOS transistors.

The binary operator may include a plurality of block look ahead borrow generator circuits made of a chain circuit mutually connected with a transfer gate circuit and an inverter circuit. The binary operator may include a plurality of block look ahead borrow generator circuit constructed by one or more stages.

BRIEF DESCRIPTION OF THE DRAWINGS

The present invention will be more clearly understood from the description of the preferred embodiments as set forth below with reference to the accompanying drawings, wherein:

FIG. 4 is a block diagram showing a first embodiment of a binary operator according to the present invention;

FIG. 5 is a block diagram showing a second embodiment of a binary operator according to the present invention;

FIG. 7(a) is a block diagram showing a CSA circuit in the parallel full adder shown in FIG. 6, and FIG. 7(b) is a circuit diagram showing a first example of the CSA circuit shown in FIG. 7(a);

FIG. 13(a) is a block diagram showing a CSA circuit in the parallel full adder shown in FIG. 6, and FIG. 13(b) is a circuit diagram showing a second example of the CSA circuit shown in FIG. 13(a);

DESCRIPTION OF THE PREFERRED EMBODIMENTS

For a better understanding of the preferred embodiments, the problems of the prior art will be first explained with reference to FIGS. 1, 2(a), 2(b), 3(a) and 3(b).

Figure 1:
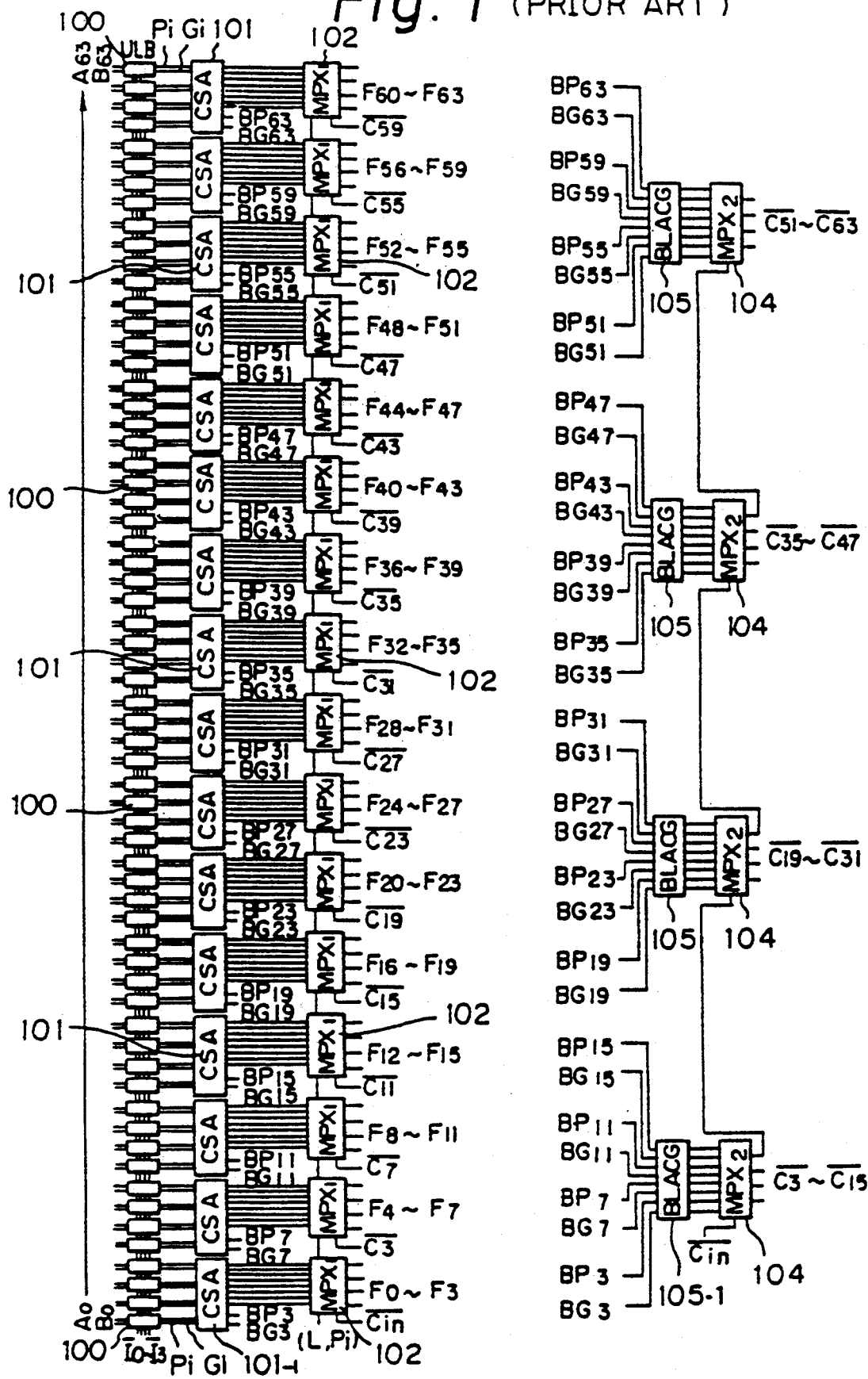
FIG. 1 is a block diagram showing an example of application of a prior parallel full adder to a 64 bit ALU.

FIG. 1 shows an example of an arithmetic logic unit (ALU) of 64 bits including a high speed parallel full adder using carry select adder method.

This ALU is comprised, roughly, of a sum signal generating circuit which generates various presumed sum signals in the case of the real carry signal being "0" and in the case of it being "0" by the look ahead method, a carry signal generating circuit which generates various presumed carry signals in the case of the real carry signal being "0" and in the case of it being "1" by the same look ahead method, and a selection circuit which selects the above-mentioned sum signal by the real carry signal which is generated. Below, this will be explained with reference to FIG. 1 by the various constituent elements.

Processing Data

The data to be processed are in general the two pieces of n-bit binary data A and B. Here, they are considered to be 64 bit data. A is the augend and B the addend. ALU calculates the arithmetic sum F of the augend A and the addend B.

In the following explanation, matters are generalized so as to simplify the explanation. The bits of the i-th digits of the data A and B and the arithmetic sum F (i=0, 1, 2, ... n−1) are designated as $A_i$, $B_i$, and $F_i$. The character "i" is appended to other signals in expressing the same.

The above-mentioned 64 bit input data A ($A_0$, $A_1$, $A_2$, ... $A_{63}$) and B ($B_0$, $B_1$, $B_2$, ... $B_{63}$) is input to the unit logic block circuits (below, ULB) 100.

ULB Circuit 100

A ULB circuit 100 is provided corresponding to the bits of the digits of the input and output data and thus 64 are provided, i.e., 0 to 63. The ULB circuit 100 generates the necessary signals (that is, the two signals of the carry propagate signal $P_i$ and the carry generate signal $G_i$) for the carry select addition at later stages.

Here, the carry propagate signal $P_i$ is given by the logical EOR:

$$P_i = A_i + B_i \qquad (1)$$

Further, the carry propagate signal G is given by the logical AND:

$$G_i = A_i B_i \qquad (2)$$

The carry propagate signal $P_i$ and the carry generate signal $G_i$ generated in this way are input into the block carry select adder circuit (CSA) 101 of the blocks to which they respectively belong.

Note that the signals $I_0$ to $I_3$ given to the ULB circuits 100 are signals for designating what should be output as the carry propagate signal $P_i$ and the carry generate signal $G_i$ and are not directly related to the composition of the adder of the present invention and thus an explanation of the same is omitted.

CSA Circuit 101

A CSA circuit 101 divides the input data A and B into blocks of predetermined numbers of bits (in this example, 4 bits) and generated presumed sum signals $F_i(0)$ and $F_i(1)$ for each of the bits belonging to the blocks before the real carry signal $C_{M-1}$ from the lower block is generated. Note that M shows the lowest digit of the signal to be processed in the block adder (CSA circuit) to which the i-th digit belongs. Further, the number of signal digits processed in a block adder is m'. The presumed sum signal $F_1(0)$ shows the presumed sum signal in the case where the real carry signal $C_{M-1}$ is presumed to be "0" and $F_i(1)$ that in the case where the real carry signal $C_{M-1}$ is presumed to be "1". Further, the CSA circuit 101, in addition to the above-mentioned sum signals $F_i(0)$ and $F_i(1)$, generates the block carry propagate signal $BP_{M+m-1}$ and the block carry generate signal $BG_{M+m-1}$ for use by the block look ahead carry generator circuit (BLACG), mentioned later.

Figure 2A:
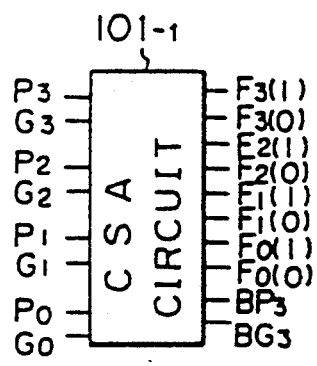
FIGS. 2(a) and 2(b) are circuit diagrams showing an example of a conventional CSA circuit in the prior parallel full adder shown in FIG. 1.
Figure 2B:
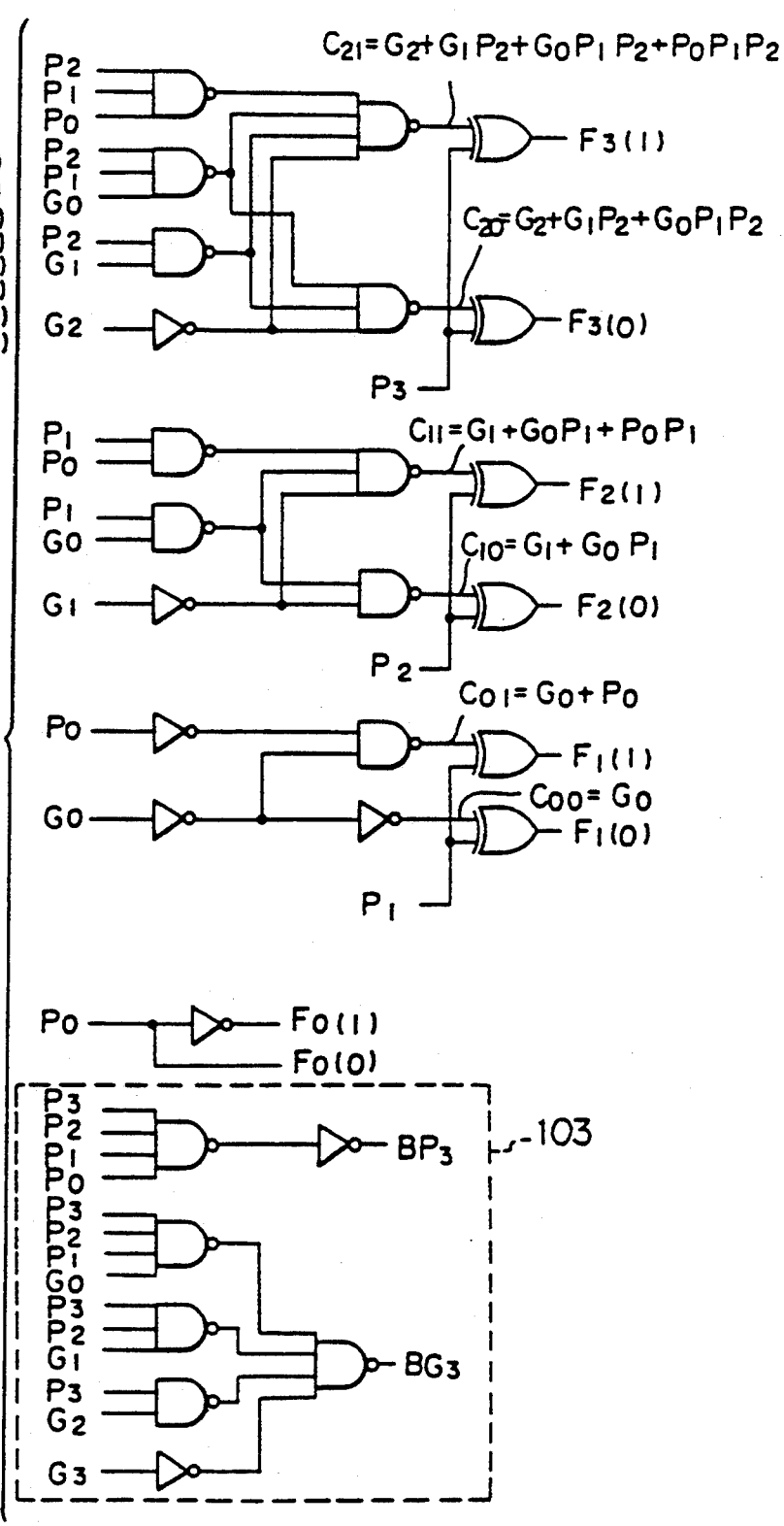

FIGS. 2(a) and 2(b) show a specific example of the CSA circuit 101, explained below. In particular, FIGS. 2(a) and 2(b) show the example of a CSA circuit $101_{-1}$ of the first block (block receiving input data $A_0$ to $A_3$ and $B_0$ to $B_3$) in FIG. 1, where FIG. 2(a) is a symbolized view and FIG. 2(b) is a detailed circuit diagram.

As shown in FIG. 2(b), the CSA circuit 101 receives an input the carry propagate signals $P_0$ to $P_3$ and the carry generate signals $G_0$ to $G_3$ corresponding to the bits from four of the ULB circuit 100. As the constituent elements of the CSA circuit 101, the circuit is comprised of a combination of a NAND circuit, inverter circuit, and EOR circuit using CMOS transistors. Note that is is of course possible to comprise the same using bipolar transistors, NMOS transistors, HEMTs, MESFETs or other kinds of transistors.

The CSA circuit $101_{-1}$ is roughly comprised of five blocks. In the first block, presumed sum signals $F_0(0)$ and $F_0(1)$ relating to the 0th bit are generated. In the second block, the presumed sum signals $F_1(0)$ and $F_1(1)$ relating to the first bit are generated. In the third block, the presumed sum signals $F_2(0)$ and $F_2(1)$ relating to the second bit are generated. In the fourth block, the presumed sum signals $F_3(0)$ and $F_3(1)$ relating to the third bit are generated. Further, in the fifth block, the block carry propagate signal $BP_3$ and the block carry generate signal $BG_3$ relating to the third bit (that is, the highest digit in the first block) are generated. (partial circuit 103).

The various presumed sum signals $F_0(0)$, $F_0(1)$ to $F_3(0)$, and $F_3(1)$ generated in this way are output in the select waiting state to the corresponding first multiplexer circuit (below, called first MPX circuit) 102. Further, the block carry propagate signal $BP_3$ and the block carry generate signal $BG_3$ are output as part of the input signals of the BLACG circuit 105.

Above, the explanation was made with reference to a single CSA circuit $101_{-1}$, but the same construction applies for corresponding input data in the case of CSA circuits having other blocks, so explanations of the same will be omitted.

BLACG Circuit 105

The BLACG circuit 105 divides the block carry propagate signal $BP_{M+m-1}$ and the block carry generate signal $BG_{M+m-1}$ from the partial circuit 103 (FIG. 2(b)) in the CSA circuits 101 of the blocks further into groups of predetermined numbers (in this case, four) and generates the presumed carry signals $C_i(0)$ and $C_i(1)$ for each of the block carry propagate signal $BP_i$ and the block carry generate signal $BG_i$ which belong to the blocks, before the real carry signal $C_{M'-m'}$ from the lower block is generated. M' shows the lowest digit of the signal to be processed in the BLACG circuit to which the circuit generating the i-th digit presumed carry signals $C_i(0)$ and $c_i(1)$ belongs. Further, m' is a positive integer which is usually equal to m. The presumed carry signal $C_i(0)$ is the signal in the case where the real carry signal $C_{M'-m'}$ is "0" and $C_i(1)$ is that in the case where $C_{M'-m'}$ is "1".

Figure 3A:
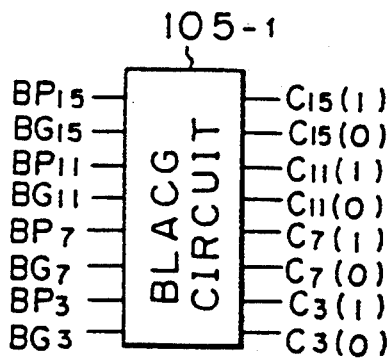
FIGS. 3(a) and 3(b) are circuit diagrams showing an example of a conventional BLACG circuit in the prior parallel full adder shown in FIG. 1.
Figure 3B:
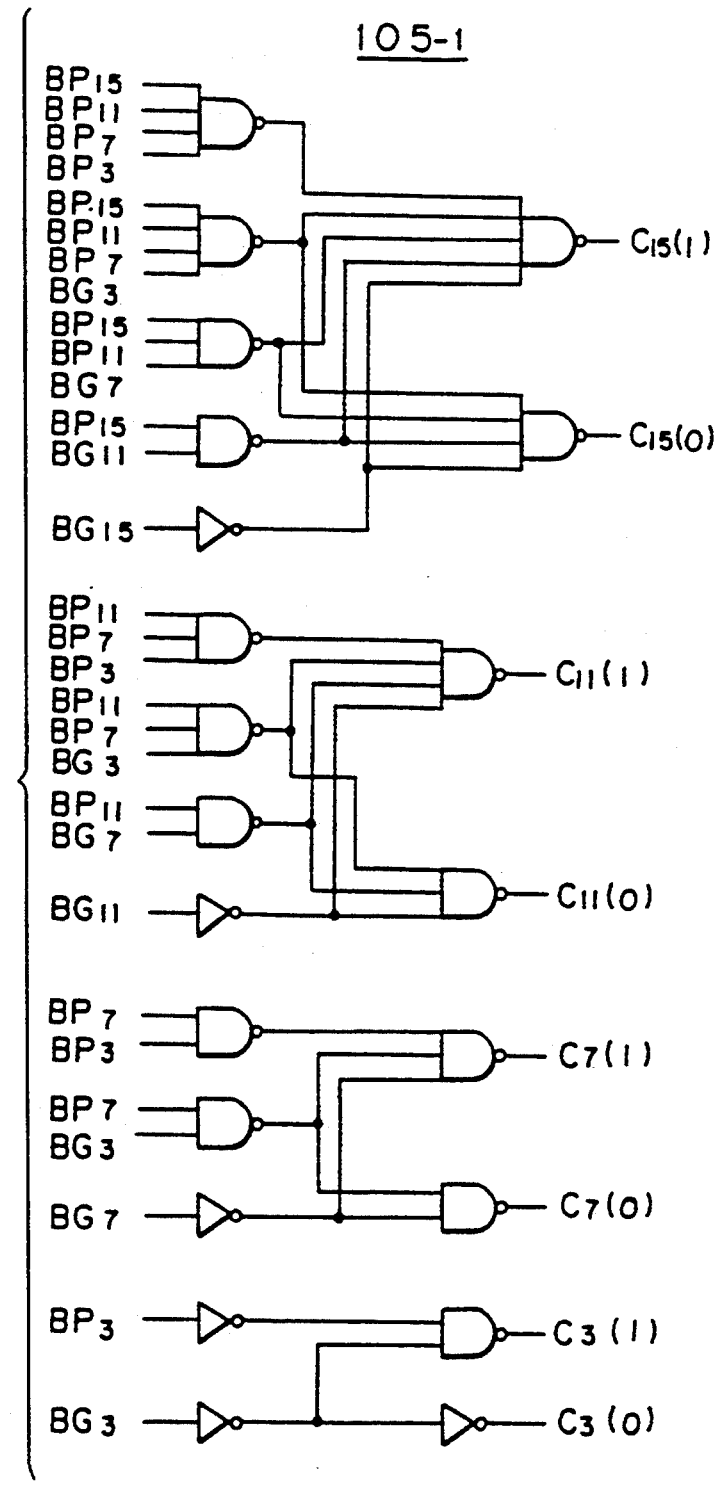

FIGS. 3(a) and 3(b) show a specific example of the BLACG circuit 105, which is explained below. FIGS. 3(a) and 3(b) take as an example the BLACG circuit $105_{-1}$ of the first block (block dealing with the input signals $BP_3$, $BG_3$, $BP_7$, $BG_7$, $BP_{11}$, $BG_{11}$, $BP_{15}$, and $BG_{15}$) in FIG. 1, where FIG. 3(a) is a symbolized view of the BLACG circuit $105_{-1}$ and FIG. 3(b) is a detailed circuit diagram.

As shown in FIG. 3(b), the BLACG circuit $105_{-1}$ receives as input the block carry propagate signals $BP_3$, $BP_7$, $BP_{11}$, and $BP_{15}$ and the block carry generate signals $BG_3$, $BG_7$, $BG_{11}$, and $BG_{15}$ from the partial circuit 103 of the CSA circuits 101 at the former stage. The BLACG circuit is comprised of a combination of a NAND circuit and inverter circuit using CMOS transistors. Note that it is not limited to CMOS transistors and that use may also be made of bipolar or other kinds of transistors for the construction.

The BLACG circuit $105_{-1}$ is roughly comprised of four blocks. In the first block, presumed carry signals $C_3(0)$ and $C_3(1)$ are generated based on the block carry propagate signal $BP_3$ and the block carry generate signal $BG_3$. Below, in the same way, in the second block, $C_7(0)$ and $C_7(1)$ are generated based on $BP_3$, $BG_3$, to $BP_7$, and $BG_7$. In the third block, $C_{11}(0)$ and $C_{11}(1)$ are generated based on $BP_3$, $BG_3$, $BP_7$, $BG_7$, $BP_{11}$ and $BG_{11}$. In the fourth block, $C_{15}(0)$ and $C_{15}(1)$ are generated based on $BP_3$, $BG_3$, $BP_7$, $BG_7$, $BP_{11}$, $BG_{11}$, $BP_{15}$ and $BG_{15}$.

The various presumed carry signals $C_3(0)$, $C_3(1)$, $C_7(0)$, $C_7(1)$, $C_{11}(0)$, $C_{11}(1)$, $C_{15}(0)$, and $C_{15}(1)$ generated in this way are output in the select waiting state to the corresponding multiplexer circuit (below, called second MPX circuit) 104.

Above, the explanation was made with reference to a single BLACG circuit $105_{-1}$, but the same construction applies for BLACG circuits having other blocks, so explanations of the same will be omitted.

Second MPX Circuit 104

The second MPX circuit 104 is a selector which selects one of the presumed carry signal pairs $C_3(0)$, $C_3(1)$ ... (that is, one of carry "0" or "1") out of the presumed carry signal pairs $C_3(0)$, $C_3(1)$ to $C_{15}(0)$, $C_{15}(1)$ from the BLACG circuits 105 at the time of the input of the real carry signals $C_{in}$, $C_{15}$, $C_{31}$, and $C_{47}$, which are the signals of the highest digits of the second MPX circuit 104 of the lower block.

The selection operation of the presumed carry signal starts by the input of the real carry signal $C_{in}$ to the second MPX circuit 104 of the lowest block. At the time of the completion of the selection of the first block, the highest carry signal $C_{15}$ is moved up as the real carry signal for the higher second MPX circuit 104 and after that is moved up successively toward the higher blocks.

On the other hand, the real carry signals $C_3$ to $C_{15}$, $C_{19}$ to $C_{31}$, $C_{35}$ to $C_{47}$, and $C_{51}$ to $C_{63}$, which are one of the presumed carry signals selected in the second MPX circuits 104, are output as select signals to the corresponding firs MPX circuits 102.

First MPX Circuit 102

The first MPX circuit 102 receives the carry signals $C_3$ to $C_{15}$, $C_{19}$ to $C_{31}$, $C_{35}$ to $C_{47}$, and $C_{51}$ to $C_{63}$ from the second MPX circuit 104 and selects and outputs one of the presumed sum signals $F_i(0)$ and $F_i(1)$ output from the CSA circuits 101. The selection is performed in accordance with the contents of the carry signal $C_{M-1}$ input to the first MPX circuits 102. The selected presumed sum signal $F_i(0)$ or $F_i(1)$ is output as the real sum signal (specifically, $F_0$ or $F_{63}$) in the CSA circuit 101, whereby one block of an addition operation is ended.

Note that the signal (L, $P_i$) given to the first MPX circuit 102 is a signal for designating what should be output as $F_i$ and is not directly related to the composition of the adder of the present invention and thus an explanation of the same is omitted along with the related MPX circuit.

The above explanation was made in reference to the example of a parallel full adder, but may be applied to a parallel full subtracter as well. In constructing a parallel full subtracter, for the i-th digit, a borrow propagate signal generated by the ULB circuit 100 is used as $P_i$ and the borrow generate signal is used as $G_i$. That is, in subtraction where A is the minuend and B is the subtrahend, the borrow propagate signal $P_i$ is found by the exclusive −NOR operation (ENOR) of:

$$P_i = \overline{A_i + B_i} \qquad (3)$$

Further, the borrow generate signal $G_i$ may be found by $$G_i = \overline{A_i B_i} \qquad (4)$$

In addition to this, by treating the carry signal as the borrow signal and processing the borrow signals successively from the lower digits, it is possible to construct a full subtracter by the same method of construction as above. However, the real difference signals $F_i$ of the digits are found by the logical ENOR of:

$$F_i = \overline{P_i + C_{i-1}}$$

As explained above, the conventional parallel full adder using the carry select adder method is superior in function aspects and shows its power in the case of high speed processing of 32-bit, 64-bit, and other long data.

However, in the above-mentioned prior parallel full adder using the carry select adder method, there are the problems of a larger number of constituent elements of the circuits—double the number of constituent elements compared with the simple ripple carry method. That is, this is because the above-mentioned prior art example prepares two presumed sum signals $F_i(0)$ and $F_i(1)$ in advance and outputs one of the presumed sum signals $F_i(0)$ and $F_i(1)$ as the real sum signal $F_i$ at the time when the content of the carry signal from the lower digit to the said block adder (CSA circuit) is determined, so it is necessary that the two presumed sum signals $F_i(0)$ and $F_i(1)$ be generated in parallel in terms of time.

The circuit required for generating in parallel the two presumed sum signals $F_i(0)$ and $F_i(1)$ in the block adder (CSA circuit) processes, for the i-th digit, the carry propagate signal $P_i$ and the carry generate signal $G_i$ of the digits in the block adder to which the said i-th digit belongs and includes a considerable amount of overlapping portions (that is, portions which generate the same type of signals overlappingly). If these overlapping portions can be eliminated to an extent not obstructing the high speed of the carry select adder method, it would be possible to simplify the circuit construction and to reduce the number of constituent elements of the circuit. Of course, the two signals of the presumed sum signals $F_i(0)$ and $F_i(1)$ contain redundant information in generating the real sum signals $F_i$ of the digits.

Further, in the above-mentioned prior parallel full adder using the carry select adder method, there are the problems of a larger number of constituent elements of the BLACG circuit 105—double the number of constituent elements compared with the simple CLA method. That is, this is because the above-mentioned prior art example prepares two presumed sum signals $F_i(0)$ and $F_i(1)$ in the CSA circuit 101 in advance and selects and outputs one of the presumed sum signals $F_i(0)$ or $F_i(1)$ as the real sum signal $F_i$ at the time when the content of the real carry signal generated by the BLACG circuit 105 is determined in accordance with the content thereof. Therefore, the operation speed is determined by how quickly the real carry signal can be generated. Here, to generate the real carry signal at a high speed, as mentioned above, the BLACG circuit 105 divides the data into blocks of four digits each, prepares two presumed carry signals $C_i(0)$ and $C_i(1)$ by the look ahead processing method, and selects and outputs as the real carry signal $C_i$ one of the presumed carry signals $C_i(0)$ or $C_i(1)$ at the point of time when the real carry signal $C_{M-m'}$ from the lower digit is confirmed in the second MPX circuit 104. As a result of this construction, it is necessary to generate in parallel in terms of time two resumed carry signals $C_i(0)$ and $C_i(1)$. The generating circuit for this parallel generation is a cause behind the increase in the number of circuit elements.

The circuit required for generating in parallel the two presumed carry signals $C_i(0)$ and $C_i(1)$ in the BLACG circuit 105 processes, for the i-th digit, the block carry propagate signal $BP_i$ and the block carry generate signal $BG_i$ of the digits in the BLACG circuit 105 to which the said i-th digit belongs and includes a considerable amount of overlapping portions (that is, portions, which generate the same type of signals overlappingly). If these overlapping portions can be eliminated to an extent not obstructing the high speed of the carry select adder method, it would be possible to simplify the circuit construction and to reduce the number of constituent elements of the circuit. Of course, the two signals of the presumed carry signals $C_i(0)$ and $C_i(1)$ contain redundant information in generating the real sum signals $C_i$ of the digits.

The present invention has its object the provision of the parallel binary operator using the carry select adder (or subtracter) method, in which binary operator it is possible to cut down on the number of component elements of the circuit without sacrifice to high speed.

Below, the preferred embodiments of the present invention will be explained with reference to the drawings.

FIG. 4 is a block diagram showing a first embodiment of a binary operator according to the present invention. As shown in FIG. 4, the binary operator according to the present invention is a binary operator which receives as input two n-bit binary data (A,B), the binary operator includes a means (100) which generates a carry propagate signal ($P_i$) and a carry generate signal ($G_i$) of various digits, divides the aforementioned two n-bit binary data (A, B) into blocks of predetermined numbers of bits, processes in parallel the blocks of data based on the corresponding aforementioned carry propagate signal ($P_i$) and carry generate signal ($G_i$) by a plurality of block adders, calculates the arithmetic sum of the aforementioned two n-bit binary data (A, B), and outputs a real sum signal ($F_i$); which a means (106) for generating a cumulative carry propagate signal ($BP_{i-1}^*$) from the carry propagate signal ($P_M$ to $P_{i-1}$) of the various digits in the aforementioned block adders; a means (107) for generating a cumulative carry generate signal ($BG_{i-1}^*$) from the carry propagate signal ($P_M$ to $P_{i-1}$) and carry generate signals ($G_M$ to $G_{i-1}$) of the various digits in the aforementioned block adders; and a means (108) for generating a real sum signal ($F_i$) by the aforementioned carry propagate signal ($P_i$), cumulative carry propagate signal ($BP_{i-1}^*$), cumulative carry generate signal ($BG_{i-1}^*$), and carry signal ($C_{M-1}$) to said block adders.

FIG. 5 is a block diagram showing a second embodiment of a binary operator according to the present invention. As shown in FIG. 5, the binary operator according to the present invention is a binary operator which receives as input two n-bit binary data (A, B), the binary operator includes a means (200) which generates a borrow propagate signal ($P_i$) and a borrow generate signal ($G_i$) of various digits, divides the aforementioned two n-bit binary data (A, B) into blocks of predetermined numbers of bits, processes in parallel the blocks of data based on the corresponding aforementioned borrow propagate signal ($P_i$) and borrow generate signal ($G_i$) by a plurality of block subtracters, calculates the arithmetic difference of the aforementioned two n-bit binary data (A, B), and outputs a real difference signal ($F_i$); a means (206) for generating a cumulative borrow propagate signal ($BP_{i-1}^*$) from the borrow propagate signals ($P_M$ to $P_{i-1}$) of the various digits in the aforementioned block subtracters; a means (207) for generating a cumulative borrow generate signal ($BG_{i-1}^*$) from the borrow propagate signals ($P_M$ to $P_{i-1}$) and borrow generate signals $G_M$ to $G_{i-1}$ of the various digits in the aforementioned block subtracters; and means (208) for generating a real difference signal ($F_i$) by the aforementioned borrow propagate signal ($P_i$), cumulative borrow propagate signal ($BP_{i-1}^*$), cumulative borrow generate signal ($BG_{i-1}$), and borrow signal ($C_{M-1}$) to said block subtracters.

In the parallel full adder shown in FIG. 4, when two n-bit binary data (A, B) are input, a carry propagate signal ($P_i$) and carry generate signal ($G_i$) are output from the carry propagate signal and carry generate signal generating means (100). The carry propagate signal ($P_i$) is applied to the cumulative carry propagate signal generating means (106), the cumulative carry generate signal generating means (107), and the real sum signal generating means (108). AT the cumulative carry propagate signal generating means (106), a cumulative carry propagate signal ($BP_i^*$) is generated based on the input carry propagate signals ($P_M$ to $P_i$) and sent to the real sum signal generating means (108). The carry generate signal ($G_i$) is given to the cumulative carry generate signal generating means (107). In the cumulative carry generate signal generating means (107), a cumulative carry generate signal ($BG_i^*$) is generated based on the input carry propagate signals ($P_M$ to $P_i$) and the carry generate signals ($G_M$ to $G_i$) and sent to the real sum signal generating means (108). The i-th digit real sum signal generating means (108) generates the real sum signal ($F_i$) of said digit by four signals: the real carry signal ($C_{M-1}$) advanced from the lower digit to the block adder to which it belongs, a carry propagate signal ($BP_{i-1}^*$) of the (i−1)-th digit, and a cumulative carry generate signal ($BG_{i-1}^*$) of the (i−1)-th digit.

That is, in summary, the first embodiment of the present invention does not simultaneously generate two presumed sum signals $F_{i(0)}$ and $F_{i(1)}$ and select and output the same as in the prior art, but directly performs operations on the three signals $P_i$, $BP_{i-1}^*$, and $BG_{i-1}^*$ necessary for generating the presumed sum signal pair $F_i(0)$ and $F_i(1)$ and the real carry signal ($C_{M-1}$) to calculate the real sum signal ($F_i$).

In the parallel full subtracter shown in FIG. 5 when two n-bit binary data (A, B) are input, a borrow propagate signal ($P_i$) and borrow generate signal ($G_i$) are output from the borrow propagate signal and borrow generate signal generating means (200). The borrow propagate signal ($P_i$) is applied to the cumulative borrow propagate signal generating means (206), the cumulative borrow generate signal generating means (207), and the real difference signal generating means (208). At the cumulative borrow propagate signal generating means (206), a cumulative borrow propagate signal ($BP_i^*$) is generated based on the input borrow propagate signals ($P_M$ to $P_i$) and sent to the real difference signal generating means (208). The borrow generate signal ($G_i$) is given to the cumulative borrow generate signal generating means (207). In the cumulative borrow generate signal generating means (207), a cumulative borrow generate signal ($BG_i^*$) is generated based on the input borrow propagate signals ($P_M$ to $P_i$) and borrow generate signals ($G_M$ to $G_i$) and sent to the real difference signal generating means (208). The i-th digit real difference signal generating means (208) generates the real difference signal ($F_i$) of said digit by four signals: the real borrow signal ($C_{M-1}$) advanced from the lower digit to the block subtracter to which it belongs, a borrow propagate signal ($P_i$) of said digit, a cumulative borrow propagate signal ($BP_{i-1}^*$) of the (i−1)-th digit, and a cumulative borrow generate signal ($BG_{i-1}^*$) of the (i−1)-th digit.

That is, in summary, the second embodiment of the present invention does not simultaneously generate two presumed difference signals $F_i(0)$ and $F_i(1)$ and select and output the same as in the prior art, but directly performs operations on the three signals $P_i$, $BP_{i-1}^*$, and $BG_{i-1}^*$ necessary for generating the presumed difference signal pair $F_i(0)$ and $F_i(1)$ and the real borrow signal $C_{M-1}$ to calculate the real difference signal ($F_i$).

Figure 6:
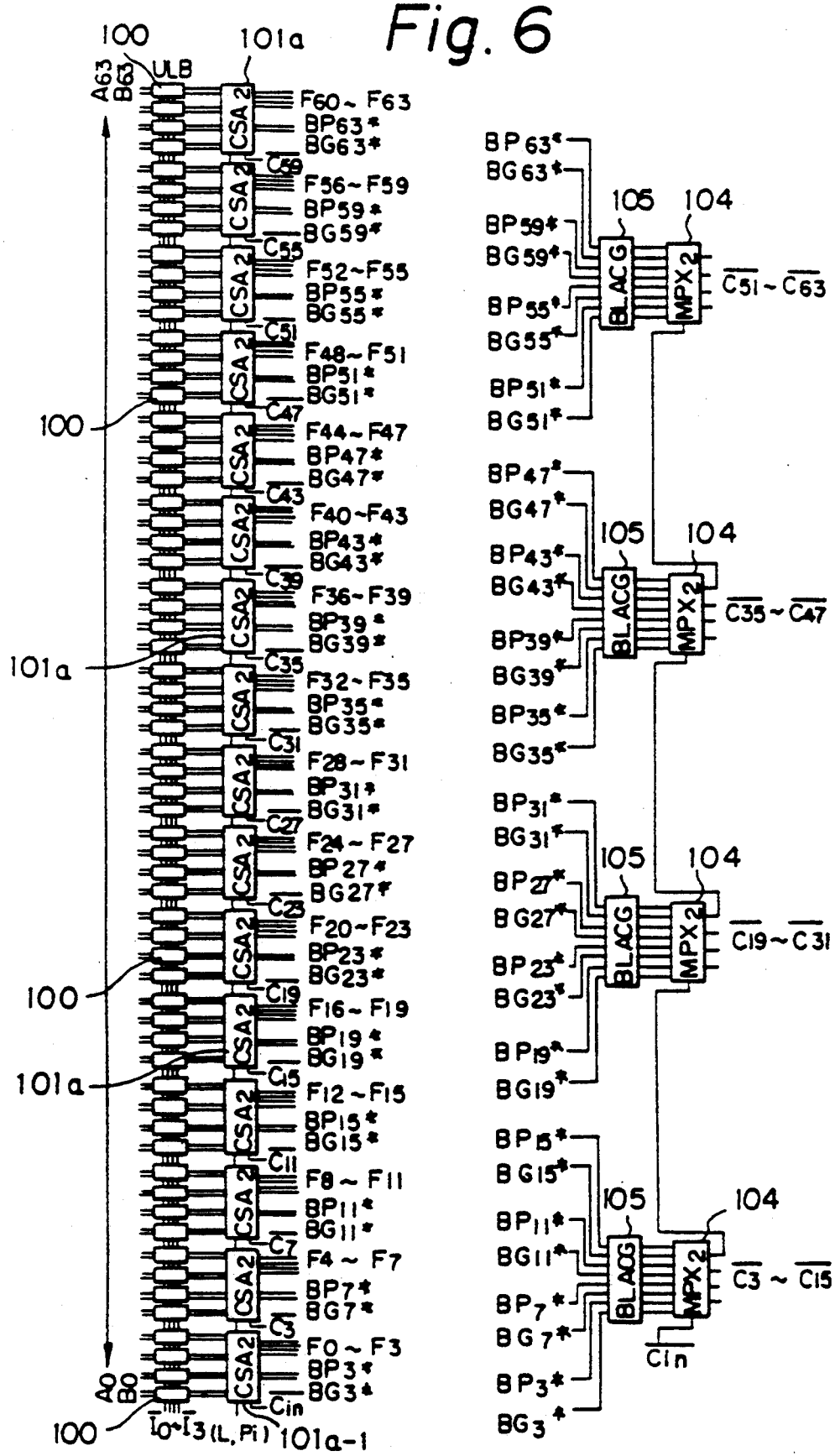
FIG. 6 is a block diagram showing an example of application to a 64 bit ALU of a parallel full adder according to the first embodiment of the present invention.

To standardize the explanation, a circuit construction based on a prior 64-bit ALU (FIG. 1) is shown in FIG. 6. The explanation will be made based on this.

The CSA circuit 101a, which is one block adder, is made one which simultaneously processes m digit (4 bit) signals. In the CSA circuit 101a, wherein the lowest digit is the M-th digit, the cumulative carry propagate signal $BP_i^*$ and the cumulative carry generate signal $BG_i^*$ for the i-th digit are defined by the following equations (5) and (6):

$$BP_i^* = \prod_{\alpha=0}^{i-M} P_{M+\alpha} \tag{5}$$

$$BG_i^* = G_i + \sum_{\alpha=0}^{i-M-1}\left(\prod_{\beta=\alpha+1}^{i-M} P_{M+\beta}\right)\cdot G_{M+\alpha} \tag{6}$$

(where, i=M, M+1, ..., M+m−1)

Here, the cumulative carry propagate signal $BP_i^*$ and cumulative carry generate signal $BG_i^*$ and the prior block carry propagate signal $BP_i$ and block carry generate signal $BG_i$ are clearly different in the point that the former are signals used in bit units, while the latter are signals used in block units for the BLACG circuits. Therefore, to clearly differentiate the two, the former are used with the symbol "*" attached thereto and expressed as "$BP_i^*$" and "$BG_i^*$".

Next, the i-th digit real sum signal $F_i$ has the following relationship with the real carry signal $C_{M-1}$ input to the the CSA circuit 101a dealing with the i-th digit and the cumulative carry propagate signal $BP_{i-1}^*$, cumulative carry generate signal $BG_{i-1}^*$, and carry propagate signal $P_i$:

$$F_i = \begin{bmatrix} F_i(0) = P_i \oplus BG_{i-1}^* \\ \text{(where, } C_{M-1} = \text{"0")} \\ F_i(1) = P_i \oplus (BG_{i-1}^* + BP_{i-1}^*) \\ \text{(where, } C_{M-1} = \text{"1")} \end{bmatrix} \tag{7}$$

Here, it is defined that $BG_{M-1}^* = $ "0", and $BP_{M-1}^* = $ "1".

That is, from the above-mentioned equation (7), it is understood that the presumed sum signals $F_i(0)$ and $F_i(1)$ can be generated independently from the known signals ($P_i$, $BG_{i-1}^*$, and $BP_{i-1}^*$). Therefore, there is no need for separate generation of the presumed sum signals $F_i(0)$ and $F_i(1)$ as in the prior art. By using the combination of the i-th digit carry propagate signal $P_i$, the (i−1)-th digit cumulative carry propagate signal $BP_{i-1}^*$, and the cumulative carry generate signal $BG_{i-1}^*$ and the real carry signal $C_{M-1}$ as it is in the CSA circuit, it is possible to generate the i-th digit real sum signal $F_i$ directly.

By doing this, it is possible to eliminate the redundancy in separately generating both the presumed sum signal $F_i(0)$ and $F_i(1)$ and therefore it is possible to delete the circuit required for the generation and thus simplify the circuit construction and cut down on the number of constituent elements of the circuit. At this time, if the operating time of the circuit for processing the above-mentioned signals $P_i$, $BP_{i-1}^*$, and $BG_{i-1}^*$ is less than the operating time for generating the real carry signal, which requires the most time in the operation process, it is possible to realize a parallel full adder having an equivalent processing speed compared with the conventional block carry select adder method with fewer circuit constituent elements than in the past.

FIG. 6 shows a summary of the first embodiment. The point of difference with the prior FIG. 1 lies in the construction of the CSA circuit 101a. The same construction is used for the other input data A, B, ULB circuit 100, BLACG circuit 105, and the second MPX circuit 104, so the same symbols are appended and explanations thereof are omitted.

The CSA circuit 101a in the first embodiment differs from the prior CSA circuit 101 in the point that it does not generate in parallel the presumed sum signals $F_i(0)$ and $F_i(1)$ but newly introduces the cumulative carry propagate signal $BP_{i-1}^*$ and the cumulative carry generate signal $BG_{i-1}^*$ for each bit and directly calculates the real sum signal $F_i$.

Next, FIGS. 7(a) and 7(b) are diagrams illustrating a first example of the CSA circuit 101a according to the first embodiment. In particular, FIGS. 7(a) and 7(b) show the example of the CSA circuit $101_{a-1}$ dealing with the first block (input data $A_0$ to $A_3$, $B_0$ to $B_3$)in FIG. 6, where FIG. 7(a) is a symbolized view and FIG. 7(b) is a detailed circuit diagram.

As shown in FIG. 7(b), the CSA circuit $101_{a-1}$ receives as input the carry propagate signals $P_0$ to $P_3$ and the carry generate signals $G_0$ to $G_3$ corresponding to the bits from ULB circuit 100. As constituent elements of the circuit, use is made of combinations of NAND circuits, NOR circuits, inverter circuits, and EOR circuits using CMOS transistors. Note that use may also be made of bipolar transistors and other digital elements.

As shown in FIG. 7(b), the CSA circuit includes a cumulative carry propagate signal generating unit 106, a cumulative carry generate signal generating unit 107 and a real sum signal generating unit 108. The third digit cumulative carry propagate signal generating unit 106 comprises a four-inputs NAND circuit 161 and an inverter circuit 162. The four inputs of said NAND circuit 161 are supplied with carry propagate signals $P_0$ to $P_3$, an output of the NAND circuit 161 is connected to an input of the inverter circuit 162, and the inverter circuit 162 outputs a cumulative carry propagate signal $BP_3^*$.

The third digit cumulative carry generate signal generating unit 107 comprises an inverter circuit 171, a two-input NAND circuit 172, a three-inputs NAND circuit 173 and a first and a second four-input NAND circuits 174 and 175. An input of the inverter circuit 171 is supplied with a carry generate signal $G_3$, a first input of the two-inputs NAND circuit 172 is supplied with a carry generate signal $G_2$ and a second input of the two-inputs NAND circuit 172 is supplied with a carry propagate signal $P_3$. A first input of the three-input NAND circuit 173 is supplied with a carry generate signal $G_1$ and a second and a third inputs of the three-input NAND circuit 173 are supplied with carry propagate signals $P_2$ and $P_3$. A first input of the first four-inputs NAND circuit 174 is supplied with a carry generate signal $G_0$ and a second, a third and a fourth inputs of the first four-input NAND circuit 174 are supplied with carry propagate signals $P_1$ to $P_3$. Outputs of the inverter circuit 171, the two-input NAND circuit 172, the three-input NAND circuit 173 and the first four-input NAND circuit 174 are connected to four inputs of the second four-input NAND circuit 175, and the second four-input NAND circuit 175 outputs a cumulative carry generate signal $BG_3^*$.

The real sum signal generating unit 108 comprises a NOR circuit 181 and a first and a second EOR circuits 182 and 183. A first input of the NOR circuit 181 is supplied with an inverted real carry signal $\overline{C_{-1}}$ and a second input of a NOR circuit is supplied with an inverted cumulative carry propagate signal $\overline{BP_2^*}$ ($\overline{BP_1^*}$, $\overline{BP_0^*}$). A first input of the first EOR circuit 182 is supplied with a carry propagate signal $P_3$ ($P_2$, $P_1$) and a second input of the first EOR circuit 182 is supplied with a cumulative carry generate signal $BG_2^*$ ($BG_1^*$, $BG_0^*$), an output of the first EOR circuit 182 is connected to a first input of the second EOR circuit 183 and an output of the NOR circuit 181 is connected to a second input of the second EOR circuit 183, and the second EOR circuit 183 outputs a real sum signal $F_3$ ($F_2$, $F_1$).

The CSA circuit $101_{a-1}$ is roughly comprised of five blocks. In the first block, the real sum signal $F_0$ is generated by the inverted signal $\overline{C_{-1}}$ of the real carry signal and the carry propagate signal $P_0$.

Note that $C_{-1}$ is a carry signal from the digit below the 0-th digit (lowest digit) and that $C_{-1}=$"0" in the addition of independent binary numbers. Further, the cumulative carry propagate signal $BP_M^*$ of the lowest digit (in the case of the present example, the 0-th digit) in the block adder is equal to the M-th digit carry propagate signal $P_M$ from equation (5). Similarly, the M-th digit cumulative carry generate signal $BG_M^*$ is equivalent to the M-th digit carry generate signal $G_M$. The M-th digit real sum signal can be expressed as $F_M = P_M + C_{M-1}$ by making $BG_{M-1}^* =$ "0" and $BP_{M-1}^* =$ "1".

In the second block, the real sum signal $F_1$ is generated by the inverted signal $\overline{C_{-1}}$ of the real carry signal, the carry propagate signal $P_1$, the inverted signal $\overline{BP_0^*}$ ($=\overline{P_0}$) of the cumulative carry propagate signal, and the cumulative carry generate signal $BG_0^*$ ($=G_0$).

In the third block the real sum signal $F_2$ is generated by the inverted signal $\overline{C_{-1}}$ of the real carry signal, the inverted signal $\overline{BP_1^*}$ of the cumulative carry propagate signal (generated from $P_0$ and $P_1$), the cumulative carry generate signal $BG_1^*$ (generated from $G_0$, $G_1$, and $P_1$), and the carry propagate signal $P_2$.

In the fourth block, the real sum signal $F_3$ is generated by the inverted signal $\overline{C_{-1}}$ of the real carry signal, the inverted signal $\overline{BP_2^*}$ of the cumulative carry propagate signal (generated from $P_0$, $P_1$, and $P_2$), the cumulative carry generate signal $BG_2^*$ (generated from $G_0$, $G_1$, $G_2$, $P_1$, and $P_2$), and the carry propagate signal $P_3$.

In the fifth block, the cumulative carry propagate signal $BP_3^*$ and the cumulative carry generate signal $BG_3^*$ relating to the 3rd bit (that is, the highest digit in the first block) are generated.

As explained above, the real sum signals $F_0$, $F_1$, $F_2$, and $F_3$ in one block are directly generated without generating in parallel both the presumed sum signals $F_i(0)$ and $F_i(1)$. Therefore, there is no need as in the past for the first MPX circuit 102 (FIG. 1). Note that the present invention is similar to the prior art in the point that the cumulative carry propagate signal $BP_3^*$ and the cumulative carry generate signal $BG_3^*$ are input to the BLACG circuit 105 for carry look ahead processing.

Above, the explanation was made with respect to one CSA circuit $101_{a-1}$, but the same construction applies to a CSA circuit dealing with other blocks, so an explanation thereof is omitted.

According to the first example of the first embodiment, it is possible to cut down seven gates worth of circuit elements per 4 bits in the portion (CSA circuit 101a) generating the real sum signal $F_1$. In the overall ALU of FIG. 6, it is possible to reduce the conventional 1152 gates to 1040 gates. Further, the ALU of FIG. 6 has many real carry signal generating circuits (BLACG circuits 105 and second MPX circuits 104), so overall there is only a reduction of about 10 percent, but by applying the same concept as the present invention to these generating circuits, it is possible to reduce them in number to half or less, so in the final analysis it is possible to achieve a reduction of over 20 percent.

Figure 8:
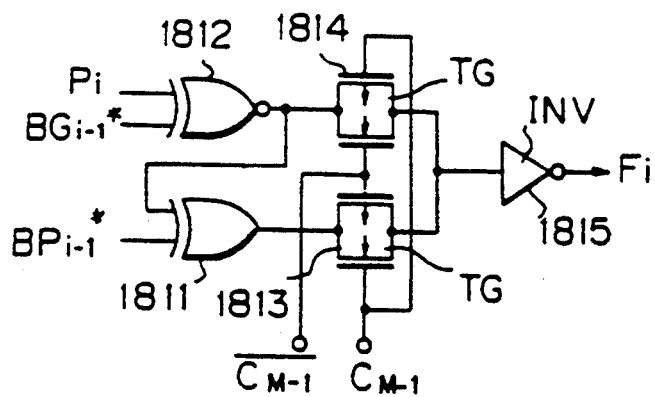
FIG. 8 is a circuit diagram showing a first modification of the real sum signal generating circuit shown in FIG. 7(b)

FIG. 8 shows a first modification of the real sum generating circuit shown in FIG. 7(b). This FIG. 8 shows the portion generating the real sum signal $F_i$ using the real carry signal $C_{M-1}$, the carry propagate signal $P_i$, the cumulative carry propagate signal $BP_{i-1}^*$, and cumulative carry generate signal $BG_{i-1}^*$. The other portions are omitted.

As shown in FIG. 8, the real sum signal generating unit 108 comprises an EOR circuit 1811, an ENOR circuit 1812, a first and a second transfer gate circuits 1813 and 1814, and an inverter circuit 1815. A first input of the EOR circuit 1811 is supplied with a cumulative carry propagate signal $BP_{i-1}^*$, a first input of the ENOR circuit 1812 is supplied with a cumulative carry generate signal $BG_{i-1}^*$, and a second input of the ENOR circuit 1812 is supplied with a carry propagate signal $P_i$. An output of the EOR circuit 1811 is connected to an input of the first transfer gate circuit 1813, and an output of the ENOR circuit 1812 is connected to a second input of the EOR circuit 1811 and an input of the second transfer gate circuit 1814. A first control gate of the first transfer gate circuit 1813 and a second control gate of the second transfer gate circuit 1814 are connected and supplied with a real carry signal $C_{M-1}$, a second control gate of the first transfer gate circuit 1813 and a first control gate of the second transfer gate circuit 1814 are connected and supplied with an inverted real carry signal $C_{M-1}$. Outputs of the first and second transfer gate circuits 1813 and 1814 are commonly connected to an input of the inverter circuit 1815, and the inverter circuit 1815 outputs a real sum signal $F_i$.

This first modification of the first embodiment generates the inverted signal $\overline{F_i(0)}$ of the presumed sum signal by the ENOR circuit from the carry propagate signal $P_i$ and the cumulative carry generate signal $BG_{i-1}^*$ and generates the inverted signal $\overline{F_i(1)}$ of the presumed sum signal by the EOR circuit from the presumed sum signal $\overline{F_i(0)}$ and the cumulative carry propagate signal $BP_{i-1}^*$. This circuit selects one of the $\overline{F_i(0)}$ and the $\overline{F_i(1)}$ by the real carry signal $C_{M-1}$ to the said CSA circuit 101a by the switch action of the transfer gate TG to obtain the real sum signal $F_i$.

This circuit is the same as in the prior art (FIG. 2) regarding the method of selection of the real carry signal $C_{M-1}$ of either of the presumed sum signals of the case where the carry signal $C_{M-1}$ is "0" and where $C_{M-1}$ is "1", but differs in the point that it does not, like in the prior art method, take the presumed sum signal $F_i(1)$ of the case where $C_{M-1}$ is "1" calculated in the equal of $$F_i(1) = P_i \Delta C_{i-1}(1)$$

by using the presumed carry signal $C_{i-1}(1)$ in the case where $C_{M-1}$ is "1". The presumed carry signal $C_{1-1}(0)$ in the case where the $C_{M-1}$ is "0" is equal to the cumulative carry generate signal $BG_{i-1}^*$, so the generation of the presumed sum signal $F_i(0)$ is the same as in the past.

Therefore, the difference in the circuit construction from the prior art lies in the circuit for generating the cumulative carry propagate signal $BP_{i-1}^*$ and the circuit for generating a carry signal $C_{i-1}(1)$.

According to the above first modification of the first embodiment, considering the number of processing bits per one CSA circuit 101a (m=4), while the present modification requires only three gates for the generation of the cumulative carry propagate signal $BP_{i-1}^*$, the generation of the carry signal $C_{i-1}(1)$ in the prior art requires as many as eight gates. In the present embodiment, it is possible to immediately obtain the real sum signal $F_i$ by the selection operation by the real carry signal $C_{M-1}$, so it is possible to have the same high speed processing as in the prior art.

Note that in general the carry propagate signal $P_i$ and the carry generate signal $G_i$ do not become "1" simultaneously. Using the fact that $BP_i^*$ and $BG_i^*$ do not simultaneously become "1", from equations (5) and (6), equation (7) is modified to the following to construct a logical circuit:

$$F_i = \begin{bmatrix} F_i(0) = P_i \oplus BG_{i-1}^* \\ (\text{where, } C_{M-1} = \text{"0"}) \\ F_i(1) = P_i \oplus (BG_{i-1}^* \oplus BP_{i-1}^*) \\ (\text{where, } C_{M-1} = \text{"1"}) \end{bmatrix} \quad (8)$$

Figure 9:
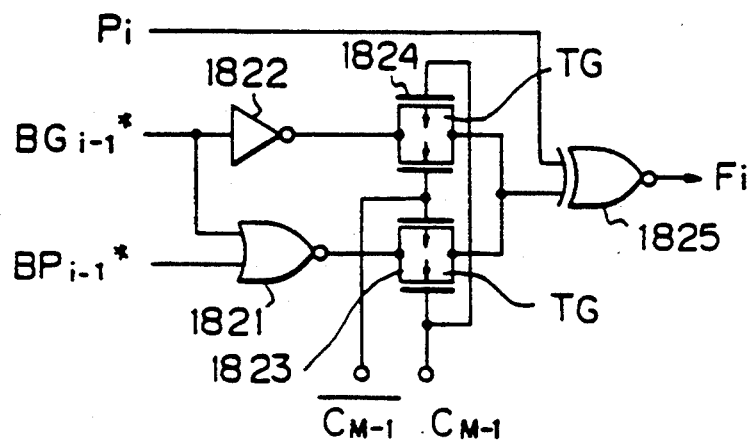
FIG. 9 is a circuit diagram showing a second modification of the real sum signal generating circuit shown in FIG. 7(b)

FIG. 9 shows a second modification of the first embodiment. FIG. 9 shows only the important portions in the same way as FIG. 8.

As shown in FIG. 9, the real sum signal generating unit 108 comprises a NOR circuit 1821, an inverter circuit 1822, a first and a second transfer gate circuits 1823 and 1824, and an ENOR circuit 1825. A first input of the NOR circuit 1821 is supplied with a cumulative carry propagate signal $BP_{i-1}^*$, a second input of the NOR circuit 1821 and an input of the inverter circuit 1822 are connected and supplied with a cumulative carry generate signal $BG_{i-1}^*$. AN output of the NOR circuit 1821 is connected to an input of the first transfer gate circuit 1823, and an output of the inverter circuit 1822 is connected to an input of the second transfer gate circuit 1824. A first control gate of the first transfer gate circuit 1823 and a second control gate of the second transfer gate circuit 1824 are connected and supplied with a real carry signal $C_{M-1}$, a second control gate of the first transfer gate circuit 1823 and a first control gate of the second transfer gate circuit 1824 are connected and supplied with an inverted real carry signal $\overline{C_{m-1}}$. Outputs of the first and second transfer gate circuits 1823 and 1824 are commonly connected to a first input of the ENOR circuit 1825 and a second input of the ENOR circuit 1825 is supplied with a carry propagate signal $P_i$, and the ENOR circuit 1825 outputs a real sum signal $F_i$.

This second modification of the first embodiment taken note of the fact that the presumed sum signal $F_i(0)$ and $F_i(1)$ are generated by taking the EOR of the carry propagate signal $P_i$ and the cumulative carry generate signal $\overline{BG_{i-1}*}$ and $\overline{(BG_{i-1}*+BP_{i-1}*)}$, first selects one of the $BG_{i-1}*$ and $(BG_{i-1}*+BP_{i-1}*)$ by the real carry signal $C_{M-1}*$, then takes the ENOR of the selected signal and $P_i$ and generates the true sum signal $F_i$.

According to the second modification of the first embodiment, it is possible to save 1.5 gates per digit compared with the first modification (FIG. 8). However, from the standpoint of the operation speed, since not only a selector (transfer gate), but also an ENOR circuit are interposed after the generation of the real carry signal $C_{M-1}$, the delay time contributes to the delay time in the worst case and the operation is delayed by that amount. However, in the case of a 1 to 1.5 μm CMOS, the delay time in the worst case required for 64-bit full addition is 15 to 20 nsec in the construction of the first modification of the first embodiment (FIG. 8), while the delay time of one EOR or ENOR stage of the present modification is about 1 nsec, which is not a critical defect for a high speed adder.

Figure 10:
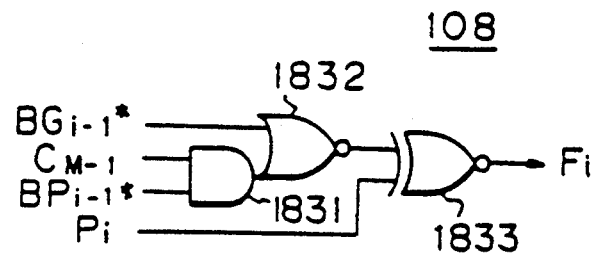
FIG. 10 is a circuit diagram showing a third modification of the real sum signal generating circuit shown in FIG. 7(b)

FIG. 10 shows a third modification of the first embodiment. FIG. 10 shows only the important portions in the same way as FIG. 8.

As shown in FIG. 10, the real sum signal generating unit 108 comprises an AND circuit 1831, a NOR circuit 1832 and an ENOR circuit 1833. A first input of the AND circuit 1831 is supplied with a cumulative carry propagate signal $BP_{i-1}*$, a second input of said AND circuit is supplied with a real carry signal $C_{M-1}$, and an output of the AND circuit 1831 is connected to a first input of the NOR circuit 1832, a second input of the NOR circuit 1832 is supplied with a cumulative carry generate signal $BG_{i-1}*$. A first input of the ENOR circuit 1833 is supplied with a carry propagate signal $P_i$ and an output of the NOR circuit 1832 is connected to a second input of the ENOR circuit 1833, and the ENOR circuit 1833 outputs a real sum signal $F_i$.

The third modification of the first embodiment shows an example of the case of modification of equation (7) as shown by the following equation (9):

$$F_i = P_i \oplus \overline{(\overline{BG_{i-1}*} + BP_{i-1}* \cdot C_{M-1})} \quad (9)$$
$$= P_i \oplus (BG_{i-1}* + BP_{i-1}* \cdot C_{M-1})$$

According to the third modification of the first embodiment, in circuit construction, it is possible to further cut one gate per digit compared with the second modification (FIG. 9). While the third modification is somewhat slower from the standpoint of the operation speed, the difference is at the most 1 nsec or so, which does not pose a problem in practice.

Figure 11:
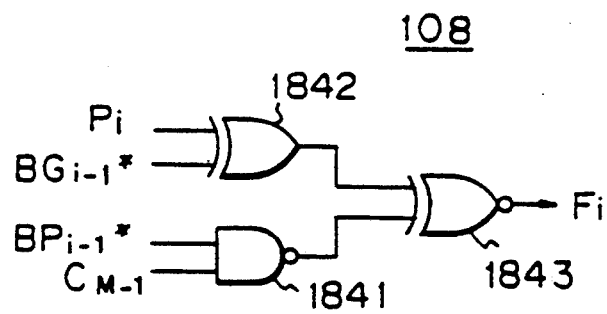
FIG. 11 is a circuit diagram showing a fourth modification of the real sum signal generating circuit shown in FIG. 7(b)

FIG. 11 shows a fourth modification of the first embodiment. FIG. 11 shows just the important portions in the same way as FIG. 8.

As shown in FIG. 11, the real sum signal generating unit 108 comprises a NAND circuit 1841, an EOR circuit 1842 and an ENOR circuit 1843. A first input of the NAND circuit 1841 is supplied with a real carry signal $C_{M-1}$ and a second input of the NAND circuit 1841 is supplied with a cumulative carry propagate signal $BP_{i-1}*$. A first input of the EOR circuit 1842 is supplied with a cumulative carry generate signal $BG_{i-1}*$ and a second input of the EOR circuit 1842 is supplied with a carry propagate signal $P_i$. An output of the NAND circuit is connected to a first input of the ENOR circuit 1843 and an output of the EOR circuit 1842 is connected to a second input of the ENOR circuit 1843, and the ENOR circuit 1843 outputs a real sum signal $F_i$.

The fourth modification of the first embodiment shows an example of the case of modification of equation (9) to the following:

$$F_i = P_i + BG_{i-1}* + \overline{BP_{i-1}* \cdot C_{M-1}} \quad (10)$$

According to the fourth modification of the first embodiment, in circuit construction, there is an increase of one gate compared with the second modification (FIG. 9), but the fourth modification is somewhat faster from the standpoint of the operation speed (difference of 0.5 nsec or less).

Note that the circuit of the fourth modification of the first embodiment is substantially the same as that used in the broken line portion shown in the first embodiment (FIG. 7).

Figure 12:
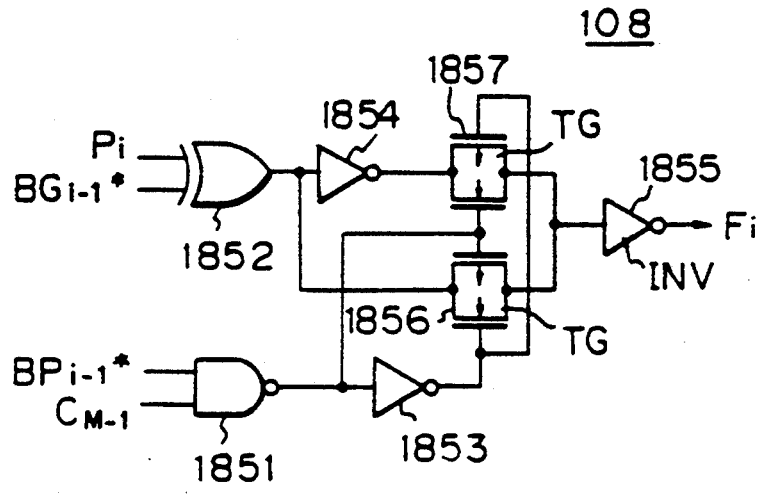
FIG. 12 is a circuit diagram showing a fifth modification of the real sum signal generating circuit shown in FIG. 7(b)

FIG. 12 shows a fifth modification of the first embodiment. FIG. 12 shows only the important portions in the same way as FIG. 8.

As shown in FIG. 12, the real sum signal generating unit 108 comprises a NAND circuit 1851, an EOR circuit 1852, a first, a second and a third inverter circuits 1853, 1854 and 1855, and a first and a second transfer gate circuits 1856 and 1857. A first input of the NAND circuit 1851 is supplied with a real carry signal $C_{M-1}$ and a second input of a NAND circuit 1851 is supplied with a cumulative carry propagate signal $BP_{i-1}*$. A first input of the EOR circuit 1852 is supplied with a cumulative carry generate signal $BG_{i-1}*$ and a second input of the EOR circuit 1852 is supplied with a carry propagate signal $P_i$. An output of the NAND circuit 1851 is commonly connected to an input of the first inverter circuit 1853, a second control gate of the first transfer gate circuit 1856 and a first control gate of the second transfer gate circuit 1857. An output of the EOR circuit 1852 is commonly connected to an input of the second inverter circuit 1854 and an input of the first transfer gate circuit 1856. An output of the first inverter circuit 1853 is commonly connected to a first control gate of the first transfer gate circuit 1856 and a second control gate of the second transfer gate circuit 1857. An output of the second inverter circuit 1854 is connected to an input of the second transfer gate circuit 1857. The outputs of the first and second transfer gate circuits 1856 and 1857 are commonly connected to an input of the third inverter circuit 1855, and the third inverter circuit 1855 outputs a real sum signal $F_i$.

The fifth modification of the first embodiment is substantially the same circuit as the circuit of the fourth modification (FIG. 11) except that the ENOR circuit for obtaining the real sum signal $F_i$ is changed to a transfer gate TG (selector).

According to the fifth modification of the first embodiment, in circuit construction, the number of elements is the same as in FIG. 11 and the operation speed is somewhat faster.

Above, according to the first to fifth modifications of the first embodiment of the present invention shown in FIG. 8 to FIG. 12, no matter what circuit constructions are employed, it is possible to construct a parallel full adder having about the same processing speed as in the prior art with fewer elements than in the prior art construction (FIG. 1). The elements are reduced most in the case of the construction of FIG. 10, but the time required for generation of the real sum signal $F_i$ after the generation of the real carry signal $C_{M-1}$ is longer compared with the other circuits, so application is suitably for circuit portions not requiring relatively high speeds. The circuit of FIG. 8 is higher in speed than the other circuits, but the number of elements is greater, so application is desirably to CSA circuits where time is taken for generation of the real carry signal $C_{M-1}$.

Further, when the data length is long, such as in a 64-bit full adder, for the carry processing of the ALU of FIG. 6, the output signal of the second MPX circuit 104 is transmitted to the higher digits by the ripple carry method, so the time required for generating the real carry signal $C_{M-1}$ is longer in the case of a higher digit than a lower digit. Therefore, by utilizing this time difference and using the circuit of FIG. 10 in the CSA circuit 101a at the lower digits (for example, the 0th to 47th digits) and using the circuit of FIG. 8 or FIG. 12 in the CSA circuit 101a of the higher digits (for example, 48th to 63rd digits), it is possible to cut down on the overall number of circuit elements without increasing the delay time in the worst case.

FIGS. 13(a) and 13(b) are diagrams of a second example of the CSA circuit according to the first embodiment. FIG. 13(a) shows a symbolized view of the CSA circuit 101b of the present embodiment and FIG. 13(b) shows a detailed circuit diagram of the same.

While the CSA circuits 101a shown in FIGS. 7 to 12 were constructed of NAND, NOR, inverter, EOR and ENOR circuits using CMOS transistors, the CSA circuit 101b of the second example replaces most of these with chain circuits of the wired OR circuits of transfer gates TG and inverter circuits INV to secure equivalent functions as with the CSA circuits 101a.

The construction will be explained next. The CSA circuit 101b roughly comprises of six blocks.

The first block is a circuit 106 for generating the cumulative carry propagate signal $BP_i^*$. Here, the cumulative carry propagate signal $BP_i^*$ is given by:

$$BP_i^* = \prod_{\alpha=0}^{i} P_\alpha \qquad (10)$$

This $BP_i^*$ generating circuit 106 gives the carry propagate signal $P_0$ of the 0-th digit (smallest digit) held within the CSA circuit 101b to the input terminal of the chain circuit of the transfer gate circuit TG for each stage, controls the ON-OFF state of the transfer gate circuit TG dealing with the digits (i=0, 1, 2, 3) by the carry propagate signal $P_i$ of the digits, generates a signal corresponding to "0" in the digit where the transfer gate circuit TG becomes OFF, and successively conveys it to the higher digits.

As shown in FIG. 13(b), the cumulative carry propagate signal generating unit 106, the cumulative carry generate signal generating unit 107 and the real sum signal generating unit 108 comprise a chain circuit mutually connected with a transfer gate circuit and an inverter circuit.

The conveyed signal is inverted with each stage of the inverter circuits passed through, so the circuit is comprised so that by the generation of the above-mentioned "0" corresponding signal, a "0" corresponding signal is conveyed to the higher digits at digits where a noninverted signal of the cumulative carry propagate signal $BP_i^*$ is conveyed and a "1" corresponding signal is conveyed at digits where the inverted signal of the cumulative carry propagate signal $BP_i^*$ is conveyed. Together with the polarity of the cumulative carry propagate signal $BP_i^*$, the circuits generating the cumulative carry propagate signal $BP_i'$ adjusted by the carry signal $C_{-1}$ may be used differentiated as to NAND and NOR types. Here, $BP_i'$ is given by:

$$BP_i' = BP_i^* \cdot C_{-1} \qquad (11)$$

In this way, the $BP_i^*$ generating circuit 106 receives as input the carry propagate signals $P_i$, $\overline{P_i}$ and the carry signal $C_{-1}$ of the digits and generates the cumulative carry propagate signal $BP_i^*$, $BP_i'$, and $\overline{BP_i'}$. The signals $BP_i'$ and $\overline{BP_i'}$ are used as input signals of the later mentioned real sum signal generating circuits.

The logic "0" corresponding signal generated here is sent to the chain circuit through the MOS transistor MOST. AT the digits where the signal on the chain circuit sent to the said digit (that is, the cumulative carry propagate signal $BP_i^*$) is sent noninverted through the n-type MOST, the "0" signal ($V_{SS}$ potential) is generated at the said node of the chain circuit and at the digits where $BP_i^*$ is sent inverted, the "1" signal ($V_{DD}$ potential) is generated through the p-type MOST.

The outputs at the digits of the $BP_i^*$ generating circuit (chain circuit) are used for the generation of the i-th digit signal $$BP_i' = BP_i^* \cdot C_{M-1}$$

and its inverted signal together with the real carry signal $C_{M-1}$ from the lower digit. The signal $BP_i'$ becomes the input signal of the circuit 108 for generating the i-th digit real sum signal $F_i$ using the relationship of:

$$F_i = P_i + BG_{i-1}^* + BP'_{i-1}$$

The second block is the circuit 107 for generating the cumulative carry generate signal $BG_i^*$. Here, the cumulative carry generate signal $BG_i^*$ is given by:

$$BG_i^* = G_i + \sum_{\alpha=0}^{i-1} \left( \prod_{\beta=\alpha+1}^{i} P_\beta \right) \cdot G_\alpha \qquad (12)$$

(where, $i = 0, 1, 2, 3$)

This $BG_i^*$ generating circuit 107 is also comprised of a chain circuit of an inverter circuit INV and a transfer gate circuit TG in the same way as the above-mentioned $BP_i^*$ generating circuit 106. The $BG_i^*$ generating circuit 107 also controls the ON-OFF state of the transfer gate circuit TG of the digits by the carry propagate signal $P_i$ ($P_0$, $P_1$, $P_2$, and $P_3$) for each digit. At the digits where the transfer gate circuit TG becomes OFF, a signal corresponding to the carry generate signal $G_i$ ($G_0$, $G_1$, $G_2$, and $G_3$) is generated at the transfer gate dealing with the digit and successively conveyed to the higher digits. The signal corresponding to the carry generate signal $G_i$ generated here becomes $G_i$ at the digits where the signal sent to that digit (that is, the cumulative carry generate signal $BG_i^*$) is sent noninverted and is $\overline{G_i}$ at the digits where $BG_i^*$ is sent inverted.

In this way, the $BG_i^*$ generating circuit 107 receives as input the carry propagate signal $P_i$ and the carry generate signal $G_i$ of the digits and generates the cumulative carry generate signal $BG_i^*$, $\overline{BG_i^*}$ and the inverted signal $\overline{P_i}$ of the carry generate signal $P_i$.

$BG_i^*$ and $\overline{BG_i^*}$ are used as input signals of the later mentioned real sum signal generating circuits 108. $\overline{P_i}$ is used as the input signal of the $BP_i^*$ generating circuit 106 and the real sum signal generating circuit 108.

The third block is a circuit for generating the real sum signal $F_0$ of the 0-th digit (lowest digit in the block), the fourth block is a circuit for generating the real sum signal $F_1$ of the first digit, the fifth block is a circuit for generating the real sum signal $F_2$ of the second digit, and the sixth block is a circuit for generating the real sum signal $F_3$ of the third digit (highest digit in the block). The real sum signal generating circuits output the real sum signals $F_i$ based on the carry propagate signals $\overline{P_i}$, $P_i$, $BP'_{i-1}$, $\overline{BP'_{i-1}}$, and the cumulative carry generate signals $BG_{i-1}^*$, $\overline{BG_{i-1}^*}$ of the corresponding digits.

Note that in FIG. 13(b), the inverter INV is inserted for each stage of the transfer gates TG, but that the circuit may be comprised with it inserted with every two or three stages or combined with the same.

According to the second example of the first embodiment, it is possible to cut down on 10 gates' worth of elements compared with the CSA circuits, 101a shown in FIGS. 7 to 12 and further it is possible to reduce the number of elements to about 64 percent of a circuit of a combination of the prior CSA circuit 101 and first MPX circuit 102. In this way, by making the cumulative carry propagate signal $BP_i^*$ and the cumulative carry generate signal $BG_i^*$ generated by the chain of the transfer gate TG and the inverter INV and, further, by making the circuits for generating the real sum signal $F_i$, that is, the EOR circuit and ENOR circuits, also comprises of combinations of transfer gates TG and inverters INV, it is possible to considerably reduce the number of the elements while maintaining an equivalent adding speed as in the prior art. Further, by optimizing the construction, there is the possibility of achieving a higher speed of operation.

The above-mentioned first and second examples, and first to fifth modification of the first embodiments show examples of parallel full adders, by the present invention can also be applied to parallel full subtracters of a second embodiment (not illustrated).

In the second embodiment of a parallel full subtracter using A as the minuend and B as the subtrahend, the carry propagate signal $P_i$ as spoken of in the case of an adder becomes a "borrow propagate signal" and the carry generate signal $G_i$ becomes a "borrow generate signal". The borrow propagate signal $P_i$ in this case is given by the ENOR of $$P_i = \overline{A_i + B_i} \qquad (3)'$$

Further, the borrow generate signal $G_i$ is given by $$G_i = \overline{A_i} \cdot B_i \qquad (4)'$$

Further, the cumulative carry propagate signal $BP_i^*$ is used as the "cumulative borrow propagate signal" and the cumulative carry generate $BG_i^*$ is used as the "cumulative borrow generate signal" and, in addition, the carry signal $C_{M-1}$ is used as the "borrow signal $C_{M-1}$" and the operation is performed successively from the lowest digit (in the case of 64 bits, the 0-th digit) to the highest digit (63-rd digit). With such a signal setting, it is possible to construct a parallel full subtracter using the circuits shown in FIGS. 7 to 13 and obtain the real difference signal $F_i$ corresponding to an inverted signal of the real sum signal $F_i$ in those circuits. Therefore, a detailed explanation will be omitted.

Figure 14:
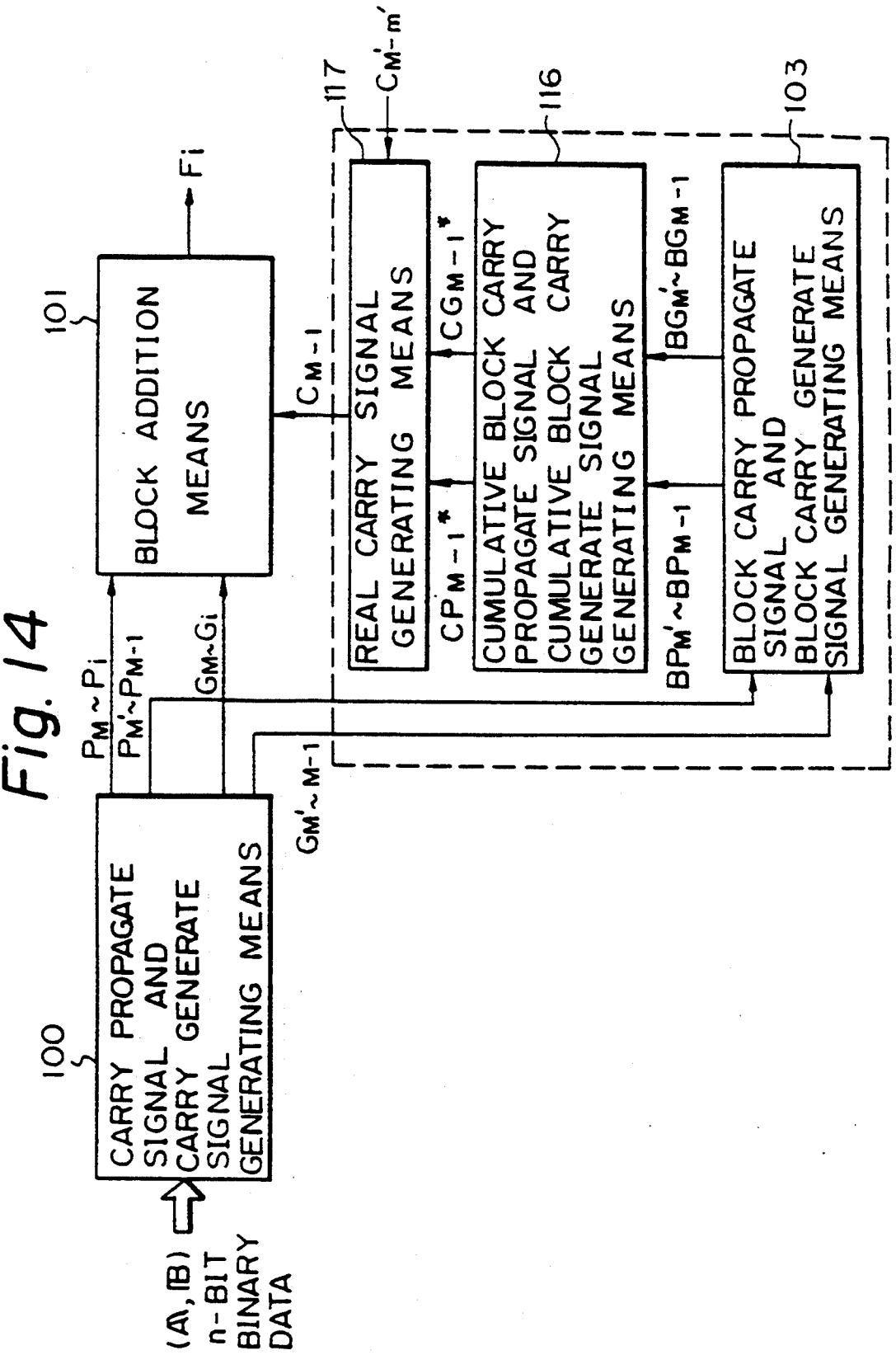
FIG. 14 is a block diagram showing a third embodiment of a binary operator according to the present invention.

FIG. 14 is a block diagram showing a third embodiment of a binary operator according to the present invention. As shown in FIG. 14, the parallel full adder, or binary operator, according to the present invention is a binary operator which receives an input two pieces of n-bit binary data (A, B) and is provided with a means (100) which generates a carry propagate signal ($P_i$) and a carry generate signal ($G_i$) of various digits, a means (101) which divides the aforementioned two pieces of n-bit binary data (A, B) into blocks of predetermined numbers of bits, engages in parallel processing based on the aforementioned carry propagate signal ($P_i$) and carry generate signal ($G_i$) corresponding to the blocks of data and a real carry signal ($C_{M-1}$), and thus calculates the arithmetic sum of the aforementioned two pieces of n-bit binary data (A, B) and generates a real sum signal ($F_i$), and a means (103) which generates a block carry propagate signal ($BP_i$) and a block carry generate signal ($BG_i$) corresponding to the above-mentioned blocks based on the above-mentioned carry propagate signal ($P_i$) and the carry generate signal ($G_i$), which is provided with a means (116) for generating a cumulative block carry propagate signal ($CP_{M-1}^*$) and cumulative block carry generate signal ($CG_{M-1}^*$) based on the above-mentioned block carry propagate signals ($BP_{M'}$-$BP_{M-1}$) and block carry generate signals ($BG_{M'}$ to $BG_{M-1}$) and a means (117) for generating a real carry signal ($C_{M-1}$) from the above-mentioned cumulative block carry propagate signal ($CP_{M-1}^*$), cumulative block carry generate signal ($CG_{M31\ 1}$), and the carry signal ($C_{M'-m'}$) to the said block.

Figure 15:
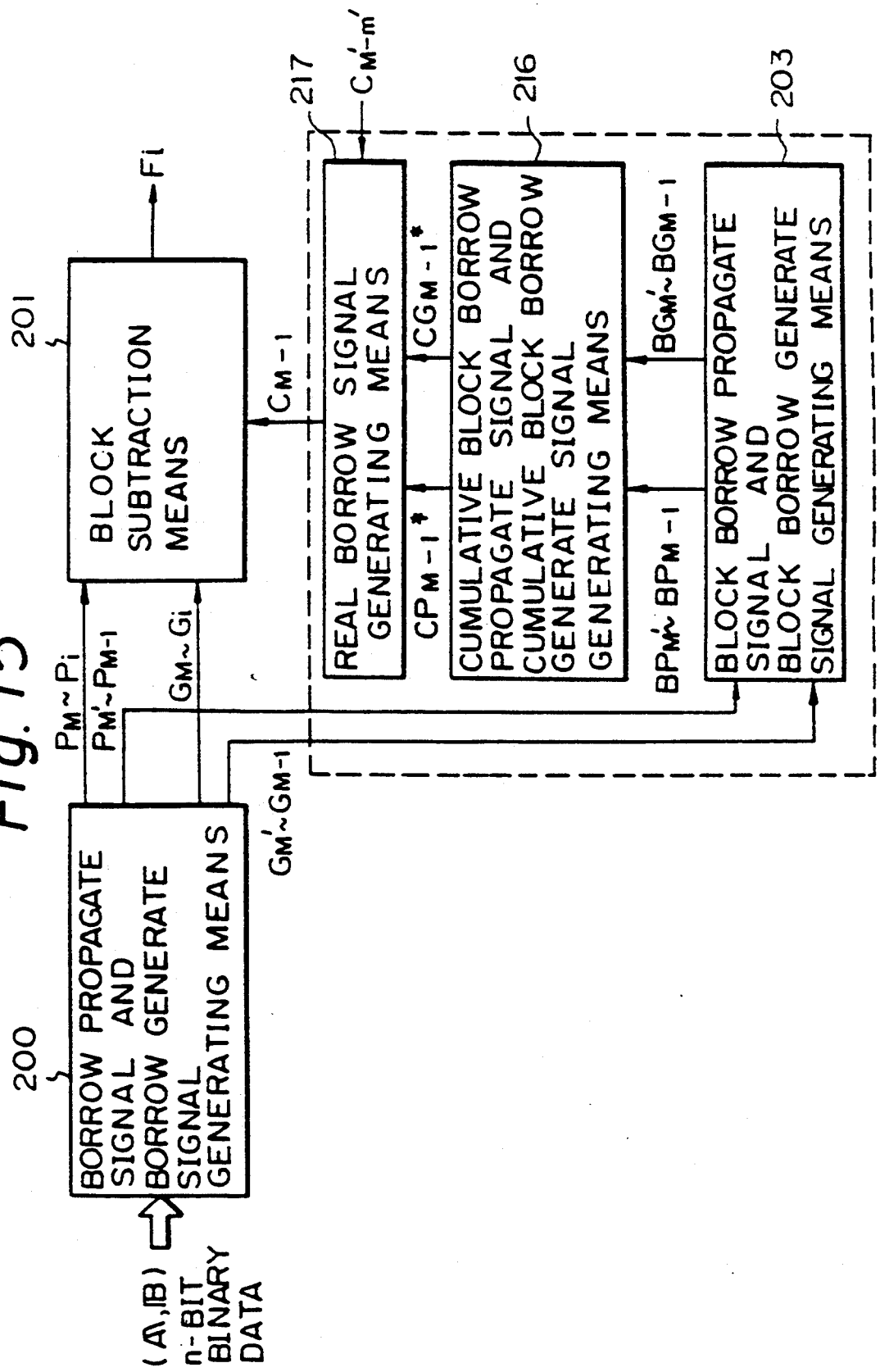
FIG. 15 is a block diagram showing a fourth embodiment of a binary operator according to the present invention.

FIG. 15 is a block diagram showing a fourth embodiment of a binary operator according to the present invention. As shown in FIG. 15, the parallel full subtracter, or binary operator, according to the present invention, is a binary operator which receives as input two pieces of n-bit binary data (A, B) and is provided with a means (22) which generates a borrow propagate signal ($P_i$) and a borrow generate signal ($G_i$) of various digits, a means (201) which divides the aforementioned two pieces of n-bit binary data (A, B) into blocks of predetermined numbers of bits, engages in parallel processing based on the aforementioned borrow propagate signal ($P_i$) and borrow generate signal ($G_i$) corresponding to the blocks of data and a real borrow signal ($C_{M-1}$), and thus calculates the arithmetic difference of the aforementioned two pieces of n-bit binary data (A, B) and generates a real difference signal ($F_i$), and a means (203) which generates a block borrow propagates signal ($BP_i$) and a block borrow generate signal ($BG_i$) corresponding to the above-mentioned blocks based on the above-mentioned borrow propagate signal ($P_i$) and the borrow generate signal ($G_i$), which is provided with a means (216) for generating a cumulative block borrow propagate signal ($CP_{M-1}*$) and cumulative block borrow generate signal ($CG_{M-1}*$) based on the above-mentioned block borrow propagate signals ($BP_{M'}$ to $BP_{M-1}$) and block borrow generate signals ($BG_{M'}$ to $BG_{M-1}$) and a means (217) for generating a real borrow signal ($C_{M-1}$) from the above-mentioned cumulative block borrow propagate signal ($CP_{M-1}*$), cumulative block borrow generate signal ($CG_{M-1}*$), and the borrow signal ($C_{M'-m'}$) to the said block.

In the parallel full adder shown in FIG. 14, when two pieces of n-bit binary data (A, B) are input, a carry propagate signal ($P_i$) and carry generate signal ($G_i$) are output from the carry propagate signal and carry generate signal generating means (100).

The carry propagate signal ($P_i$) and the carry generate signal ($G_i$) are respectively applied to a block addition means (101) and to a block carry propagate signal and block carry generate signal generating means (103).

At the block addition means (101), presumed sum signals $F_i(0)$ and $F_i(1)$ are generated based on the input carry propagate signal ($P_i$) and carry generate signal ($G_i$). The presumed sum signal $F_i(0)$ is the signal which is generated in advance envisioning the case of the carry signal from the lower block ($C_{M-1}$) being "0" and the presumed sum signal $F_i(1)$ that in the case of the carry signal ($C_{M-1}$) being "1".

In the block carry propagate signal and block carry generate signal generating means (103), the block carry propagate signal ($BP_i$) and the block carry generate signal ($BG_i$) corresponding to the block addition means (101) are generated based on the carry propagate signal ($P_i$) and the carry generate signal ($G_i$) and are output to the cumulative block carry propagate signal and cumulative block carry generate signal generating means 116.

The cumulative block carry propagate signal and cumulative block carry generate signal generating means (116) generates the cumulative block carry propagate signal ($CP_{M-1}*$) and cumulative block carry generate signal ($CG_{M-1}*$) and outputs them to the real carry signal generating means (117).

The real carry signal generating means (117) generates the real carry signal ($C_{M-1}$) based on the cumulative block carry propagate signal ($CP_{M-1}*$), cumulative block carry generate signal ($CG_{M-1}*$), and the carry signal ($C_{M'-m'}$) from the lower block and sends it to the above-mentioned block addition means (101) as the selection signal for the pregenerated presumed sum signals $F_i(0)$ or $F_i(1)$.

Next, the block addition means (101) selects one of the presumed sum signals $F_i(0)$ or $F_i(1)$ in accordance with the content of the above-mentioned real carry signal ($C_{M-1}$) and outputs the selected sum signal as the real sum signal ($F_i$).

In summary, the third embodiment of the present invention does not simultaneously generate two presumed carry signals $C_i(0)$ and $C_i(1)$ and select and output the same as in the prior art, but uses the $CP_{M-1}*$, $CG_{M-1}*$, and real carry signal ($C_{M'-m'}$) to directly generate the real carry signal ($C_{M-1}$).

In the parallel full subtracter shown in FIG. 15, when two pieces of n-bit binary data (A, B) are input, a borrow propagate signal ($P_i$) and borrow generate signal ($G_i$) are output from the borrow propagate signal and borrow generate signal generating means (200).

The borrow propagate signal ($P_i$) and the borrow generate signal ($G_i$) are respectively applied to a block subtraction means (201) and to a block borrow propagate signal and block borrow generate signal generating means (203).

At the block subtraction means (201), presumed difference signals $F_i(0)$ and $F_i(1)$ are generated based on the input borrow propagate signal ($P_i$) and borrow generate signal ($G_i$). The presumed difference signal $F_i(0)$ is the signal which is generated in advance envisioning the case of the borrow signal from the lower block ($C_{M-1}$) being "0" and the presumed difference signal $F_i(1)$ that in the case of the borrow signal ($C_{M-1}$) being "1".

In the block borrow propagate signal and block borrow generate signal generating means (203), the block borrow propagate signal ($BP_i$) and the block borrow generate signal ($BG_i$) corresponding to the block subtraction means (201) are generated based on the borrow propagate signal ($P_i$) and the borrow generate signal ($G_i$) and are output to the cumulative block borrow propagate signal and cumulative block borrow generate generating means (216).

The cumulative block borrow propagate signal and cumulative block borrow generate signal generating means (216) generates the cumulative block borrow propagate signal ($CP_{M-1}*$) and cumulative block borrow generate signal ($CG_{M-1}*$) and outputs them to the real borrow signal generating means (217).

The real borrow signal generating means (217) generates the real borrow signal ($C_{M-1}$) based on the cumulative block borrow propagate signal ($CP_{M-1}*$), cumulative block borrow generate signal ($CG_{M-1}*$), and the borrow signal ($C_{M'-m'}$) from the lower block and sends it to the above-mentioned block subtraction means (201) as the selection signal for the pregenerated presumed difference signals $F_i(0)$ or $F_i(1)$.

Next, the block subtraction means (201) selects one of the presumed difference signals $F_i(0)$ or $F_i(1)$ in accordance with the content of the above-mentioned real borrow signal ($C_{M-1}$) and output the selected difference signal as the real difference signal ($F_i$).

In summary, the fourth embodiment of the present invention does not simultaneously generate two presumed borrow signals $C_i(0)$ and $C_i(1)$ and select and output the same as in the prior art, but uses the $CP_{M-1}*$, $CG_{M-1}*$, and real borrow signal ($C_{M'-m'}$) to directly generate the real borrow signal ($C_{M-1}$).

Figure 16:
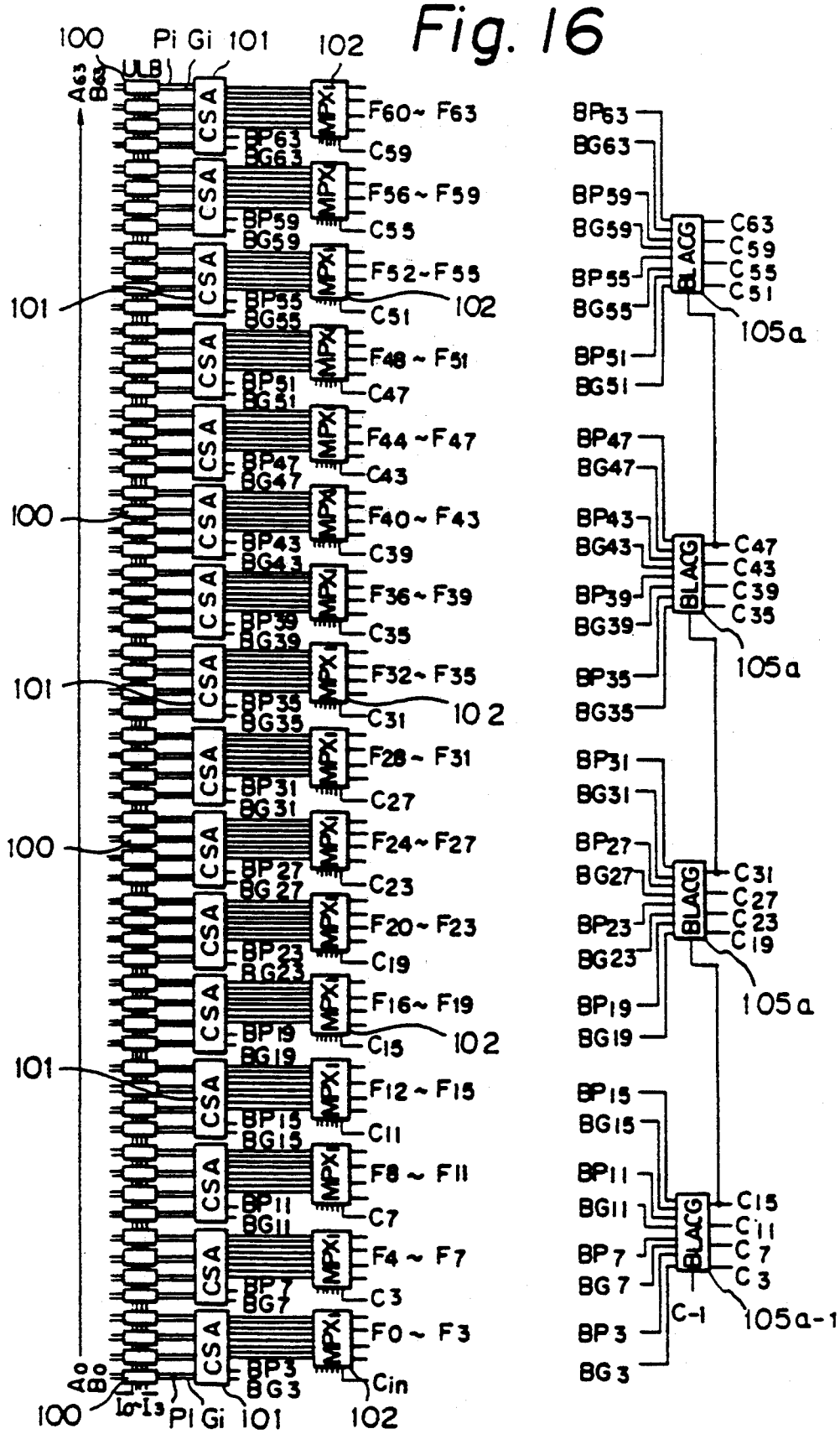
FIG. 16 is a block diagram showing a first example of application to a 64 bit ALU of a parallel full adder according to the third embodiment of the present invention.

To standardize the explanation, a circuit construction based on a prior 64-bit ALU (FIG. 1) is shown in FIG. 16. The explanation will be made based on this.

The CSA circuit 101, which is one block adder, is made one which simultaneously processes m digit (4 bit) signals. In the CSA circuit 101, wherein the lowest digit is the M-th digit, the block carry propagate signal $BP_i$ and the block carry generate signal $BG_i$ for the i-th digit are defined by the following equations (15) and (16).

$$BP_i = \prod_{\alpha=0}^{m-1} P_{M+\alpha} \tag{15}$$

$$BG_i = G_i + \sum_{\alpha=0}^{m-2}\left(\prod_{\beta=\alpha+1}^{m-1} P_{M+\beta}\right) \cdot G_{M+\alpha} \tag{16}$$

(where, $i = M+m-1$, $M = 0, m, 2m, 3m \ldots$)

The CSA circuit 101 having the M-th digit as the lowest digit generates the block carry propagate signal $BP_i$ and the block carry generate signal $BG_i$ given by the above-mentioned equations (15) and (16) and also generates the presumed sum signals $F_{i'}(0)$ and $F_{i'}(1)$. Here, the "i'" in the $F_{i'}(0)$ and $F_{i'}(1)$ equals M, M+1, . . . M+m−1, (M=0, m, 2m, 3m, . . . )

On the other hand, the BLACG circuit 105 divides the block carry propagate signal $BP_i$ and block carry generate signal $BG_i$ generated in the above way into q digits and processes the same as such. In the BLACG circuit 105 having the M'-th digit as the lowest digit, the cumulative block carry propagate signal $CP_i^*$ and the cumulative block carry generate signal $CG_i^*$ are defined by the following equations (17) and (18):

$$CP_i^* = \prod_{\alpha=0}^{I} BP_{M'+\alpha m} \qquad (17)$$

$$CG_i^* = BG_i + \sum_{\alpha=0}^{I-1} \left( \prod_{\beta=\alpha+1}^{I} BP_{M'+\beta m} \right) \cdot BG_{M'+\alpha m} \qquad (18)$$

(where, i=M', M'+m, M'+2m, . . . ,) M'+(q−1).m

I=(i−M')/m, M'=(kq+1)m−1 (k is an integer of 0 or more).
The cumulative block carry propagate signal $CP_i^*$ and cumulative block carry generate signal $CG_i^*$ and the real carry signal $C_{M'-m'}$ (carry signal from the lower block) to the sale BLACG circuit 105 have the following relationship (19) with the i-th digit real carry signal $C_i$:

$$C_i = CG_i^* + CP_i^* \cdot C_{M'-m'} \qquad (19)$$

In this way, the circuit does not generate the presumed carry signals $C_i(0)$ and $C_i(1)$ in advance and select and output one of the same by the carry signal $C_{M'-m'}$, but directly generates the i-th digit real carry signal $C_i$ by just the cumulative block carry propagate signal $CP_i^*$ and cumulative block carry generate signal $CG_i^*$ given by equations (17) and (18) and the carry signal $C_{M'-m'}$ to the BLACG circuit of the block. By this, it is possible to eliminate the redundant circuits mentioned above and it is possible to simplify the circuit. At this time, by giving consideration to minimize the time required from the time when the carry signal $C_{M'-m'}$ is input to the time when the real carry signal $C_i$ is generated (that is, the delay time), it is possible to simplify the circuit and to maintain the high speed.

FIG. 16 shows a summary of the third embodiment. The point of difference with the conventional FIG. 1 lies in the construction of the BLACG circuit 105a. The same construction is used for the other input data A, B, ULB circuit 100, CSA circuit 101, and first MPX circuit 102, so the same symbols are appended and explanations thereof are omitted.

The BLACG circuit 105a in the third embodiment differs from the conventional BLACG circuit 105 in the point that it does not generate in parallel the presumed carry signals $C_i(0)$ and $C_i(1)$ but newly introduces the cumulative block carry propagate signal $CP_i^*$ and the cumulative block carry generate signal $CG_i^*$ for each bit and directly calculates the real carry signal $C_i$.

Figures 17A, 17B:
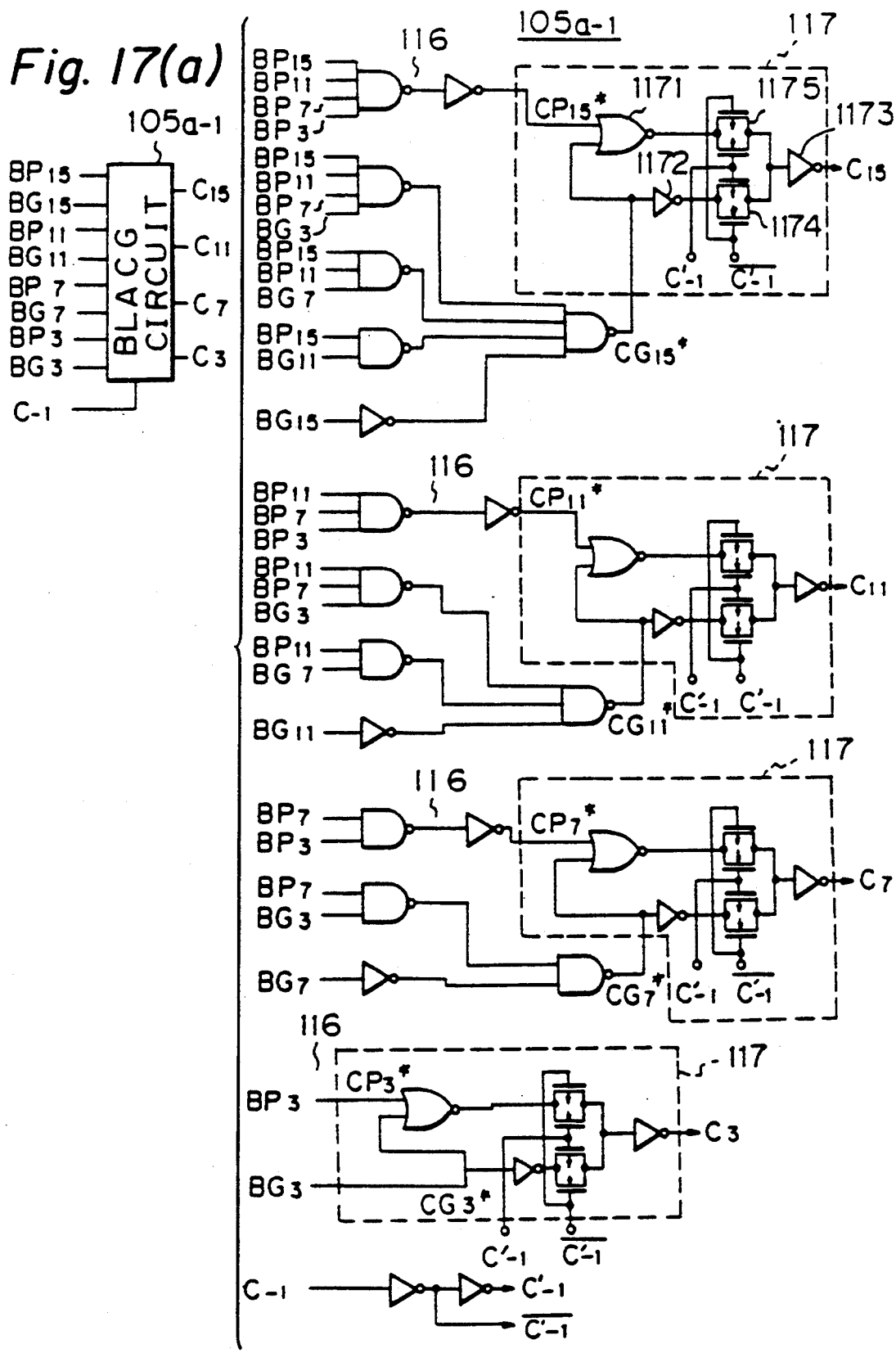
FIG. 17(a) is a block diagram showing a BLACG circuit in the parallel full adder shown in FIG. 16.
FIG. 17(b) is a circuit diagram showing a first example of the BLACG circuit shown in FIG. 17(a)

Next, FIGS. 17(a) and 17(b) show a first example of the BLACG circuit 105a according to the third embodiment. The FIGS. 17(a) and 17(b) show the example of the BLACG circuit $105_{a-1}$ dealing with the first block in FIG. 16, where FIG. 17(a) is a symbolized view and FIG. 17(b) is a detailed circuit diagram.

As shown in FIG. 17(b), the real carry signal generating unit 117 comprises a NOR circuit 1171, a first and a second inverter circuits 1172 and 1173, and a first and a second transfer gate circuits 1174 and 1175. An input of the first inverter circiut 1172 and a first input of the NOR circuit 1171 are connected and supplied with a cumulative block carry generate signal $CG_{15}^*$ ($CG_{11}^*$, $CG_7^*$, or a block carry generate signal $BG_3$), a second input of the NOR circuit 1171 is supplied with a cumulative block carry propagate signal $CP_{15}^*$ ($CP_{11}^*$, $CP_7^*$, or a block carry propagate signal $BP_3$). An output of the first inverter circuit 1172 is connected to an input of the first transfer gate circuit 1174 and an output of the NOR circuit 1171 is connected to an input of the second transfer gate circuit 1175. A first control gate of the first transfer gate circuit 1174 and a second control gate of the second transfer gate circuit 1175 are connected and supplied with an inverted real carry signal $\overline{C'_{-1}}$, a second control gate of the first transfer gate circuit 1174 and a first control gate of the second transfer gate circuit 1175 are connected and supplied with a real carry signal $\overline{C'_{-1}}$. Outputs of the first and second transfer gate circuits 1174 and 1175 are commonly connected to an input of the second inverter circuit 1173, and the second inverter circuit 1173 outputs a real carry signal $C_{15}$ ($C_{11}$, $C_7$, $C_3$).

As shown in FIG. 17(b), the BLACG circuit $105_{a-1}$ receives as input the block carry propagate signals $BP_3$ to $BP_{15}$ and the block generate signals $BG_3$ to $BG_{15}$ from the CSA circuit 101, and the carry signal $C_{-1}$. As constituent elements of the circuit, use is made of combinations of NAND circuits, inverter circuits, NOR circuits, and EOR circuits using CMOS transistors. Note that use may also be made of bipolar transistors and other digital elements.

As to the question of how many circuit elements are required for generation of the real carry signal $C_i$ by application of the present invention compared with the prior art circuit and what happens to the processing speed, it is necessary to consider also the circuits for generating the cumulative block carry propagate signal $CP_i^*$ and the cumulative block carry generate signal $CG_i^*$.

Figure 19:
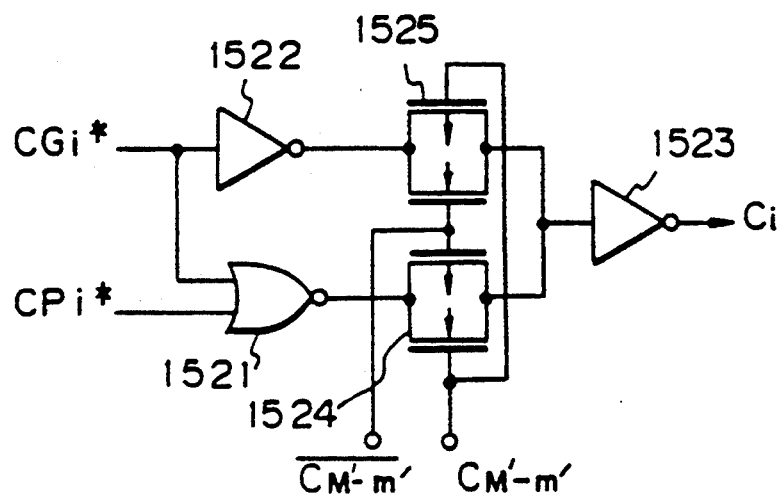
FIG. 19 is a circuit diagram showing a second modification of the BLACG circuit shown in FIG. 17(b)

Therefore, the first example of the third embodiment (FIG. 17) is constructed using a circuit which generates the cumulative block carry propagate signal $CP_i^*$ and the cumulative block carry generate signal $CG_i^*$ by about the same procedure as the circuit of FIG. 3 and which is made by a later mentioned second modification of the third embodiment (FIG. 19).

This BLACG circuit $105_{a-1}$ is roughly comprised of five blocks. In the first block, the second carry signals $C'_{-1}$ and $\overline{C'_{-1}}$ are generated by the carry signal $C_{-1}$ from the lower block.

In the second block, the cumulative block carry propagate signal $CP_3^*$ and the cumulative block carry generate signal $CG_3^*$ are generated based on the block carry propagate signal $BP_3$ and the block carry generate signal $BG_3$ and the real carry signal $C_3$ for the third digit is generated from the $CP_3^*$, $CG_3^*$, and second carry signals $C'_{-1}$ and $\overline{C'_{-1}}$.

Below, in the same way, in the third block, the cumulative block carry propagate signal and the cumulative block carry generate signal are generated from the corresponding block carry propagate signal and block carry generate signal and the real carry signal $C_7$ for the seventh digit is generated from the second carry signals $C'_{-1}$ and $\overline{C'_{-1}}$. Similarly, in the fourth block, the real carry signal $C_{11}$ and in the fifth block the real carry signal $C_{15}$ are respectively generated.

In this way, the real carry signals $C_3$, $C_7$, $C_{11}$, and $C_{15}$ in one block are directly generated without parallel generation of the presumed carry signals $C_i(0)$ and $C_i(1)$. Therefore, there is no need for the second MPX circuit 104 as in the prior art.

The above BLACG circuit 105a has a total of 132 circuit elements, which is 4 elements less than the 136 of the conventional circuit (FIG. 3, total of BLACG circuit 105 and second MPX circuit 104). Further, the five-input NAND circuit used for generating the carry signal $C_{15}(1)$ in the prior art circuit is comprised of an inverter and two-input NOR in the present embodiment, so it is possible to generate the real carry signal $C_{15}$ faster and to also improve the overall addition speed.

The above explanation was made with reference to a single BLACG circuit $105_{a-1}$, but the same construction applies to a BLACG circuit dealing with other blocks, so an explanation thereof is omitted.

Figure 18:
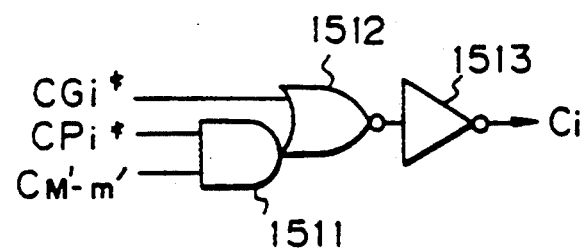
FIG. 18 is a circuit diagram showing a first modification of the BLACG circuit shown in FIG. 17(b)

FIG. 18 shows a first modification of the BLACG circuit shown in FIG. 17(b). This FIG. 18 shows the portion generating the real carry signal $C_i$. The other portions are omitted.

As shown in FIG. 18, the BLACG (block look ahead carry generator) circuit 105a comprises an AND circuit 1511, a NOR circuit 1512 and an inverter circuit 1513. A first input of the AND circuit 1511 is supplied with a real carry signal $C_{M'-m'}$, a second input of the AND circuit 1511 is supplied with a cumulative block carry propagate signal $CP_i{}^*$ and an output of the AND circuit 1511 is connected to a first input of the NOR circuit 1512. A second input of the NOR circuit 1512 is supplied with a cumulative block carry generate signal $CG_i{}^*$, an output of the NOR circuit 1512 is connected to an input of the inverter circuit 1513, and the inverter circuit 1513 outputs a real carry signal $C_i$.

This first modification of the third embodiment obtains the real carry signal $C_i$, according to the above-mentioned equation (19), by inverting by an inverter the output of an AND-OR-inverter which processes the cumulative block carry propagate signal $CP_i{}^*$, the cumulative block carry generate signal $CG_i{}^*$, and the real carry signal $C_{M'-m'}$.

According to the first modification of the third embodiment, it is possible to construct the circuit wit the least number of circuit elements. However, the circuit is somewhat slow in processing speed. Still, the difference is 1 or 2 ns in the case of use of 1 to 1.5 μm CMOS elements and less than 10 percent of the 15 to 20 ns time required for full addition of 64 bits, so does not pose a problem in practice.

FIG. 19 shows a second modification of the third embodiment. FIG. 19 shows only the important portions in the same way as FIG. 18.

As shown in FIG. 19, the BLACG circuit 105a comprises a NOR circuit 1521, a first and a second inverter circuits 1522 and 1523 and a first and a second transfer gate circuits 1524 and 1525. A first input of the NOR circuit 1521 is supplied with a cumulative block carry propagate signal $CP_i{}^*$, a second input of the NOR circuit 1521 and an input of the first inverter circuit 1522 are connected and supplied with a cumulative block carry generate signal $CG_i{}^*$. An output of the NOR circuit 1521 is connected to an input of the first transfer gate circuit 1524 and an output of the first inverter circuit 1522 is connected to an input of the second transfer gate circuit 1525. A first control gate of the first transfer gate circuit 1524 and a second control gate of the second transfer gate circuit 1525 are connected and supplied with a real carry signal $C_{M'-m'}$, and a second control gate of the first transfer gate circuit 1524 and a first control gate of the second transfer fate circuit 1525 are connected and supplied with an inverted real carry signal $\overline{C_{M'-m'}}$. Outputs of the first and second transfer gate circuits 1524 and 1525 are commonly connected to an input of the second inverter circuit 1523, and the second inverter circuit 1523 outputs a real carry signal $C_i$.

This second modification of the third embodiment is constructed in accordance with the following equation (20). That is, equation (19) can be interpreted as follows:

$$\begin{aligned} C_i &= CG_i{}^* \text{ (when } C_{M'-m'} = \text{``0''}) \\ &= CG_i{}^* + CP_i{}^* \text{ (when } C_{M'-m'} = \text{``1''}) \end{aligned} \qquad (20)$$

According to the second modification of the third embodiment, the number of circuit elements becomes larger compared with the first modification (FIG. 18), but is still less than in the prior art circuit and the circuit is equal to the prior art circuit in terms of the processing speed, so by achieving a higher speed of the $CG_i{}^*$ circuit than in the prior art, it is possible to shorten the processing time required for the addition.

Figure 20:
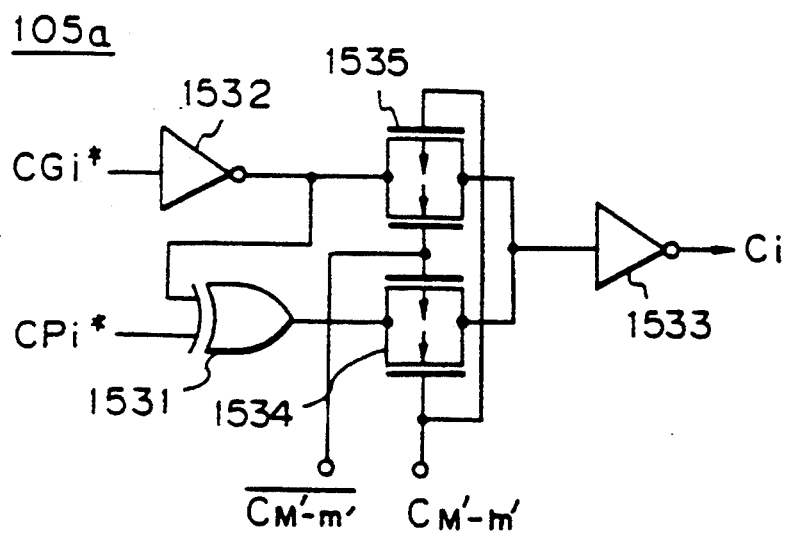
FIG. 20 is a circuit diagram showing a third modification of the BLACG circuit shown in FIG. 17(b)

FIG. 20 shows a third modification of the third embodiment and shows only the portions corresponding to the basic principle.

As shown in FIG. 20, the BLACG circuit 105a comprises an EOR circuit 1531, a first and a second inverter circuits 1532 and 1533 and a first and a second transfer gate circuits 1534 and 1535. A first input of the EOR circuit 1531 is supplied with a cumulative block carry propagate signal $CP_i{}^*$ and an output of the EOR circuit 1531 is connected to an input of the first transfer gate circuit 1534. An input of the first inverter circuit 1532 is supplied with a cumulative block carry generate signal $CG_i{}^*$ and an output of the first inverter circuit 1532 and a second input of the EOR circuit 1531 are commonly connected to an input of the second transfer gate circuit 1535. A first control gate of the first transfer gate circuit 1534 and a second control gate of the second transfer gate circuit 1535 are connected and supplied with a real carry signal $C_{M'-m'}$, a second control gate of the first transfer gate circuit 1534 and a first control gate of the second transfer gate circuit 1535 are connected and supplied with an inverted real carry signal $\overline{C_{M'-m'}}$. Outputs of the first and second transfer gate circuits 1534 and 1535 are commonly connected to an input of the second inverter circuit 1533, and the second inverter circuit 1533 outputs a real carry signal $C_i$.

The third modification of the third embodiment takes note of the fact that in equation (19), the cumulative block carry propagate signal $CP_i{}^*$ and the cumulative block carry generate signal $CG_i{}^*$ never simultaneously become "1" and is constructed in accordance with the following equation (21). That is, equation (19) is given as:

$$C_i = CG_i^* \text{ (when } C_{M'-m'} = \text{``0'')} \quad (21)$$
$$= CG_i^* \oplus CP_i^* \text{ (when } C_{M'-m'} = \text{``1'')}$$

According to the third modification of the third embodiment, the number of circuit elements becomes larger compared with the second modification (FIG. 19), but by using EOR circuits which are high in speed and have fewer elements, it is possible to achieve a higher speed and greater simplicity compared with the prior art circuit.

Figure 21:
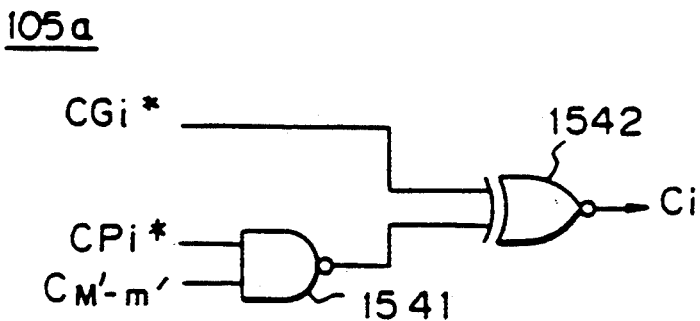
FIG. 21 is a circuit diagram showing a fourth modification of the BLACG circuit shown in FIG. 17(b)

FIG. 21 shows a fourth modification of the third embodiment and shows only the portions corresponding to the basic principle.

As shown in FIG. 21, the BLACG circuit 105a comprises a NAND circuit 1541 and an ENOR circuit 1542. A first input of the NAND circuit 1541 is supplied with a real carry signal $\overline{C_{M'-m'}}$ and a second input of the NAND circuit 1541 is supplied with a cumulative block carry propagate signal $Cp_i^*$. An output of the NAND circuit 1541 is connected to a first input of the ENOR circuit 1542 and a second input of the ENOR circuit 1542 is supplied with a cumulative block carry generate signal $CP_i^*$, and the ENOR circuit 1542 outputs a real carry signal $C_i$.

The fourth modification of the third embodiment modifies equation (19) to the following equation (22) so as to simplify the circuit:

$$C_i = CG_i^* + (CP_i^* \cdot C_{M'-m'}) \quad (22)$$

Figure 22:
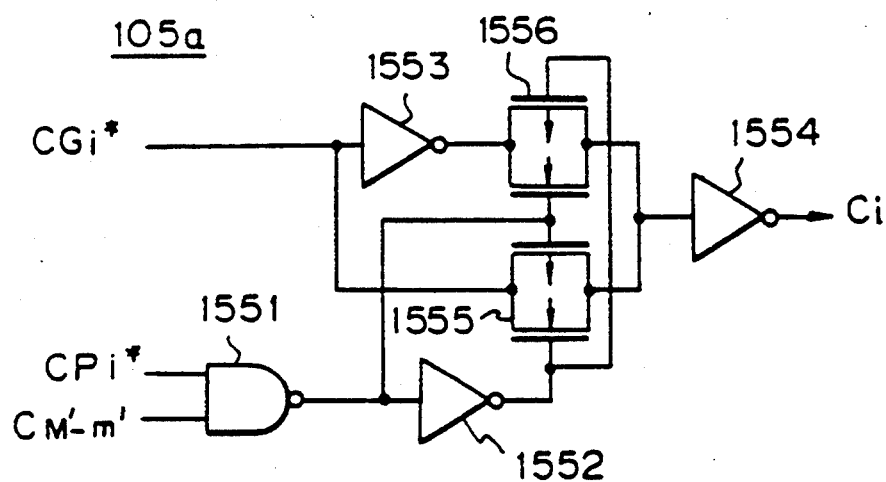
FIG. 22 is a circuit diagram showing a fifth modification of the BLACG circuit shown in FIG. 17(b)

FIG. 22 shows a fifth modification of the third embodiment and shows only the portions corresponding to the basic principle.

As shown in FIG. 22, the BLACG circuit 105a comprises a NAND circuit 1551, a first, a second and a third inverter circuits 1552, 1553 and 1554 and a first and a second transfer gate circuits 1555 and 1556. A first input of the NAND circuit 1551 is supplied with a real carry signal $C_{M'-m'}$ and a second input of the NAND circuit 1551 is supplied with a cumulative block carry propagate signal $CP_i^*$, an output of the NAND circuit 1551 is connected to an input of the first inverter circuit 1552 and a second control gate of the first transfer gate circuit 1555 and a first control gate of the second transfer gate circuit 1556. An output of the first inverter circuit 1552 is connected to a first control gate of the first transfer gate circuit 1555 and a second control gate of the second transfer gate circuit 1556. An input of the second inverter circuit 1553 and an input of the first transfer gate circuit 1555 are connected and supplied with a cumulative block carry generate signal $CG_i^*$, an output of the second inverter circuit 1553 is connected to an input of the second transfer gate circuit 1556. Outputs of the first and second transfer gate circuits 1555 and 1556 are commonly connected to an input of the third inverter circuit 1554, and the third inverter circuit 1554 outputs a real carry signal $C_i$.

The fifth modification of the third embodiment is constructed using a transfer gate TG for the ENOR circuit portion of the fourth modification (FIG. 21). In this way, it is possible to simplify the circuit by using a transfer gate TG.

Figure 23:
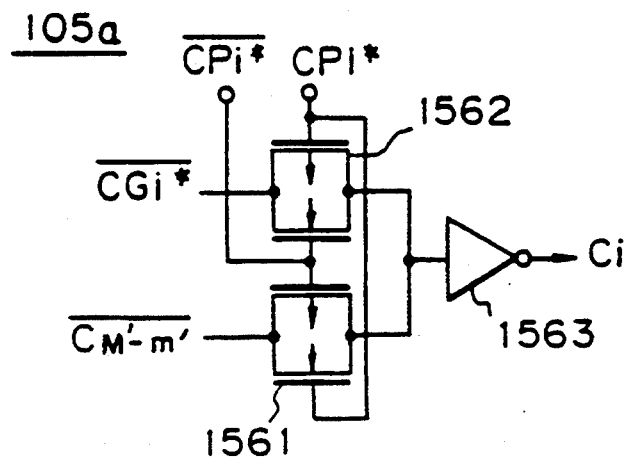
FIG. 23 is a circuit diagram showing a sixth modification of the BLACG circuit shown in FIG. 17(b)

FIG. 23 shows a sixth modification of the third embodiment.

As shown in FIG. 23, the BLACG circuit 105a comprises a first and a second transfer gate circuits 1561 and 1562 and an inverter circuit 1563. An input of the first transfer gate circuit 1561 is supplied with an inverted real carry signal $\overline{C_{M'-m'}}$, an input of the second transfer gate circuit 1562 is supplied with an inverted cumulative block carry generate signal $\overline{CG_i^*}$. A first control gate of the first transfer gate circuit 1561 and a second control gate of the second transfer gate circuit 1562 are connected and supplied with a cumulative block carry propagate signal $CP_i^*$, a second control gate of the first transfer gate circuit 1561 and a first control gate of the second transfer gate circuit 1562 are connected and supplied with an inverted cumulative block carry propagate signal $\overline{CP_i^*}$. Outputs of the first and second transfer gate circuits 1561 and 1562 are commonly connected to an input of the inverter circuit 1563, and the inverter circuit 1563 outputs a real carry signal $C_i$.

This sixth modification of the third embodiment is obtained by considering the fact that in equation (19), the cumulative carry propagate signal $CP_i^*$ and the cumulative carry generate signal $CG_i^*$ never simultaneously become "1" and making the interpretation that:

$$C_i = CG_i^* \text{ (when } CP_i^* = \text{``0''}) \quad (23)$$
$$= C_{M'-m'} \text{ (when } CP_i^* = \text{``1''})$$

By making this construction, it is possible to simplify the circuit and to raise the processing speed.

Figure 24A:
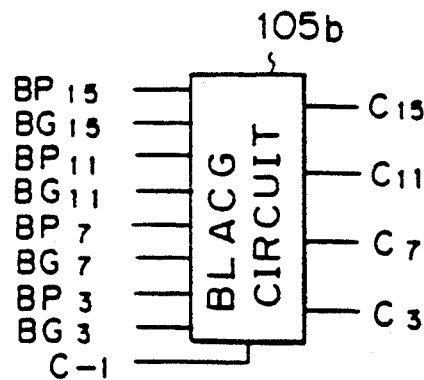
FIG. 24(a) is a block diagram showing a BLACG circuit in the parallel full adder shown in FIG. 16.
Figure 24B:
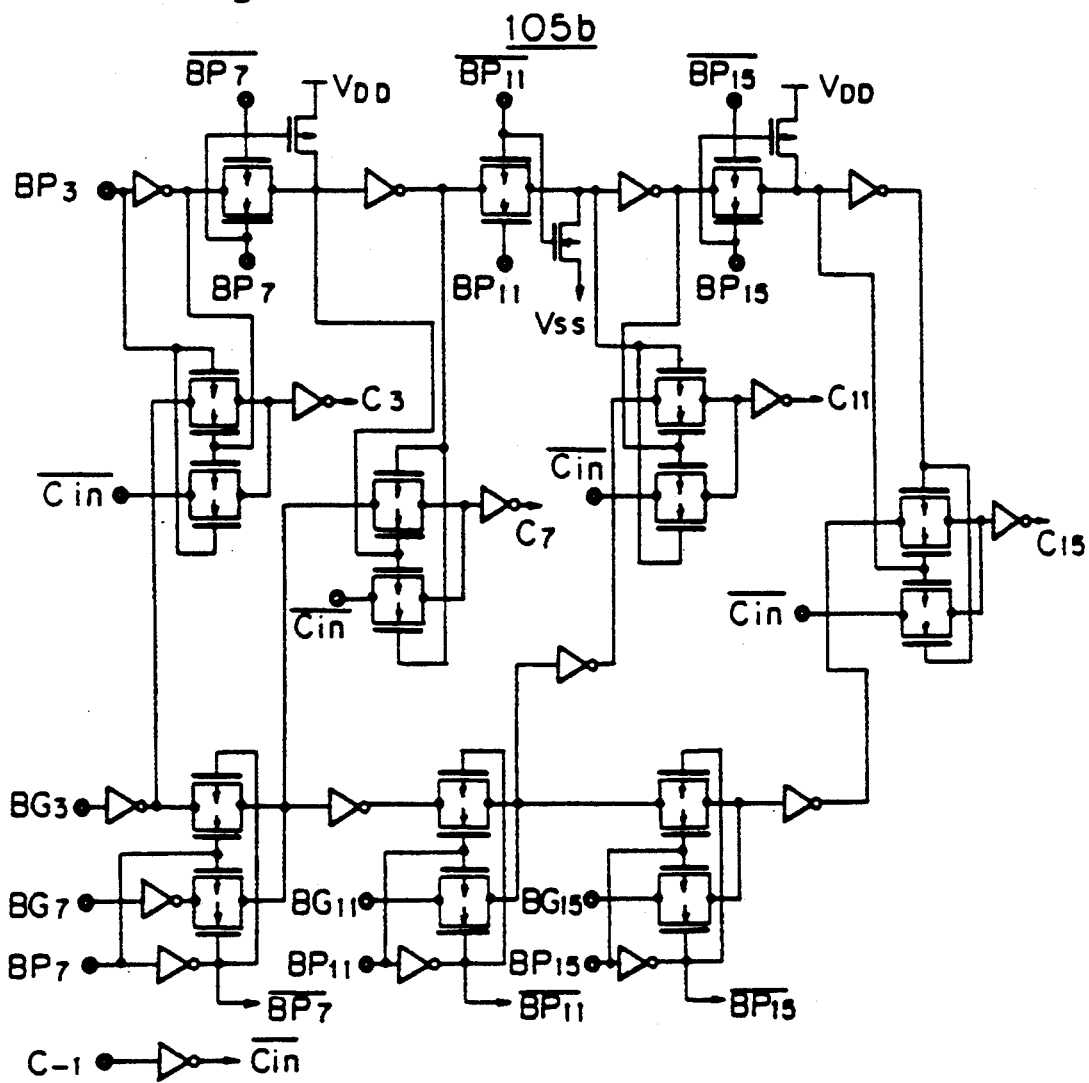
FIG. 24(b) is a circuit diagram showing a second example of the BLACG circuit shown in FIG. 24(a)

FIGS. 24(a) and 24(b) show a second example of the BLACG circuit according to the third embodiment. FIG. 24(a) is a symbolized view of the BLACG circuit 105b of the present embodiment and FIG. 24(b) is a detailed circiut diagram of the same.

While the BLACG circuits 105a shown in FIGS. 17(a) and 17(b) to FIG. 23 were constructed using circuits of combinations of NAND, AND, NOR, EOR and ENOR circuits and inverters as the $CP_i^*$ and $CG_i^*$ generating circuits, the BLACG circuit 105b according to the second example of the third embodiment replaces these with chain circuits of the wired OR circuits of transfer gates TG and inverter circuits INV to secure equivalent functions as with the prior BLACG circuits 105a.

As shown in FIG. 24(b), for the cumulative block carry propagate signal $CP_i^*$ (equation (17)), the block carry propagate signal $BP_3$ of the third digit, which is the lowest digit in the the BLACG circuit 105b, is given to the input end of the chain circuit of the transfer gate TG and the inverter INV. The transfer gates of the digits (7th, 11th, and 15th digits) are controlled ON and OFF by the block carry propagate signals $BP_i$ ($BP_7$, $BP_{11}$, and $BP_{15}$) of the digits. At the digits where the transfer gates TG are to be OFF, a signal corresponding to "0" is generated and successively conveyed to the higher digits. The conveyed signal is inverted with each stage of the inverters INV it passes through. Therefore, for the generation of the conveyed signal corresponding to "0", use is made of pull-down NMOS elements and pull-up PMOS elements so that a "0" signal is conveyed to the higher digits at digits where the cumulative block carry propagate signal $CP_i^*$ is noninverted and a "1" signal is conveyed at digits where it is inverted.

On the other hand, for the cumulative block carry generate signal $CG_i^*$ (equation (18)), the same construction is used as in the case of the above-mentioned cumulative carry propagate signal $CP_i^*$. That is, the input to the chain circuit of the transfer gate TG and the inverter INV is the block carry generate signal $BG_3$ of the third digit, which is the lowest digit in the said BLACG circuit 105b. The transfer gates of the digits are controlled ON and OFF by the block carry propagate signals $BP_i$, ($BP_7$, $BP_{11}$ and $BP_{15}$) of the digits. At the digits where the transfer gates TG are to be OFF, a signal corresponding to the block carry generate signal $BG_i$ is generated and successively conveyed to the higher digits.

Note that in FIG. 24(b), an inverter INV is inserted for each stage of the transfer gates TG in the $CP_i*$ generating circuit, but it may be inserted for every two or three stages of the transfer gates TG or combinations of the same.

In the present example of the third embodiment, as the circuit for generating the real carry signal $C_i$ from the cumulative block carry propagate signal $CP_i*$, the cumulative block carry generate signal $CG_i*$, and the carry signal $C_{M'-m'}$ (in the figure, $C_{-1}$), use is made of the circuit of the sixth modification (FIG. 23).

By using such a combination, it is possible to secure an equivalent high speed as in the case of use of the circuit of the second modification (FIG. 19) or the third modification (FIG. 20) with less circuit elements than with the use of the circuit of the first example of the third embodiment (FIG. 17).

In the above example of the third embodiment, there are 71 circuit elements, so it is possible to halve the 136 elements of the prior art example and thus possible to considerably cut down on the number of circuit elements without sacrificing high speed.

To achieve simultaneously a reduction in the number of circuit elements and a high speed of processing, use may be made of the BLACG circuit 105b of the second example of the third embodiment (FIGS. 24(a), 24(b)) as the BLACG circuit for processing the lower digits and use may be made of a circuit comprised of a combination of a circuit which generates the cumulative block carry propagate signal $CP_i*$ and cumulative block carry generate signal $CG_i*$ by a chain circuit of a transfer gate TG and inverter INV with the second modification (FIG. 19).

Note that the above explanation was made in reference to a number of block bits m=m'=4, but that in general it is possible that m≠m' or that m≠4.

Further, out of the data A and B to be processed, the values of the number of block bits m (or m') may differ between a higher digit and lower digit.

Further, it is possible to stop the pregeneration of the presumed sum signals $F_i(0)$ and $F_i(1)$ in the lower digit, directly calculate the real sum signal $F_i$ as:

$$F_i = P_i + C_{i-} \qquad (24)$$

and select and output the presumed sum signals $F_i(0)$ and $F_i(1)$ (or similar signals) by the value of the carry signal $C_{M-1}$ of just the higher digit, by which method it is possible to further simplify the circuit.

Figure 25:
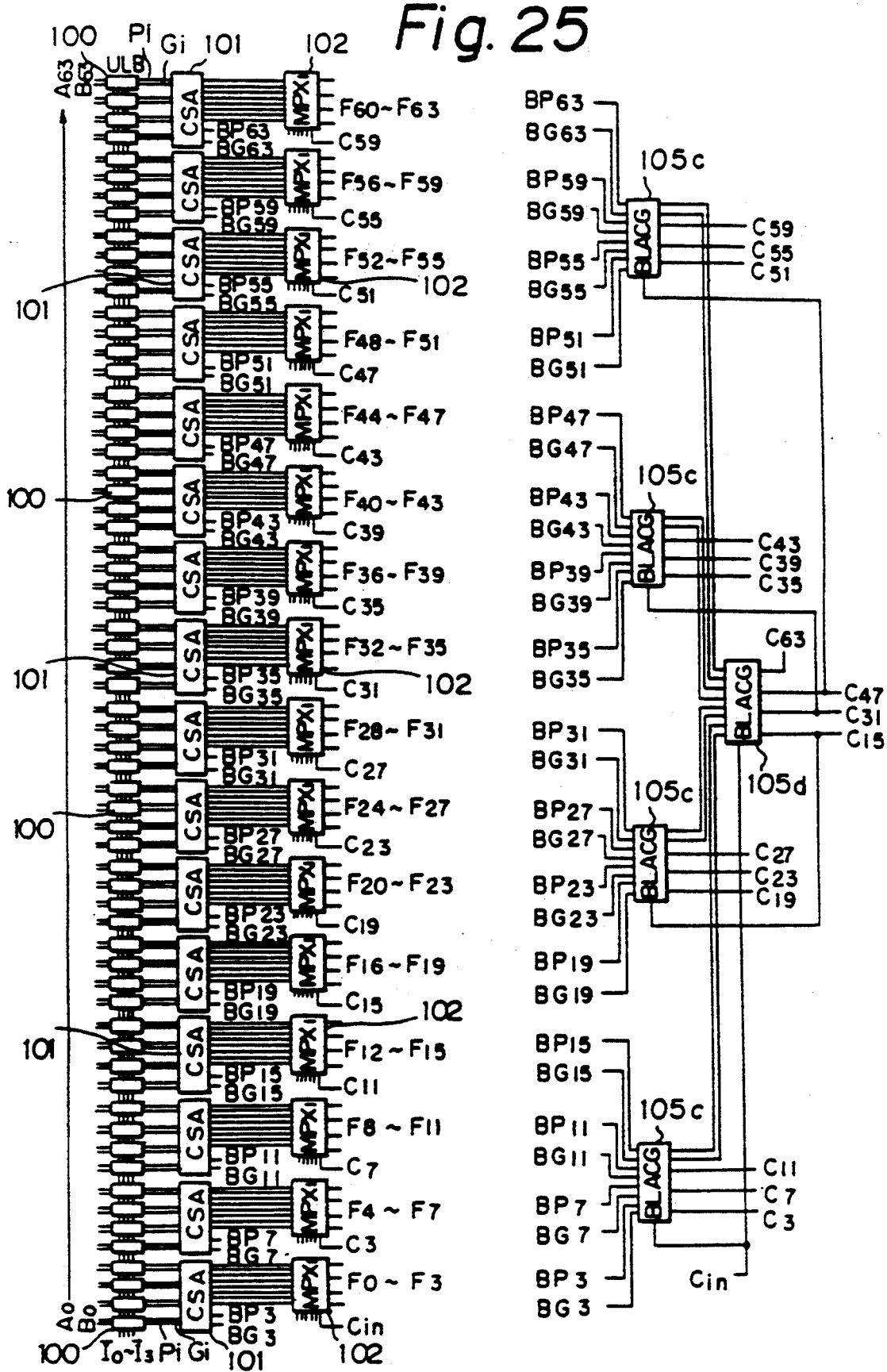
FIG. 25 is a block diagram showing a second example of application to a 64 bit ALU of a parallel full adder according to the third embodiment of the present invention.
Figure 26A:
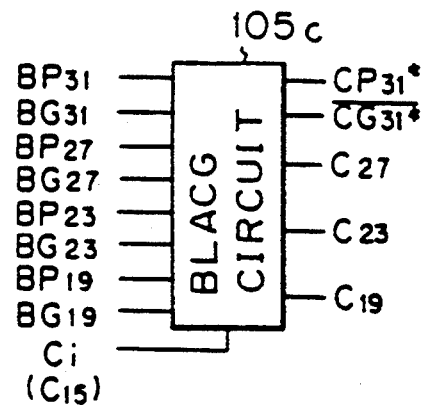
FIG. 26(a) is a block diagram showing a BLACG circuit in the parallel full adder shown in FIG. 25.
Figure 26B:
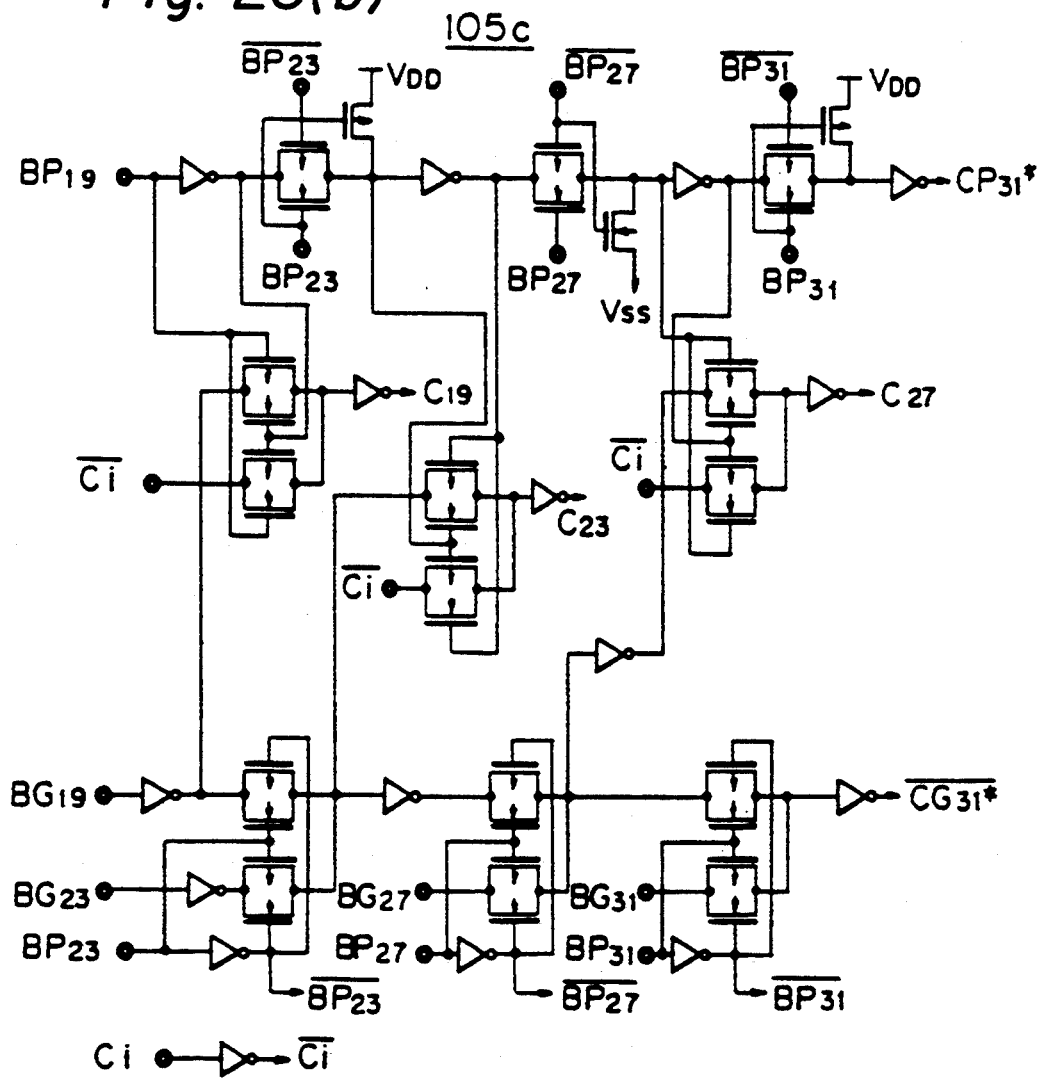
FIG. 26(b) is a circuit diagram showing a third example of the BLACG circuit shown in FIG. 26(a)

FIGS. 24(a) and 24(b) to FIG. 27 show other examples of the third embodiment. Namely, FIG. 24(a) is a block diagram showing a BLACG circuit 105a in the parallel full adder shown in FIG. 16, and FIG. 24(b) is a circuit diagram showing a second example of the BLACG circuit shown in FIG. 24(a), FIG. 25 is a block diagram showing a second example of application to a 64 bit ALU of a parallel full adder according to the third embodiment of the present invention, FIG. 26(a) is a block diagram showing a BLACG circuit 105c in the parallel full adder shown in FIG. 25, and FIG. 26(b) is a circuit diagram showing a third example of the BLACG circuit shown in FIG. 26(a), and FIG. 27(a) is a block diagram showing a BLACG circuit 105d in the parallel full adder shown in FIG. 25, and FIG. 27(b) is a circuit diagram showing a fourth example of the BLACG circuit shown in FIG. 27(a).

Figure 27A:
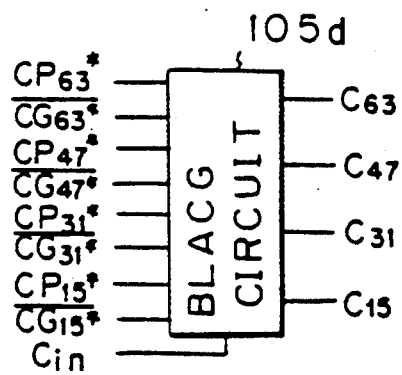
FIG. 27(a) is a block diagram showing a BLACG circuit in the parallel full adder shown in FIG. 25.
Figure 27B:
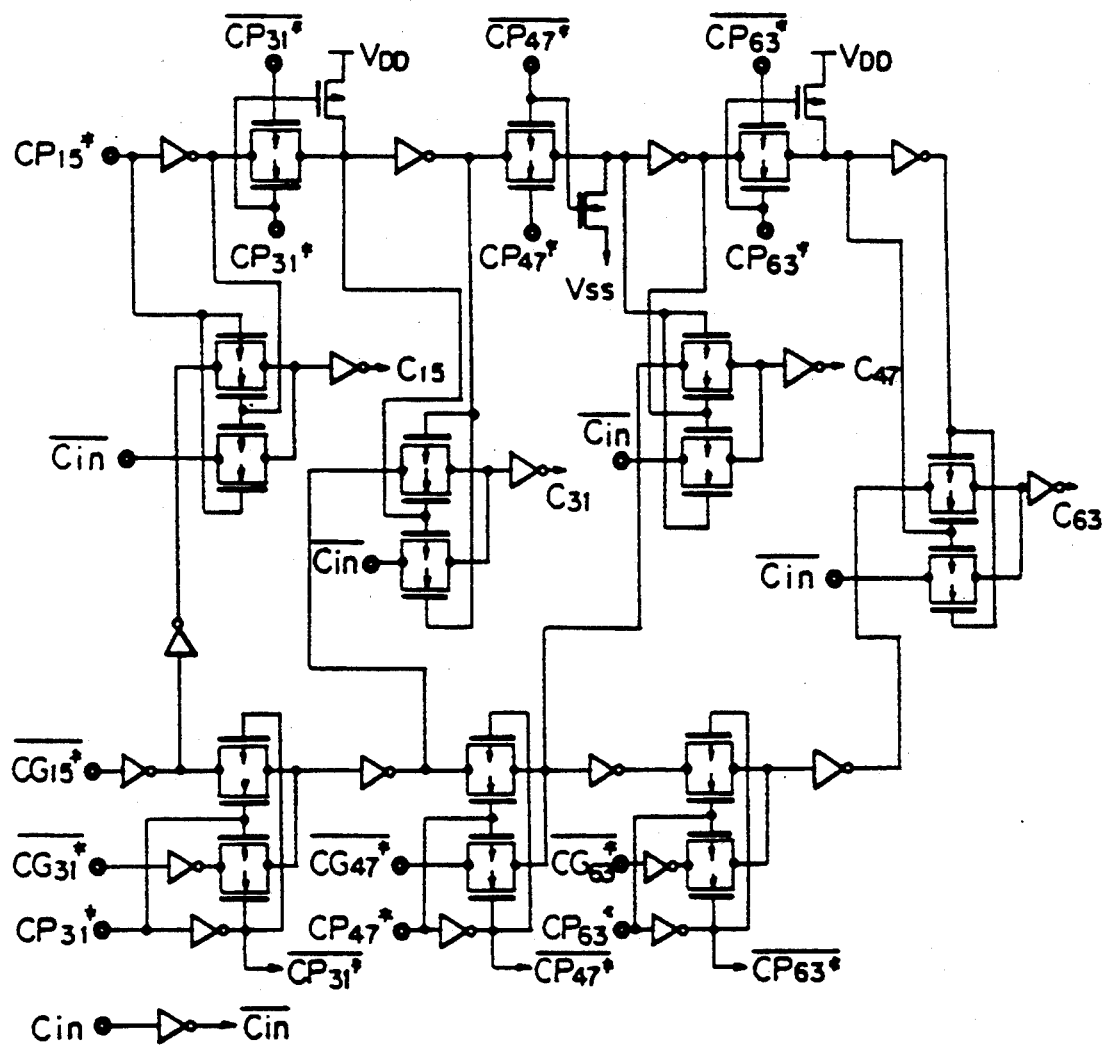
FIG. 27(b) is a circuit diagram showing a fourth example of the BLACG circuit shown in FIG. 27(a).

As shown in FIGS. 24(b), 25(b) and 27(b), the BLACG circuits 105b, 105c and 105d comprise a chain circuit mutually connected with a transfer gate circuit and an inverter circuit.

In the second example of the third embodiment, the point of difference with the BLACG circuits shown in FIG. 17(a) to FIG. 24(b) and the prior art example lies in the constitution of the BLACG circuit. The same construction is taken for the input data A, B, the ULB circuit 100, the CSA circuit 101, and the first MPX circuit 102, so the same symbols are appended and explanations thereof are omitted.

The BLACG circuits 105c and 105d of the third and fourth examples according to the third embodiment, when finding the real carry signal $C_i$ by the block carry propagate signal $BP_i$, the block carry generate signal $BG_i$, and the carry signal $C_{M'-m'}$, does not only engage in one state of processing by the BLACG circuit 105a as in the first example of application to the 64 bit ALU of the parallel full adder (FIG. 16), but engages in processing divided into two stages (105c, 105d) or more stages.

That is, in the first example of application to the ALU (FIG. 16), four digits' worth of block carry propagate signals $BP_i$ and block carry generate signals $BG_i$ are assembled and the real carry signals $C_i$ of those digits are generated. In the present embodiment, instead of this, regarding to the four digits of input signals, the lower three digits' worth of real carry signals and the highest digits's cumulative block carry propagate signal $CP_i*$ and cumulative block carry generate signal $CG_i*$ are generated by the BLACG circuit 105c. The cumulative block carry propagate signal $CP_i*$ and the cumulative block carry generate signal $CG_i*$ output from the BLACG circuits 105c are output to the BLACG circuit 105d. AT the BLACG circuit 105d the carry signal $C_{in}$ from the digit (i=−1) below the highest digit of n bits and $CP_i*$ and $CG_i*$ are processed in 105d and the real carry signal $C_i$ is generated. The processing here is the same as in the case of the first example of application to the ALU (FIG. 16). The real carry signal $C_i$ generated is input to the BLACG circuit 105c as the carry signal from the lower digit. The carry signal is confirmed as the three digits' worth of real carry signals to be processed in the BLACG circuit 105c.

Note that the above explanation was made with reference to a two-stage construction of the BLACG circuits 105c and 105d. In the case of more stages, it is sufficient to repeat the same type of process as the above.

According to the above second and third examples of application to the ALU, the number of circuit elements required slightly increases over that of the first example (FIG. 16), but since the ripple carry processing is replaced by parallel processing, the generation of the real carry signal $C_i$ can be made high speed and it is possible to maintain the high speed with an overall number of circuit elements less than in the prior art.

The above first to fourth examples and first to sixth modifications of the third embodiments show examples of parallel full adders, but the present invention can also be applied to parallel full subtracters of a fourth embodiment (not illustrated).

In the fourth embodiment of a parallel full subtracter, similar to the relationship between the first and second embodiments, the carry propagate signal $P_i$ as spoken of in the case of an adder becomes a "borrow propagate signal" and the carry generate signal $G_i$ becomes a "borrow generate signal". The borrow propagate signal $P_i$ in this case is given by the ENOR of $$P_i = \overline{\overline{A_i} + B_i} \qquad (3)'$$

Further, the borrow generate signal $G_i$ is given by $$G_i = \overline{A_i} \cdot B_i \qquad (4)'$$

Further, the cumulative block carry propagate signal $CP_i^*$ is used as the "cumulative block borrow propagate signal" and the cumulative block carry generate signal $CG_i^*$ is used as the "cumulative block borrow generate signal" and, in addition, the carry signal $C_{M-m'}$ is used as the "borrow signal $C_{M-m'}$" and the operation is performed successively from the lowest digit to the highest digit. AT this time, M is the lowest digit of the signal to be processed in the block subtracter (CSA corresponding circuit 201) to which the i-th digit belongs, and M' is the lowest digit of the signal to be processed in the BLACG corresponding circuit which processes the i-th digit cumulative block borrow propagate signal $CP_i^*$ and the cumulative block borrow generate signal $CG_i^*$. With such a signal setting, it is possible to construct a parallel full subtracter using the circuits shown in the above-mentioned first to fourth examples and first to sixth modifications of the third embodiments and obtain the real difference signal $F_i$, corresponding to an inverted signal of the real sum signal $F_i$ in the adder circuits. Therefore, a detailed explanation will be omitted.

As explained above, according to the present invention, it is possible to provide a binary operator using the block select look ahead system which serves as a parallel full adder and parallel full subtracter able to greatly cut down on the number of elements of the circuit without sacrifice to the high speed of the computation since two presumed sum signals are never generated in parallel.

As a result, when realizing a parallel full adder (or full subtracter) for processing long-bit data, mounting on a LSA, which must form circuits with a limited number of elements, becomes easy.

Many widely different embodiments of the present invention may be constructed without departing from the spirit and scope of the present invention, and it should be understood that the present invention is not limited to the specific embodiments described in this specification, except as defined in the appended claims.

We claim:

1. A binary operator for receiving first and second pieces of n-bit binary data and a real carry signal, for dividing the first and second pieces of the n-bit binary data into blocks, for processing the blocks in parallel using block adders, and for outputting a real sum signal by calculating an arithmetic sum of the first and second n-bit binary data, said binary operator comprising:

carry propagate signal and carry generate signal generating means which receives the first and second pieces of n-bit binary data and generates a carry propagate signal and a carry generate signal of various bits of the n-bit binary data;

cumulative carry propagate signal generating means, operatively connected to said carry propagate signal and carry generate signal generating means, for receiving the carry propagate signals of the various bits and for generating calculating a cumulative carry propagate signal for the various bits based on the carry propagate signals;

cumulative carry generate signal generating means, operatively connected to said carry propagate signal and carry generate signal generating means, for receiving the carry propagate signals and the carry generate signals of the various bits and for generating calculating a cumulative carry generate signal for the various bits based on the carry propagate signals and the carry generate signals; and real sum signal generating means, operatively connected to said carry propagate signal and carry generate signal generating means, said cumulative carry propagate signal generating means and said cumulative carry generate signal generating means, for receiving the carry propagate signal for at least one of the various bits, the cumulative carry propagate signal from said cumulative carry propagate signal generating means, the cumulative carry generate signal from said cumulative carry generate signal generating means and the real carry signal, and for generating the real sum signal by directly calculating a nonselected real sum number based on the carry propagate signal, the cumulative carry propagate signal, the cumulative carry generated signal and the real carry signal, and generating the real sum signal corresponding to the directly calculated and nonselected real sum number.

2. A binary operator according to claim 1, wherein said real sum signal generating means generates the real sum signal for the various digits, and wherein an i-th digit of said real sum signal generating means generates the real sum signal of the i-th digit by directly calculating a nonselected real sum digit based on the carry propagate signal of the i-th digit, the cumulative carry propagate signal of the (i−1)-th digit, the cumulative carry generate signal of the (i−1)-th digit and a real carry signal advanced from a lower digit to the one of the block adders to which it belongs.

3. A binary operator according to claim 1, wherein said block adders are carry select adder circuits, and wherein each of said carry select adder circuits includes said cumulative carry propagate signal generating means, said cumulative carry generate signal generating means and said real sum signal generating means.

4. A binary operator according to claim 3, wherein said cumulative carry propagate signal generating means comprises a NAND circuit having four inputs and an inverter circuit, the four inputs of said NAND circuit are supplied with carry propagate signals, an output of said NAND circuit is connected to an input of said inverter circuit, and said inverter circuit outputs a cumulative carry propagate signal.

5. A binary operator according to claim 3, wherein said cumulative carry generate signal generating means comprises an inverter circuit, a two-input NAND circuit, a three-input NAND circuit and a first and a second four-input NAND circuit, an input of said inverter circuit is supplied with a carry generate signal, a first input of said two-input NAND circuit is supplied with a carry generate signal and a second input of said two-input NAND circuit is supplied with a carry propagate signal, a first input of said three-input NAND circuit is supplied with a carry generate signal and a second and a third input of said three-input NAND circuit are supplied with carry propagate signals, a first input of said first four-input NAND circuit is supplied with a carry generate signal and a second input, a third input and a fourth input of said first four-input NAND circuit are supplied with carry propagate signals, outputs of said inverter circuit, said two-input NAND circuit, said three-input NAND circuit and said first four-input NAND circuit are connected to four inputs of said second four-input NAND circuit, and said second four-input NAND circuit outputs a cumulative carry generate signal.

6. A binary operator according to claim 1, wherein said cumulative carry propagate signal generating means comprises a chain circuit having a transfer gate circuit connected to an inverter circuit.

7. A binary operator according to claim 1, wherein said cumulative carry propagate signal generating means comprises a chain circuit having a transfer gate circuit connected to an inverter circuit.

8. A binary operator for receiving first and second pieces of n-bit binary data and a real carry signal, for dividing the first and second pieces of the n-bit binary data into blocks, for processing the blocks in parallel using block adders, and for outputting a real sum signal by calculating an arithmetic sum of the first and second n-bit binary data, said binary operator comprising:

carry propagate signal and carry generate signal generating means which receives the first and second pieces of n-bit binary data and generates a carry propagate signal and a carry generate signal of various bits of the n-bit binary data;

cumulative carry propagate signal generating means, operatively connected to said carry propagate signal and carry generate signal generating means, for receiving in the block adders the carry propagate signals of the various bits and for generating calculating a cumulative carry propagate signal for the various bits based on the carry propagate signals;

cumulative carry generate signal generating means, operatively connected to said carry propagate signal and carry generate signal generating means, for receiving in the block adders the carry propagate signals and the carry generate signals of the various bits and for generating calculating a cumulative carry generate signal for the various bits based on the carry propagate signals and the carry generate signals; and real sum signal generating means, operatively connected to said carry propagate signal and carry generate signal generating means, said cumulative carry propagate signal generating means and said cumulative carry generate signal generating means, for receiving the carry propagate signal for at least one of the various bits, the cumulative carry propagate signal from said cumulative carry propagate signal generating means, the cumulative carry generate signal from said cumulative carry generate signal generating means and the real carry signal, and for directly calculating the real sum signal within the block adders based on the carry propagate signal, the cumulative carry propagate signal, the cumulative carry generated signal and the real carry signal, wherein said block adders are carry select adder circuits, wherein each of said carry select adder circuits includes said cumulative carry propagate signal generating means, said cumulative carry generate signal generating means and said real sum signal generating means, and wherein said real sum signal generating means comprises a NOR circuit and a first and a second EOR circuits, a first input of said NOR circuit is supplied with an inverted real carry signal and a second input of said NOR circuit is supplied with an inverted simulative carry propagate signal, a first input of said first EOR circuit is supplied with a carry propagate signal and a second input of said first EOR circuit is supplied with a cumulative carry generate signal, an output of said first EOR circuit is connected to a first input of said second EOR circuit and an output of said NOR circuit is connected to a second input of said second EOR circuit, and said second EOR circuit outputs a real sum signal.

9. A binary operator for receiving first and second pieces of n-bit binary data and a real carry signal, for dividing the first and second pieces of the n-bit binary data into blocks, for processing the blocks in parallel using block adders, and for outputting a real sum signal by calculating an arithmetic sum of the first and second n-bit binary data, said binary operator comprising:

carry propagate signal and carry generate signal generating means which receives the first and second pieces of n-bit binary data and generates a carry propagate signal and a carry generate signal of various bits of the n-bit binary data;

cumulative carry propagate signal generating means, operatively connected to said carry propagate signal and carry generate signal generating means, for receiving in the block adders the carry propagate signals of the various bits and for generating calculating a cumulative carry propagate signal for the various bits based on the carry propagate signals;

cumulative carry generate signal generating means, operatively connected to said carry propagate signal and carry generate signal generating means, for receiving in the block adders the carry propagate signals and the carry generate signals of the various bits and for generating calculating a cumulative carry generate signal for the various bits based on the carry propagate signals and the carry generate signals; and real sum signal generating means, operatively connected to said carry propagate signal and carry generate signal generating means, said cumulative carry propagate signal generating means and said cumulative carry generate signal generating means, for receiving the carry propagate signal for at least one of the various bits, the cumulative carry propagate signal from said cumulative carry propagate signal generating means, the cumulative carry generate signal from said cumulative carry generate signal generating means and the real carry signal, and for directly calculating the real sum signal within the block adders based on the carry propagate signal, the cumulative carry propagate signal, the cumulative carry generated signal and the real carry signal, wherein said real sum signal generating means comprises an EOR circuit, and ENOR circuit, a first and a second transfer gate circuits and an inverter circuit, a first input of said EOR circuit is supplied with a cumulative carry propagate signal, a first input of said ENOR circuit is supplied with a cumulative carry generate signal and a second input of said ENOR circuit is supplied with a carry propagate signal, an output of said EOR circuit is connected to an input of said first transfer gate circuit and an output of said ENOR circuit is connected to a second input of said EOR circuit and an input of said second transfer gate circuit, a first control gate of said first transfer gate circuit and a second control gate of said second transfer gate circuit are connected and supplied with a real carry signal, a second control gate of said first transfer gate circuit and a first control gate of said second transfer gate circuit are connected and supplied with an inverted real carry signal, outputs of said first and second transfer gate circuits are commonly connected to an input of said inverter circuit, and said inverter circuit outputs a real sum signal.

10. A binary operator for receiving first and second pieces of n-bit binary data and a real carry signal, for dividing the first and second pieces of the n-bit binary data into blocks, for processing the blocks in parallel using block adders, and for outputting a real sum signal by calculating an arithmetic sum of the first and second n-bit binary data, said binary operator comprising:

carry propagate signal and carry generate signal generating means which receives the first and second pieces of n-bit binary data and generates a carry propagate signal and a carry generate signal of various bits of the n-bit binary data;

cumulative carry propagate signal generating means, operatively connected to said carry propagate signal and carry generate signal generating means, for receiving in the block adders the carry propagate signals of the various bits and for generating calculating a cumulative carry propagate signal for the various bits based on the carry propagate signals;

cumulative carry generate signal generating means, operatively connected to said carry propagate signal and carry generate signal generating means, for receiving in the block adders the carry propagate signals and the carry generate signals of the various bits and for generating calculating a cumulative carry generate signal for the various bits based on the carry propagate signals and the carry generate signals; and real sum signal generating means, operatively connected to said carry propagate signal and carry generate signal generating means, said cumulative carry propagate signal generating means and said cumulative carry generate signal generating means, for receiving the carry propagate signal for at least one of the various bits, the cumulative carry propagate signal from said cumulative carry propagate signal generating means, the cumulative carry generate signal from said cumulative carry generate signal generating means and the real carry signal, and for directly calculating the real sum signal within the block adders based on the carry propagate signal, the cumulative carry propagate signal, the cumulative carry generated signal and the real carry signal, wherein said real sum signal generating means comprises a NOR circuit, an inverter circuit, a first and a second transfer gate circuits and an ENOR circuit, a first input of said NOR circuit is supplied with a cumulative carry propagate signal, a second input of said NOR circuit and an input of said inverter circuit are connected and supplied with a cumulative carry generate signal, an output of said NOR circuit is connected to an input of said first transfer gate circuit and an output of said inverter circuit is connected to an input of said second transfer gate circuit, a first control gate of said first transfer gate circuit and a second control gate of said second transfer gate circuit are connected and supplied with a real carry signal, a second control gate of said first transfer gate circuit and a first control gate of said second transfer gate circuit are connected and supplied with an inverted real carry signal, outputs of said first and second transfer gate circuits are commonly connected to a first input of said ENOR circuit and a second input of said ENOR circuit is supplied with a carry propagate signal and said ENOR circuit outputs a real sum signal.

11. A binary operator for receiving first and second pieces of n-bit binary data and a real carry signal, for dividing the first and second pieces of the n-bit binary data into blocks, for processing the blocks in parallel using block adders, and for outputting a real sum signal by calculating an arithmetic sum of the first and second n-bit binary data, said binary operator comprising:

carry propagate signal and carry generate signal generating means which receives the first and second pieces of n-bit binary data and generates a carry propagate signal and a carry generate signal of various bits of the n-bit binary data;

cumulative carry propagate signal generating means, operatively connected to said carry propagate signal and carry generate signal generating means, for receiving in the block adders the carry propagate signals of the various bits and for generating calculating a cumulative carry propagate signal for the various bits based on the carry propagate signals;

cumulative carry generate signal generating means, operatively connected to said carry propagate signal and carry generate signal generating means, for receiving in the block adders the carry propagate signals and the carry generate signals of the various bits and for generating calculating a cumulative carry generate signal for the various bits based on the carry propagate signals and the carry generate signals; and real sum signal generating means, operatively connected to said carry propagate signal and carry generate signal generating means, said cumulative carry propagate signal generating means and said cumulative carry generate signal generating means, for receiving the carry propagate signal for at least one of the various bits, the cumulative carry propagate signal from said cumulative carry propagate signal generating means, the cumulative carry generate signal from said cumulative carry generate signal generating means and the real carry signal, and for directly calculating the real sum signal within the block adders based on the carry propagate signal, the cumulative carry propagate signal, the cumulative carry generated signal and the real carry signal, and wherein said real sum signal generating means comprises an AND circuit, a NOR circuit and an ENOR circuit, a first input of said AND circuit is supplied with a cumulative carry propagate signal, a second input of said AND circuit is supplied with a real carry signal and an output of said AND circuit is connected to a first input of said NOR circuit, a second input of said NOR circuit is supplied with a cumulative carry generate signal, a first input of said ENOR circuit is supplied with a carry propagate signal and an output of said NOR circuit is connected to a second input of said ENOR circuit, and said ENOR circuit outputs a real sum signal.

12. A binary operator for receiving first and second pieces of n-bit binary data and a real carry signal, for dividing the first and second pieces of the n-bit binary data into blocks, for processing the blocks in parallel using block adders, and for outputting a real sum signal by calculating an arithmetic sum of the first and second n-bit binary data, said binary operator comprising:

carry propagate signal and carry generate signal generating means which receives the first and second pieces of n-bit binary data and generates a carry propagate signal and a carry generate signal of various bits of the n-bit binary data;

cumulative carry propagate signal generating means, operatively connected to said carry propagate signal and carry generate signal generating means, for receiving in the block adders the carry propagate signals of the various bits and for generating calculating a cumulative carry propagate signal for the various bits based on the carry propagate signals;

cumulative carry generate signal generating means, operatively connected to said carry propagate signal and carry generate signal generating means, for receiving in the block adders the carry propagate signals and the carry generate signals of the various bits and for generating calculating a cumulative carry generate signal for the various bits based on the carry propagate signals and the carry generate signals; and real sum signal generating means, operatively connected to said carry propagate signal and carry generate signal generating means, said cumulative carry propagate signal generating means and said cumulative carry generate signal generating means, for receiving the carry propagate signal for at least one of the various bits, the cumulative carry propagate signal from said cumulative carry propagate signal generating means, the cumulative carry generate signal from said cumulative carry generate signal generating means and the real carry signal, and for directly calculating the real sum signal within the block adders based on the carry propagate signal, the cumulative carry propagate signal, the cumulative carry generated signal and the real carry signal, and wherein said real sum signal generating means comprises a NAND circuit, an EOR circuit and an ENOR circuit, a first input of said NAND circuit is supplied with a real carry signal and a second input of said NAND circuit is supplied with a cumulative carry propagate signal, a first input of said EOR circuit is supplied with a cumulative carry generate signal and a second input of said EOR circuit is supplied with a carry propagate signal, an output of said NAND circuit is connected to a first input of said ENOR circuit and an output of said EOR circuit is connected to a second input of said ENOR circuit, and said ENOR circuit outputs a real sum signal.

13. A binary operator for receiving first and second pieces of n-bit binary data and a real carry signal, for dividing the first and second pieces of the n-bit binary data into blocks, for processing the blocks in parallel using block adders, and for outputting a real sum signal by calculating an arithmetic sum of the first and second n-bit binary data, said binary operator comprising:

carry propagate signal and carry generate signal generating means which receives the first and second pieces of n-bit binary data and generates a carry propagate signal and a carry generate signal of various bits of the n-bit binary data;

cumulative carry propagate signal generating means, operatively connected to said carry propagate signal and carry generate signal generating means, for receiving in the block adders the carry propagate signals of the various bits and for generating calculating a cumulative carry propagate signal for the various bits based on the carry propagate signals;

cumulative carry generate signal generating means, operatively connected to said carry propagate signal and carry generate signal generating means, for receiving in the block adders the carry propagate signals and the carry generate signals of the various bits and for generating calculating a cumulative carry generate signal for the various bits based on the carry propagate signals and the carry generate signals; and real sum signal generating means, operatively connected to said carry propagate signal and carry generate signal generating means, said cumulative carry propagate signal generating means and said cumulative carry generate signal generating means, for receiving the carry propagate signal for at least one of the various bits, the cumulative carry propagate signal from said cumulative carry propagate signal generating means, the cumulative carry generate signal from said cumulative carry generate signal generating means and the real carry signal, and for directly calculating the real sum signal within the block adders based on the carry propagate signal, the cumulative carry propagate signal, the cumulative carry generated signal and the real carry signal, and wherein said real sum signal generating means comprises a NAND circuit, an EOR circuit, a first, a second and a third inverter circuits and a first and a second transfer gate circuits, a first input of said NAND circuit is supplied with a real carry signal and a second input of said NAND circuit is supplied with a cumulative carry propagate signal, a first input of said EOR circuit is supplied with a cumulative carry generate signal and a second input of said EOR circuit is supplied with a carry propagate signal, an output of said NAND circuit is commonly connected to an input of said first inverter circuit, a second control gate of said first transfer gate circuit and a first control gate of said second transfer gate circuit, an output of said EOR circuit is commonly connected to an input of said second inverter circuit and an input of said first transfer gate circuit, an output of said first inverter circuit is commonly connected to a first control gate of said first transfer gate circuit and a second control gate of said second transfer gate circuit, an output of said second inverter circuit is connected to an input of said second transfer gate circuit, and said third inverter circuit outputs a real sum signal.

14. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for generating the real difference signal by directly calculating a nonselected real difference number based on the borrow propagate signal, the cumulative borrow generate and the real borrow signal, and generating the real difference signal corresponding to the directly calculated and nonselected real difference number.

15. A binary operator according to claim 14, wherein said real difference signal generating means generates the real difference signal of an the i-th digit of the various bits by calculating the borrow propagate signal of the i-th digit, the cumulative borrow propagate signal of the (i−1)-th digit, the cumulative borrow generate signal of the (i−1)-th digit and a real borrow signal advanced from a lower digit to the block subtracters.

16. A binary operator according to claim 14, wherein said block subtracters are borrow select subtracter circuits, each of said borrow select subtracter circuits includes said cumulative borrow propagate signal generating means, said cumulative borrow generate signal generating means and said real difference signal generating means.

17. A binary operator according to claim 16, wherein said cumulative borrow propagate signal generating means comprises a NAND circuit having four inputs and an inverter circuit, the four inputs of said NAND circuit are supplied with borrow propagate signals, an output of said NAND circuit is connected to an input of said inverter circuit, and said inverter circuit outputs a cumulative borrow propagate signal.

18. A binary operator according to claim 16, wherein said cumulative borrow generate signal generating means comprises an inverter circuit, a two-input NAND circuit, a three-input NAND circuit and a first and a second four-input NAND circuit, an input of said inverter circuit is supplied with a borrow generate signal, a first input of said two-input NAND circuit is supplied with a borrow generate signal and a second input of said two-input NAND circuit is supplied with a borrow propagate signal, a first input of said three-input NAND circuit is supplied with a borrow generate signal and a second and a third input of said three-input NAND circuit are supplied with borrow propagate signals, a first input of said first four-input NAND circuit is supplied with a borrow generate signal and a second input, a third input and a fourth input of said first four-input NAND circuit are supplied with borrow propagate signals, outputs of said inverter circuit, said two-input NAND circuit, said three-input NAND circuit and said first four-input NAND circuit are connected to four inputs of said second four-input NAND circuit, and said second four-input NAND circuit outputs a cumulative borrow generate signal.

19. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for directly calculating the real difference signal within the block subtracters based on the borrow propagate signal, the cumulative borrow propagate signal, the cumulative borrow generate signal and the real borrow signal, wherein said block subtracters are borrow select subtracter circuits, each of said borrow select subtracter circuits includes said cumulative borrow propagate signal generating means, said cumulative borrow generate signal generating means and said real difference signal generating means, and wherein said real difference signal generating means comprises a NOR circuit, an EOR circuit and an ENOR circuit, a first input of said NOR circuit is supplied with an inverted real borrow signal and a second input of said NOR circuit is supplied with an inverted cumulative borrow propagate signal, a first input of said EOR circuit is supplied with a borrow propagate signal and a second input of said first EOR circuit is supplied with a cumulative borrow generate signal, an output of said first EOR circuit is connected to a first input of said ENOR circuit and an output of said NOR circuit is connected to a second input of said ENOR circuit, and said ENOR circuit outputs a real difference signal.

20. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving in the block subtracters the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving in the block subtracters the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for directly calculating the real difference signal within the block subtracters based on the borrow propagate signal, the cumulative borrow propagate signal, the cumulative borrow generate signal and the real borrow signal, wherein said real difference signal generating means comprises a first and a second EOR circuits, a first and a second transfer gate circuits and an inverter circuit, a first input of said first EOR circuit is supplied with a cumulative borrow propagate signal, a first input of said second EOR circuit is supplied with a cumulative borrow generate signal and a second input of said second EOR circuit is supplied with a borrow propagate signal, an output of said first EOR circuit is connected to an input of said first transfer gate circuit and an output of said second EOR circuit is connected to a second input of said first EOR circuit and an input of said second transfer gate circuit, a first control gate of said first transfer gate circuit and a second control gate of said second transfer gate circuit are connected and supplied with a real borrow signal, a second control gate of said first transfer gate circuit and a first control gate of said second transfer gate circuit are connected and supplied with an inverted real borrow signal, outputs of said first and second transfer gate circuits are commonly connected to an input of said inverter circuit, and said inverter circuit outputs a real difference signal.

21. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving in the block subtracters the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving in the block subtracters the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for directly calculating the real difference signal within the block subtracters based on the borrow propagate signal, the cumulative borrow propagate signal, the cumulative borrow generate signal and the real borrow signal, wherein said real difference signal generating means comprises a NOR circuit, an inverter circuit, a first and a second transfer gate circuits and an EOR circuit, a first input of said NOR circuit is supplied with a cumulative borrow propagate signal, a second input of said NOR circuit and an input of said inverter circuit are connected and supplied with a cumulative borrow generate signal, an output of said NOR circuit is connected to an input of said first transfer gate circuit and an output of said inverter circuit is connected to an input of said second transfer gate circuit, a first control gate of said first transfer gate circuit and a second control gate of said second transfer gate circuit are connected and supplied with a real borrow signal, a second control gate of said first transfer gate circuit and a first control gate of said second transfer gate circuit are connected and supplied with an inverted real borrow signal, outputs of said first and second transfer gate circuits are commonly connected to a first input of said EOR circuit and a second input of said EOR circuit is supplied with a borrow propagate signal, and said EOR circuit outputs a real difference signal.

22. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving in the block subtracters the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving in the block subtracters the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for directly calculating the real difference signal within the block subtracters based on the borrow propagate signal, the cumulative borrow propagate signal, the cumulative borrow generate signal and the real borrow signal, wherein said real difference signal generating means comprises and AND circuit, a NOR circuit and an EOR circuit, a first input of said AND circuit is supplied with a cumulative borrow propagate signal, a second input of said AND circuit is supplied with a real borrow signal and an output of said AND circuit is connected to a first input of said NOR circuit, a second input of said NOR circuit is supplied with a cumulative borrow generate signal, a first input of said EOR circuit is supplied with a borrow propagate signal and an output of said NOR circuit is connected to a second input of said EOR circuit, and said EOR circuit outputs a real difference signal.

23. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving in the block subtracters the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving in the block subtracters the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for directly calculating the real difference signal within the block subtracters based on the borrow propagate signal, the cumulative borrow propagate signal, the cumulative borrow generate signal and the real borrow signal, wherein said real difference signal generating means comprises a NAND circuit, a first and second EOR circuits, a first input of said NAND circuit is supplied with a real carry signal and a second input of said NAND circuit is supplied with a cumulative borrow propagate signal, a first input of said first EOR circuit is supplied with a cumulative borrow generate signal and a second input of said first EOR circuit is connected to a second input of said second EOR circuit, and said second EOR circuit outputs a real difference signal.

24. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving in the block subtracters the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving in the block subtracters the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for directly calculating the real difference signal within the block subtracters based on the borrow propagate signal, the cumulative borrow propagate signal, the cumulative borrow generate signal and the real borrow signal, wherein said real difference signal generating means comprises a NAND circuit, an ENOR circuit, a first, a second and a third inverter circuits and a first and a second transfer gate circuits, a first input of said NAND circuit is supplied with a real borrow signal and a second input of said NAND circuit is supplied with a cumulative borrow propagate signal, a first input of said ENOR circuit is supplied with a cumulative borrow generate signal and a second input of said ENOR circuit is supplied with a borrow propagate signal, an output of said NAND circuit is commonly connected to an input of said first inverter circuit, a second control gate of said first transfer gate circuit and a first control gate of said second transfer gate circuit, an output of said ENOR circuit is commonly connected to an input of said second inverter circuit and an input of said first transfer gate circuit, an output of said first inverter circuit is commonly connected to a first control gate of said first transfer gate circuit and a second control gate of said second transfer gate circuit, an output of said second inverter circuit is connected to an input of said second transfer gate circuit, outputs of said first and second transfer gate circuits are commonly connected to an input of said third inverter circuit, and said third inverter circuit outputs a real difference signal.

25. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving in the block subtracters the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving in the block subtracters the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for directly calculating the real difference signal within the block subtracters based on the borrow propagate signal, the cumulative borrow propagate signal, the cumulative borrow generate signal and the real borrow signal, wherein said cumulative borrow propagate signal generating means comprises a chain circuit having a transfer gate circuit connected to an inverter circuit.

26. A binary operator for receiving first and second pieces of n-bit binary data and a real borrow signal, for dividing the first and second pieces of the n-bit binary data into blocks, for processing the blocks in parallel using block adders, and for outputting a real difference signal by calculating an arithmetic difference of the first and second n-bit binary data, said binary operator comprises:

borrow propagate signal and borrow generate signal generating means which receives the first and second pieces of n-bit binary data and generates a borrow propagate signal and a borrow generate signal of various bits of the n-bit binary data;

cumulative borrow propagate signal generating means, operatively connected to said borrow propagate signal and borrow generate signal generating means, for receiving in the block subtracters the borrow propagate signals of the various bits and for generating calculating a cumulative borrow propagate signal for the various bits based on the borrow propagate signals;

cumulative borrow generate signal generating means, operatively connected to said borrow propagate signal and borrow generate signal generating means, for receiving in the block subtracters the borrow propagate signals and the borrow generate signals of the various bits and for generating calculating a cumulative borrow generate signal for the various bits based on the borrow propagate signals and the borrow generate signals;

real difference signal generating means, operatively connected to said borrow propagate signal and borrow generate signal generating means, said cumulative borrow propagate signal generating means and said cumulative borrow generate signal generating means, for receiving the borrow propagate signal for at least one of the various bits, the cumulative borrow propagate signal from said cumulative borrow propagate signal generating means, the cumulative borrow generate signal from said cumulative borrow generate signal generating means and the real borrow signal, and for directly calculating the real difference signal within the block subtracters based on the borrow propagate signal, the cumulative borrow propagate signal, the cumulative borrow generate signal and the real borrow signal, wherein said cumulative borrow generate signal generating means comprises a chain circuit having a transfer gate circuit connected to an inverter circuit.

27. A binary operator including a block look ahead carry generator circuit for receiving first and second pieces of n-bit binary data and a carry input signal, said binary operator comprising:

carry propagate signal and carry generate signal generating means for receiving the first and second pieces of n-bit binary data and for generating a carry propagate signal and a carry generate signal of various bits;

block addition means, operatively connected to said carry propagate signal and carry generate signal generating means, for receiving a real output signal, the carry propagate signal and the carry generate signal, and for dividing the first and second pieces of n-bit binary data into blocks of predetermined number of bits, processing data of each of the blocks in parallel based on the carry propagate signal and the carry generate signal, and generating a real sum signal by calculating the arithmetic sum of the first and second pieces of n-bit binary data;

block carry propagate signal and block carry generate signal generating means, operatively connected to said carry propagate signal and carry generate signal generating means, for receiving the carry propagate signal and the carry generate signal from said carry propagate signal and carry generate signal generating means, and for generating a block carry propagate signal and a block carry generate signal based on the carry propagate signal and the carry generate signal corresponding to the data of each of the blocks;

cumulative block carry propagate signal and cumulative block carry generate signal generating means, operatively connected to said block carry propagate signal and block carry generate signal generating means, for receiving the block carry propagate signal and the block carry generate signal from said block carry propagate signal and block carry generate signal generating means, and for generating calculating a cumulative block carry propagate signal and a cumulative block carry generate signal based on the block carry propagate signal and the block carry generate signal; and real carry signal generating means, operatively connected to said cumulative block carry propagate signal and cumulative block carry generate signal generating means and said block addition means, for receiving the carry input signal, the cumulative block carry propagate signal and the cumulative block carry generate signal and for generating the real carry output signal by directly calculating a nonselected real number based on the carry input signal, the cumulative block carry propagate signal and the cumulative block carry generate signal, and generating the real carry output signal corresponding to the directly calculated nonselected real carry number.

28. A binary operator according to claim 27, wherein said block addition means generates presumed sum signals in the case of the real carry output signal form said real carry signal generating means being one of "0" and "1", and selects one of the presumed sum signals in accordance with the real carry output signal from said real carry signal generating means.

29. A binary operator according to claim 27, wherein each of said block look ahead carry generator circuits includes said cumulative block carry propagate signal and cumulative block carry generate signal generating means and said real carry signal generating means.

30. A binary operator according to claim 27, wherein said binary operator comprises a plurality of block look ahead carry generator circuits made of a chain circuit having a transfer gate circuit connected to an inverter circuit.

31. A binary operator according to claim 27, wherein said said binary operator comprises a plurality of block look ahead carry generator circuit constructed by one or more stages.

32. A binary operator including a block look ahead carry generator circuit for receiving first and second pieces of n-bit binary data and a carry input signal, said binary operator comprising:

carry propagate signal and carry generate signal generating means for receiving the first and second pieces of n-bit binary data and for generating a carry propagate signal and a carry generate signal of various bits;

block addition means, operatively connected to said carry propagate signal and carry generate signal generating means, for receiving a real output signal, the carry propagate signal and the carry generate signal, and for dividing the first and second pieces of n-bit binary data into blocks of predetermined number of bits, processing data of each of the blocks in parallel based on the carry propagate signal and the carry generate signal, and generating a real sum signal by calculating the arithmetic sum of the first and second pieces of n-bit binary data;

block carry propagate signal and block carry generate signal generating means, operatively connected to said carry propagate signal and carry generate signal generating means, for receiving the carry propagate signal and the carry generate signal from said carry propagate signal and carry generate signal generating means, and for generating a block carry propagate signal and a block carry generate signal based on the carry propagate signal and the carry generate signal corresponding to the data of each of the blocks;

cumulative block carry propagate signal and cumulative block carry generate signal generating means, operatively connected to said block carry propagate signal and block carry generate signal generating means, for receiving the block carry propagate signal and the block carry generate signal from said block carry propagate signal and block carry generate signal generating means, and for generating calculating a cumulative block carry propagate signal and a cumulative block carry generate signal based on the block carry propagate signal and the block carry generate signal; and real carry signal generating means, operatively connected to said cumulative block carry propagate signal and cumulative block carry generate signal generating means and said block addition means, for receiving the carry input signal, the cumulative block carry propagate signal and the cumulative block carry generate signal and for directly calculating the real carry output signal in the block look ahead carry generator circuit based on the carry input signal, the cumulative block carry propagate signal and the cumulative block carry generate signal, wherein each of said block look ahead carry generator circuits includes said cumulative block carry propagate signal and cumulative block carry generate signal generating means and said real carry signal generating means, and wherein said real carry signal generating means comprises a NOR circuit, a first and a second inverter circuit and a first and a second transfer gate circuit, an input of said first inverter circuit and a first input of said NOR circuit are connected and supplied with a cumulative block carry generate signal, a second input of said NOR circuit is supplied with a cumulative block carry propagate signal, an output of said first inverter circuit is connected to an input of said first transfer gate circuit and an output of said NOR circuit is connected to an input of said second transfer gate circuit, a first control gate of said first transfer gate circuit and a second control gate of said second transfer gate circuit are connected and supplied with an inverted carry input signal, a second control gate of said first transfer gate circuit and a first control gate of said second transfer gate circuit are connected and supplied with a real carry input signal, outputs of said first and second transfer gate circuits are connected and supplied with a real carry input signal, outputs of said first and second transfer gate circuits are commonly connected to an input of said second inverter circuit, and said second inverter circuit outputs a real carry output signal.

33. A binary operator including a block look ahead carry generator circuit for receiving first and second pieces of n-bit binary data and a carry input signal, said binary operator comprising:

carry propagate signal and carry generate signal generating means for receiving the first and second pieces of n-bit binary data and for generating a carry propagate signal and a carry generate signal of various bits;

block addition means, operatively connected to said carry propagate signal and carry generate signal generating means, for receiving a real output signal, the carry propagate signal and the carry generate signal, and for dividing the first and second pieces of n-bit binary data into blocks of predetermined number of bits, processing data of each of the blocks in parallel based on the carry propagate signal and the carry generate signal, and generating a real sum signal by calculating the arithmetic sum of the first and second pieces of n-bit binary data;

block carry propagate signal and block carry generate signal generating means, operatively connected to said carry propagate signal and carry generate signal generating means, for receiving the carry propagate signal and the carry generate signal from said carry propagate signal and carry generate signal generating means, and for generating a block carry propagate signal and a block carry generate signal based on the carry propagate signal and the carry generate signal corresponding to the data of each of the blocks;

cumulative block carry propagate signal and cumulative block carry generate signal generating means, operatively connected to said block carry propagate signal and block carry generate signal generating means, for receiving the block carry propagate signal and the block carry generate signal from said block carry propagate signal and block carry generate signal generating means, and for generating calculating a cumulative block carry propagate signal and a cumulative block carry generate signal based on the block carry propagate signal and the block carry generate signal; and real carry signal generating means, operatively connected to said cumulative block carry propagate signal and cumulative block carry generate signal generating means and said block addition means, for receiving the carry input signal, the cumulative block carry propagate signal and the cumulative block carry generate signal and for directly calculating the real carry output signal in the block look ahead carry generator circuit based on the carry input signal, the cumulative block carry propagate signal and the cumulative block carry generate signal, wherein each of said block look ahead carry generator circuits includes said cumulative block carry propagate signal and cumulative block carry generate signal generating means and said real carry signal generating means, and wherein said real carry signal generating means an AND circuit, a NOR circuit and an inverter circuit, a first input of said AND circuit is supplied with a carry input signal, a second input of said AND circuit is supplied with a cumulative block carry propagate signal an output of said AND circuit is connected to a first input of said NOR circuit, a second input of said NOR circuit is supplied with a cumulative block carry generate signal, an output of said NOR circuit is connected to an input of said inverter circuit, and said inverter circuit outputs a real carry output signal.

34. A binary operator including a block look ahead carry generator circuit for receiving first and second pieces of n-bit binary data and a carry input signal, said binary operator comprising:

carry propagate signal and carry generate signal generating means for receiving the first and second pieces of n-bit binary data and for generating a carry propagate signal and a carry generate signal of various bits;

block addition means, operatively connected to said carry propagate signal and carry generate signal generating means, for receiving a real output signal, the carry propagate signal and the carry generate signal, and for dividing the first and second pieces of n-bit binary data into blocks of predetermined number of bits, processing data of each of the blocks in parallel based on the carry propagate signal and the carry generate signal, and generating a real sum signal by calculating the arithmetic sum of the first and second pieces of n-bit binary data;

block carry propagate signal and block carry generate signal generating means, operatively connected to said carry propagate signal and carry generate signal generating means, for receiving the carry propagate signal and the carry generate signal from said carry propagate signal and carry generate signal generating means, and for generating a block carry propagate signal and a block carry generate signal based on the carry propagate signal and the carry generate signal corresponding to the data of each of the blocks;

cumulative block carry propagate signal and cumulative block carry generate signal generating means, operatively connected to said block carry propagate signal and block carry generate signal generating means, for receiving the block carry propagate signal and the block carry generate signal from said block carry propagate signal and block carry generate signal generating means, and for generating calculating a cumulative block carry propagate signal and a cumulative block carry generate signal based on the block carry propagate signal and the block carry generate signal; and real carry signal generating means, operatively connected to said cumulative block carry propagate signal and cumulative block carry generate signal generating means and said block addition means, for receiving the carry input signal, the cumulative block carry propagate signal and the cumulative block carry generate signal and for directly calculating the real carry output signal in the block look ahead carry generator circuit based on the carry input signal, the cumulative block carry propagate signal and the cumulative block carry generate signal, wherein each of said block look ahead carry generator circuits includes said cumulative block carry propagate signal and cumulative block carry generate signal generating means and said real carry signal generating means, and wherein said real carry signal generating means comprises a NOR circuit, a first and a second inverter circuit and a first and a second transfer gate circuit, a first input of said NOR circuit is supplied with a cumulative block carry propagate signal, a second input of said NOR circuit and an input of said first inverter circuit are connected and supplied with a cumulative block carry generate signal, an output of said NOR circuit is connected to an input of said first transfer gate circuit and an output of said first inverter circuit is connected to an input of said second transfer gate circuit, a first control gate of said first transfer gate circuit and a second control gate of said second transfer gate circuit are connected and supplied with a carry input signal, a second control gate of said first transfer gate circuit and a first control gate of said second transfer gate circuit are connected and supplied with an inverted carry input signal, outputs of said first and second transfer fate circuits are commonly connected to an input of said second inverter circuit, and said second inverter circuit outputs a real carry signal.

35. A binary operator including a block look ahead carry generator circuit for receiving first and second pieces of n-bit binary data and a carry input signal, said binary operator comprising:

carry propagate signal and carry generate signal generating means for receiving the first and second pieces of n-bit binary data and for generating a carry propagate signal and a carry generate signal of various bits;

block addition means, operatively connected to said carry propagate signal and carry generate signal generating means, for receiving a real output signal, the carry propagate signal and the carry generate signal, and for dividing the first and second pieces of n-bit binary data into blocks of predetermined number of bits, processing data of each of the blocks in parallel based on the carry propagate signal and the carry generate signal, and generating a real sum signal by calculating the arithmetic sum of the first and second pieces of n-bit binary data;

block carry propagate signal and block carry generate signal generating means, operatively connected to said carry propagate signal and carry generate signal generating means, for receiving the carry propagate signal and the carry generate signal from said carry propagate signal and carry generate signal generating means, and for generating a block carry propagate signal and a block carry generate signal based on the carry propagate signal and the carry generate signal corresponding to the data of each of the blocks;

cumulative block carry propagate signal and cumulative block carry generate signal generating means, operatively connected to said block carry propagate signal and block carry generate signal generating means, for receiving the block carry propagate signal and the block carry generate signal from said block carry propagate signal and block carry generate signal generating means, and for generating calculating a cumulative block carry propagate signal and a cumulative block carry generate signal based on the block carry propagate signal and the block carry generate signal; and real carry signal generating means, operatively connected to said cumulative block carry propagate signal and cumulative block carry generate signal generating means and said block addition means, for receiving the carry input signal, the cumulative block carry propagate signal and the cumulative block carry generate signal and for directly calculating the real carry output signal in the block look ahead carry generator circuit based on the carry input signal, the cumulative block carry propagate signal and the cumulative block carry generate signal, wherein each of said block look ahead carry generator circuits includes said cumulative block carry propagate signal and cumulative block carry generate signal generating means and said real carry signal generating means, and wherein said real carry signal generating means comprises a EOR circuit, a first and a second inverter circuit and a first and a second transfer gate circuit, a first input of said EOR circuit is supplied with a cumulative block carry propagate signal and an output of said EOR circuit is connected to an input of said first transfer gate circuit, an input of said first inverter circuit is supplied with a cumulative block carry generate signal and an output of said first inverter circuit and a second input of said EOR circuit are commonly connected to an input of said second transfer gate circuit, a first control gate of said first transfer gate circuit and a second control gate of said second transfer gate circuit are connected and supplied with a carry input signal, a second control gate of said first transfer gate circuit and a first control gate of said second transfer gate circuit are connected and supplied with an inverted carry input signal, outputs of said first and second transfer gate circuits are commonly connected to an input of said second inverter circuit, and said second inverter circuit outputs a real carry output signal.

36. A binary operator including a block look ahead carry generator circuit for receiving first and second pieces of n-bit binary data and a carry input signal, said binary operator comprising:

carry propagate signal and carry generate signal generating means for receiving the first and second pieces of n-bit binary data and for generating a carry propagate signal and a carry generate signal of various bits;

block addition means, operatively connected to said carry propagate signal and carry generate signal generating means, for receiving a real output signal, the carry propagate signal and the carry generate signal, and for dividing the first and second pieces of n-bit binary data into blocks of predetermined number of bits, processing data of each of the blocks in parallel based on the carry propagate signal and the carry generate signal, and generating a real sum signal by calculating the arithmetic sum of the first and second pieces of n-bit binary data;

block carry propagate signal and block carry generate signal generating means, operatively connected to said carry propagate signal and carry generate signal generating means, for receiving the carry propagate signal and the carry generate signal from said carry propagate signal and carry generate signal generating means, and for generating a block carry propagate signal and a block carry generate signal based on the carry propagate signal and the carry generate signal corresponding to the data of each of the blocks;

cumulative block carry propagate signal and cumulative block carry generate signal generating means, operatively connected to said block carry propagate signal and block carry generate signal generating means, for receiving the block carry propagate signal and the block carry generate signal from said block carry propagate signal and block carry generate signal generating means, and for generating calculating a cumulative block carry propagate signal and a cumulative block carry generate signal based on the block carry propagate signal and the block carry generate signal; and real carry signal generating means, operatively connected to said cumulative block carry propagate signal and cumulative block carry generate signal generating means and said block addition means, for receiving the carry input signal, the cumulative block carry propagate signal and the cumulative block carry generate signal and for directly calculating the real carry output signal in the block look ahead carry generator circuit based on the carry input signal, the cumulative block carry propagate signal and the cumulative block carry generate signal, wherein each of said block look ahead carry generator circuits includes said cumulative block carry propagate signal and cumulative block carry generate signal generating means and said real carry signal generating means, and wherein said real carry signal generating means comprises a NAND circuit and an ENOR circuit, a first input of said NAND circuit is supplied with a carry input signal and a second input of said NAND circuit is supplied with a cumulative block carry propagate signal, an output of said NAND circuit is connected to a first input of said ENOR circuit and a second input of said ENOR circuit is supplied with a cumulative block carry generate signal, and said ENOR circuit outputs a real carry output signal.

37. A binary operator including a block look ahead carry generator circuit for receiving first and second pieces of n-bit binary data and a carry input signal, said binary operator comprising:

carry propagate signal and carry generate signal generating means for receiving the first and second pieces of n-bit binary data and for generating a carry propagate signal and a carry generate signal of various bits;

block addition means, operatively connected to said carry propagate signal and carry generate signal generating means, for receiving a real output signal, the carry propagate signal and the carry generate signal, and for dividing the first and second pieces of n-bit binary data into blocks of predetermined number of bits, processing data of each of the blocks in parallel based on the carry propagate signal and the carry generate signal, and generating a real sum signal by calculating the arithmetic sum of the first and second pieces of n-bit binary data;

block carry propagate signal and block carry generate signal generating means, operatively connected to said carry propagate signal and carry generate signal generating means, for receiving the carry propagate signal and the carry generate signal from said carry propagate signal and carry generate signal generating means, and for generating a block carry propagate signal and a block carry generate signal based on the carry propagate signal and the carry generate signal corresponding to the data of each of the blocks;

cumulative block carry propagate signal and cumulative block carry generate signal generating means, operatively connected to said block carry propagate signal and block carry generate signal generating means, for receiving the block carry propagate signal and the block carry generate signal from said block carry propagate signal and block carry generate signal generating means, and for generating calculating a cumulative block carry propagate signal and a cumulative block carry generate signal based on the block carry propagate signal and the block carry generate signal; and real carry signal generating means, operatively connected to said cumulative block carry propagate signal and cumulative block carry generate signal generating means and said block addition means, for receiving the carry input signal, the cumulative block carry propagate signal and the cumulative block carry generate signal and for directly calculating the real carry output signal in the block look ahead carry generator circuit based on the carry input signal, the cumulative block carry propagate signal and the cumulative block carry generate signal, wherein each of said block look ahead carry generator circuits includes said cumulative block carry propagate signal and cumulative block carry generate signal generating means and said real carry signal generating means, and wherein said real carry signal generating means comprises a NAND circuit, a first, a second and a third inverter circuit and a first and a second transfer gate circuit, a first input of said NAND circuit is supplied with a carry input signal and a second input of said NAND circuit is supplied with a cumulative block carry propagate signal, an output of said NAND circuit is connected to an input of said first inverter circuit and a second control gate of said first transfer gate circuit and a first control gate of said second transfer gate circuit, an output of said first inverter circuit is connected to a first control gate of said first transfer gate circuit and a second control gate of said second transfer gate circuit, an input of said second inverter circuit and an input of said first transfer gate circuit are connected and supplied with a cumulative block carry generate signal, an output of said second inverter circuit is connected to an input of said second transfer gate circuit, outputs of said first and second transfer gate circuit, outputs of said first and second transfer gate circuits are commonly connected to an input of said third inverter circuit, and said third inverter circuit outputs a real carry output signal.

38. A binary operator including a block look ahead carry generator circuit for receiving first and second pieces of n-bit binary data and a carry input signal, said binary operator comprising:

carry propagate signal and carry generate signal generating means for receiving the first and second pieces of n-bit binary data and for generating a carry propagate signal and a carry generate signal of various bits;

block addition means, operatively connected to said carry propagate signal and carry generate signal generating means, for receiving a real output signal, the carry propagate signal and the carry generate signal, and for dividing the first and second pieces of n-bit binary data into blocks of predetermined number of bits, processing data of each of the blocks in parallel based on the carry propagate signal and the carry generate signal, and generating a real sum signal by calculating the arithmetic sum of the first and second pieces of n-bit binary data;

block carry propagate signal and block carry generate signal generating means, operatively connected to said carry propagate signal and carry generate signal generating means, for receiving the carry propagate signal and the carry generate signal from said carry propagate signal and carry generate signal generating means, and for generating a block carry propagate signal and a block carry generate signal based on the carry propagate signal and the carry generate signal corresponding to the data of each of the blocks;

cumulative block carry propagate signal and cumulative block carry generate signal generating means, operatively connected to said block carry propagate signal and block carry generate signal generating means, for receiving the block carry propagate signal and the block carry generate signal from said block carry propagate signal and block carry generate signal generating means, and for generating calculating a cumulative block carry propagate signal and a cumulative block carry generate signal based on the block carry propagate signal and the block carry generate signal; and real carry signal generating means, operatively connected to said cumulative block carry propagate signal and cumulative block carry generate signal generating means and said block addition means, for receiving the carry input signal, the cumulative block carry propagate signal and the cumulative block carry generate signal and for directly calculating the real carry output signal in the block look ahead carry generator circuit based on the carry input signal, the cumulative block carry propagate signal and the cumulative block carry generate signal, wherein each of said block look ahead carry generator circuits includes said cumulative block carry propagate signal and cumulative block carry generate signal generating means and said real carry signal generating means, and wherein said real carry signal generating means comprises a first and a second transfer gate circuits and an inverter circuit, an input of said first transfer gate circuit is supplied with an inverted carry input signal, an input of said second transfer gate circuit is supplied with an inverted cumulative block carry generate signal, a first control gate of said first transfer gate circuit and a second control gate of said second transfer gate circuit are connected and supplied with a cumulative block carry propagate signal, a second control gate of said first transfer gate circuit and a first control gate of said second transfer gate circuit are connected and supplied with an inverted simulative block carry propagate signal, outputs of said first and second transfer gate circuits are commonly connected to an input of said inverter circuit, and said inverter circuit outputs a real carry output signal.

39. A binary operator including a block look ahead borrow generator circuit for receiving first and second pieces of n-bit binary data and a borrow input signal, said binary operator comprising:

borrow propagate signal and borrow generate signal generating means for receiving the first and second pieces on n-bit binary data and for generating a borrow propagate signal and a borrow generate signal of various bits;

block subtraction means, operatively connected to said borrow propagate signal and borrow generate signal generating means, for receiving a real borrow output signal, the borrow propagate signal and the borrow generate signal, and for dividing the first and second pieces of n-bit binary data into blocks of predetermined number of bits, processing data of each of the blocks in parallel based on the borrow propagate signal and the borrow generate signal, and generating a real difference signal by calculating the arithmetic difference of the first and second pieces of n-bit binary data;

block borrow propagate signal and block borrow generate signal generating means, operatively connected to said borrow propagate signal and borrow generate signal generating means, for receiving the borrow propagate signal and the borrow generate signal from said borrow propagate signal and borrow generate signal generating means, and for generating a block borrow propagate signal and a block borrow generate signal based on the borrow propagate signal and the borrow generate signal corresponding to the data of each of the blocks;

cumulative block borrow propagate signal and cumulative block borrow generate signal generating means, operatively connected to said block borrow propagate signal and block borrow generate signal generating means, for receiving the block borrow propagate signal and the block borrow generate signal from said block borrow propagate signal and block borrow generate signal generating means, and for generating calculating a cumulative block borrow propagate signal and a cumulative block borrow generate signal based on the block borrow propagate signal and the block borrow generate signal; and real borrow signal generating means, operatively connected to said cumulative block borrow propagate signal and cumulative block borrow generate signal generating means and said block subtraction means, for receiving the borrow input signal, the cumulative block borrow propagate signal and the cumulative block borrow generate signal and for generating the real borrow output signal by directly calculating a nonselected real number based on the borrow input signal, the cumulative block borrow propagate signal and the cumulative block borrow generate signal, and generating the real borrow output signal corresponding to the directly calculated and nonselected real borrow number.

40. A binary operator according to claim 39, wherein said block subtraction means generates presumed difference signals in the cases of the real borrow output signal output from said real borrow signal generating means being "0" and "1", and selects one of the presumed difference signals in accordance with the real borrow output signal from said real borrow signal generating means.

41. A binary operator according to claim 39, wherein said each of said block look ahead borrow generator circuits includes said cumulative block borrow propagate signal and cumulative block borrow generate signal generating means and said real borrow signal generating means.

42. A binary operator according to claim 39, wherein said binary operator comprises a plurality of block look ahead borrow generator circuits made of a chain circuit having a transfer gate circuit connected to an inverter circuit.

43. A binary operator according to claim 39, wherein said said binary operator comprises a plurality of block look ahead carry generator circuit constructed by one or more stages.

44. A binary operator including a block look ahead borrow generator circuit for receiving first and second pieces of n-bit binary data and a borrow input signal, said binary operator comprising:

borrow propagate signal and borrow generate signal generating means for receiving the first and second pieces on n-bit binary data and for generating a borrow propagate signal and a borrow generate signal of various bits;

block subtraction means, operatively connected to said borrow propagate signal and borrow generate signal generating means, for receiving a real borrow output signal, the borrow propagate signal and the borrow generate signal, and for dividing the first and second pieces of n-bit binary data into blocks of predetermined number of bits, processing data of each of the blocks in parallel based on the borrow propagate signal and the borrow generate signal, and generating a real difference signal by calculating the arithmetic difference of the first and second pieces of n-bit binary data;

block borrow propagate signal and block borrow generate signal generating means, operatively connected to said borrow propagate signal and borrow generate signal generating means, for receiving the borrow propagate signal and the borrow generate signal from said borrow propagate signal and borrow generate signal generating means, and for generating a block borrow propagate signal and a block borrow generate signal based on the borrow propagate signal and the borrow generate signal corresponding to the data of each of the blocks;

cumulative block borrow propagate signal and cumulative block borrow generate signal generating means, operatively connected to said block borrow propagate signal and block borrow generate signal generating means, for receiving the block borrow propagate signal and the block borrow generate signal from said block borrow propagate signal and block borrow generate signal generating means, and for generating calculating a cumulative block borrow propagate signal and a cumulative block borrow generate signal based on the block borrow propagate signal and the block borrow generate signal; and real borrow signal generating means, operatively connected to said cumulative block borrow propagate signal and cumulative block borrow generate signal generating means and said block subtraction means, for receiving the borrow input signal, the cumulative block borrow propagate signal and the cumulative block borrow generate signal, and for directly calculating the real borrow output signal in the block look ahead borrow generator circuited based on the borrow input signal, the cumulative block borrow propagate signal and the cumulative block borrow generate signal, a binary operator according to claim 39, wherein said each of said block look ahead borrow generator circuits includes said cumulative block borrow propagate signal and cumulative block borrow generate signal generating means and said real borrow signal generating means, and wherein said real borrow signal generating means comprises a NOR circuit, a first and a second inverter circuits and a first and a second transfer gate circuits, an input of said first inverter circuit and a first input of said NOR circuit are connected and supplied with a cumulative block borrow generate signal, a second input of said NOR circuit is supplied with a cumulative block borrow propagate signal, an output of said first inverter circuit is connected to an input of said first transfer gate circuit and an output of said NOR circuit is connected to an input of said first transfer gate circuit and an output of said NOR circuit is connected to an input of said second transfer gate circuit, a first control gate of said first transfer gate circuit and a second control gate of said second transfer gage circuit are connected and supplied with an inverted borrow input signal, a second control gate of said first transfer gate circuit and a first control gate of said second transfer gate circuit are connected and supplied with a real borrow input signal, outputs of said first and second transfer gate circuits are commonly connected to an input of said second inverter circuit, and said second inverter circuit outputs a real borrow output signal.

45. A binary operator including a block look ahead borrow generator circuit for receiving first and second pieces of n-bit binary data and a borrow input signal, said binary operator comprising:

borrow propagate signal and borrow generate signal generating means for receiving the first and second pieces on n-bit binary data and for generating a borrow propagate signal and a borrow generate signal of various bits;

block subtraction means, operatively connected to said borrow propagate signal and borrow generate signal generating means, for receiving a real borrow output signal, the borrow propagate signal and the borrow generate signal, and for dividing the first and second pieces of n-bit binary data into blocks of predetermined number of bits, processing data of each of the blocks in parallel based on the borrow propagate signal and the borrow generate signal, and generating a real difference signal by calculating the arithmetic difference of the first and second pieces of n-bit binary data;

block borrow propagate signal and block borrow generate signal generating means, operatively connected to said borrow propagate signal and borrow generate signal generating means, for receiving the borrow propagate signal and the borrow generate signal from said borrow propagate signal and borrow generate signal generating means, and for generating a block borrow propagate signal and a block borrow generate signal based on the borrow propagate signal and the borrow generate signal corresponding to the data of each of the blocks;

cumulative block borrow propagate signal and cumulative block borrow generate signal generating means, operatively connected to said block borrow propagate signal and block borrow generate signal generating means, for receiving the block borrow propagate signal and the block borrow generate signal from said block borrow propagate signal and block borrow generate signal generating means, and for generating calculating a cumulative block borrow propagate signal and a cumulative block borrow generate signal based on the block borrow propagate signal and the block borrow generate signal; and real borrow signal generating means, operatively connected to said cumulative block borrow propagate signal and cumulative block borrow generate signal generating means and said block subtraction means, for receiving the borrow input signal, the cumulative block borrow propagate signal and the cumulative block borrow generate signal, and for directly calculating the real borrow output signal in the block look ahead borrow generator circuited based on the borrow input signal, the cumulative block borrow propagate signal and the cumulative block borrow generate signal, wherein said each of said block look ahead borrow generator circuits includes said cumulative block borrow propagate signal and cumulative block borrow generate signal generating means and said real borrow signal generating means, and wherein said block look ahead borrow generator circuit comprises an AND circuit, a NOR circuit and an inverter circuit, a first input of said AND circuit is supplied with a borrow input signal, a second input of said AND circuit is supplied with a cumulative block borrow propagate signal and an output of said AND circuit is connected to a first input of said NOR circuit, a second input of said NOR circuit is supplied with a cumulative block borrow generate signal, an output of said NOR circuit is connected to an input of said inverter circuit, and said inverter circuit outputs a real borrow output signal.

46. A binary operator including a block look ahead borrow generator circuit for receiving first and second pieces of n-bit binary data and a borrow input signal, said binary operator comprising:

borrow propagate signal and borrow generate signal generating means for receiving the first and second pieces on n-bit binary data and for generating a borrow propagate signal and a borrow generate signal of various bits;

block subtraction means, operatively connected to said borrow propagate signal and borrow generate signal generating means, for receiving a real borrow output signal, the borrow propagate signal and the borrow generate signal, and for dividing the first and second pieces of n-bit binary data into blocks of predetermined number of bits, processing data of each of the blocks in parallel based on the borrow propagate signal and the borrow generate signal, and generating a real difference signal by calculating the arithmetic difference of the first and second pieces of n-bit binary data;

block borrow propagate signal and block borrow generate signal generating means, operatively connected to said borrow propagate signal and borrow generate signal generating means, for receiving the borrow propagate signal and the borrow generate signal from said borrow propagate signal and borrow generate signal generating means, and for generating a block borrow propagate signal and a block borrow generate signal based on the borrow propagate signal and the borrow generate signal corresponding to the data of each of the blocks;

cumulative block borrow propagate signal and cumulative block borrow generate signal generating means, operatively connected to said block borrow propagate signal and block borrow generate signal generating means, for receiving the block borrow propagate signal and the block borrow generate signal from said block borrow propagate signal and block borrow generate signal generating means, and for generating calculating a cumulative block borrow propagate signal and a cumulative block borrow generate signal based on the block borrow propagate signal and the block borrow generate signal; and real borrow signal generating means, operatively connected to said cumulative block borrow propagate signal and cumulative block borrow generate signal generating means and said block subtraction means, for receiving the borrow input signal, the cumulative block borrow propagate signal and the cumulative block borrow generate signal, and for directly calculating the real borrow output signal in the block look ahead borrow generator circuited based on the borrow input signal, the cumulative block borrow propagate signal and the cumulative block borrow generate signal, wherein said each of said block look ahead borrow generator circuits includes said cumulative block borrow propagate signal and cumulative block borrow generate signal generating means and said real borrow signal generating means, wherein said block look ahead borrow generator circuit comprises a NOR circuit, a first and a second inverter circuit and a first and a second transfer gate circuit, a first input of said NOR circuit is supplied with a cumulative block borrow propagate signal, a second input of said NOR circuit and an input of said first inverter circuit are connected and supplied with a cumulative block borrow generate signal, an output of said NOR circuit is connected to an input of said first transfer gate circuit and an output of said first inverter circuit is connected to an input of said second transfer gate circuit, a first control gate of said first transfer gate circuit and a second control gate of said second transfer gate circuit are connected and supplied with a borrow input signal, a second control gate of said first transfer gate circuit and a first control gate of said second transfer gate circuit are connected and supplied with an inverted borrow input signal, outputs of said first and second transfer gate circuits are commonly connected to an input of said second inverter circuit, and said second inverter circuit outputs a real borrow output signal.

47. A binary operator including a block look ahead borrow generator circuit for receiving first and second pieces of n-bit binary data and a borrow input signal, said binary operator comprising:

borrow propagate signal and borrow generate signal generating means for receiving the first and second pieces on n-bit binary data and for generating a borrow propagate signal and a borrow generate signal of various bits;

block subtraction means, operatively connected to said borrow propagate signal and borrow generate signal generating means, for receiving a real borrow output signal, the borrow propagate signal and the borrow generate signal, and for dividing the first and second pieces of n-bit binary data into blocks of predetermined number of bits, processing data of each of the blocks in parallel based on the borrow propagate signal and the borrow generate signal, and generating a real difference signal by calculating the arithmetic difference of the first and second pieces of n-bit binary data;

block borrow propagate signal and block borrow generate signal generating means, operatively connected to said borrow propagate signal and borrow generate signal generating means, for receiving the borrow propagate signal and the borrow generate signal from said borrow propagate signal and borrow generate signal generating means, and for generating a block borrow propagate signal and a block borrow generate signal based on the borrow propagate signal and the borrow generate signal corresponding to the data of each of the blocks;

cumulative block borrow propagate signal and cumulative block borrow generate signal generating means, operatively connected to said block borrow propagate signal and block borrow generate signal generating means, for receiving the block borrow propagate signal and the block borrow generate signal from said block borrow propagate signal and block borrow generate signal generating means, and for generating calculating a cumulative block borrow propagate signal and a cumulative block borrow generate signal based on the block borrow propagate signal and the block borrow generate signal; and real borrow signal generating means, operatively connected to said cumulative block borrow propagate signal and cumulative block borrow generate signal generating means and said block subtraction means, for receiving the borrow input signal, the cumulative block borrow propagate signal and the cumulative block borrow generate signal, and for directly calculating the real borrow output signal in the block look ahead borrow generator circuited based on the borrow input signal, the cumulative block borrow propagate signal and the cumulative block borrow generate signal, wherein said each of said block look ahead borrow generator circuits includes said cumulative block borrow propagate signal and cumulative block borrow generate signal generating means and said real borrow signal generating means, and wherein said block look ahead borrow generator circuit comprises a EOR circuit, a first and a second inverter circuit and a first and a second transfer gate circuit, a first input of said EOR circuit is supplied with a cumulative block borrow propagate signal and an output of said EOR circuit is connected to an input of said first transfer gate circuit, an input of said first inverter circuit is supplied with a cumulative block borrow generate signal and an output of said first inverter circuit and a second input of said EOR circuit are commonly connected to an input of said second transfer gate circuit, a first control gate of said first transfer gate circuit and a second control gate of said second transfer gate circuit are connected and supplied with a borrow input signal, a second control gate of said first transfer gate circuit and a first control gate of said second transfer gate circuit are connected and supplied with an inverted borrow input signal, outputs of said first and second transfer gate circuits are commonly connected to an input of said second inverter circuit, and said second inverter circuit outputs a real borrow output signal.

48. A binary operator including a block look ahead borrow generator circuit for receiving first and second pieces of n-bit binary data and a borrow input signal, said binary operator comprising:

borrow propagate signal and borrow generate signal generating means for receiving the first and second pieces on n-bit binary data and for generating a borrow propagate signal and a borrow generate signal of various bits;

block subtraction means, operatively connected to said borrow propagate signal and borrow generate signal generating means, for receiving a real borrow output signal, the borrow propagate signal and the borrow generate signal, and for dividing the first and second pieces of n-bit binary data into blocks of predetermined number of bits, processing data of each of the blocks in parallel based on the borrow propagate signal and the borrow generate signal, and generating a real difference signal by calculating the arithmetic difference of the first and second pieces of n-bit binary data;

block borrow propagate signal and block borrow generate signal generating means, operatively connected to said borrow propagate signal and borrow generate signal generating means, for receiving the borrow propagate signal and the borrow generate signal from said borrow propagate signal and borrow generate signal generating means, and for generating a block borrow propagate signal and a block borrow generate signal based on the borrow propagate signal and the borrow generate signal corresponding to the data of each of the blocks;

cumulative block borrow propagate signal and cumulative block borrow generate signal generating means, operatively connected to said block borrow propagate signal and block borrow generate signal generating means, for receiving the block borrow propagate signal and the block borrow generate signal from said block borrow propagate signal and block borrow generate signal generating means, and for generating calculating a cumulative block borrow propagate signal and a cumulative block borrow generate signal based on the block borrow propagate signal and the block borrow generate signal; and real borrow signal generating means, operatively connected to said cumulative block borrow propagate signal and cumulative block borrow generate signal generating means and said block subtraction means, for receiving the borrow input signal, the cumulative block borrow propagate signal and the cumulative block borrow generate signal, and for directly calculating the real borrow output signal in the block look ahead borrow generator circuited based on the borrow input signal, the cumulative block borrow propagate signal and the cumulative block borrow generate signal, wherein said each of said block look ahead borrow generator circuits includes said cumulative block borrow propagate signal and cumulative block borrow generate signal generating means and said real borrow signal generating means, and wherein said block look ahead borrow generator circuit comprises a NAND circuit and an ENOR circuit, a first input of said NAND circuit is supplied with a borrow input signal and a second input of said NAND circuit is supplied with a cumulative block borrow propagate signal, an output of said NAND circuit is connected to a first input of said ENOR circuit and a second input of said ENOR circuit is supplied with a cumulative block borrow generate signal, and said ENOR circuit outputs a real borrow output signal.

49. A binary operator including a block look ahead borrow generator circuit for receiving first and second pieces of n-bit binary data and a borrow input signal, said binary operator comprising:

borrow propagate signal and borrow generate signal generating means for receiving the first and second pieces on n-bit binary data and for generating a borrow propagate signal and a borrow generate signal of various bits;

block subtraction means, operatively connected to said borrow propagate signal and borrow generate signal generating means, for receiving a real borrow output signal, the borrow propagate signal and the borrow generate signal, and for dividing the first and second pieces of n-bit binary data into blocks of predetermined number of bits, processing data of each of the blocks in parallel based on the borrow propagate signal and the borrow generate signal, and generating a real difference signal by calculating the arithmetic difference of the first and second pieces of n-bit binary data;

block borrow propagate signal and block borrow generate signal generating means, operatively connected to said borrow propagate signal and borrow generate signal generating means, for receiving the borrow propagate signal and the borrow generate signal from said borrow propagate signal and borrow generate signal generating means, and for generating a block borrow propagate signal and a block borrow generate signal based on the borrow propagate signal and the borrow generate signal corresponding to the data of each of the blocks;

cumulative block borrow propagate signal and cumulative block borrow generate signal generating means, operatively connected to said block borrow propagate signal and block borrow generate signal generating means, for receiving the block borrow propagate signal and the block borrow generate signal from said block borrow propagate signal and block borrow generate signal generating means, and for generating calculating a cumulative block borrow propagate signal and a cumulative block borrow generate signal based on the block borrow propagate signal and the block borrow generate signal; and real borrow signal generating means, operatively connected to said cumulative block borrow propagate signal and cumulative block borrow generate signal generating means and said block subtraction means, for receiving the borrow input signal, the cumulative block borrow propagate signal and the cumulative block borrow generate signal, and for directly calculating the real borrow output signal in the block look ahead borrow generator circuited based on the borrow input signal, the cumulative block borrow propagate signal and the cumulative block borrow generate signal, wherein said each of said block look ahead borrow generator circuits includes said cumulative block borrow propagate signal and cumulative block borrow generate signal generating means and said real borrow signal generating means, and wherein said block look ahead borrow generator circuit comprises a NAND circuit, a first, a second and a third inverter circuit and a first and a second transfer gate circuits, a first input of said NAND circuit is supplied with a borrow input signal and a second input of said NAND circuit is supplied with a cumulative block borrow propagate signal, an output of said NAND circuit is connected to an input of said first inverter circuit and a second control gate of said first transfer gate circuit and a first control gate of said second transfer gate circuit, an output of said first inverter circuit is connected to a first control gate of said first transfer gate circuit and a second control gate of said second transfer gate circuit, an input of said second inverter circiut and an input of said first transfer gate circuit are connected and supplied with a cumulative block borrow generate signal, an output of said second inverter circuit is connected to an input of said second transfer gate circuit, outputs of said first and second transfer gate circuits are commonly connected to an input of said third inverter circuit, and said third inverter circuit outputs a real borrow output signal.

50. A binary operator including a block look ahead borrow generator circuit for receiving first and second pieces of n-bit binary data and a borrow input signal, said binary operator comprising:

borrow propagate signal and borrow generate signal generating means for receiving the first and second pieces on n-bit binary data and for generating a borrow propagate signal and a borrow generate signal of various bits;

block subtraction means, operatively connected to said borrow propagate signal and borrow generate signal generating means, for receiving a real borrow output signal, the borrow propagate signal and the borrow generate signal, and for dividing the first and second pieces of n-bit binary data into blocks of predetermined number of bits, processing data of each of the blocks in parallel based on the borrow propagate signal and the borrow generate signal, and generating a real difference signal by calculating the arithmetic difference of the first and second pieces of n-bit binary data;

block borrow propagate signal and block borrow generate signal generating means, operatively connected to said borrow propagate signal and borrow generate signal generating means, for receiving the borrow propagate signal and the borrow generate signal from said borrow propagate signal and borrow generate signal generating means, and for generating a block borrow propagate signal and a block borrow generate signal based on the borrow propagate signal and the borrow generate signal corresponding to the data of each of the blocks;

cumulative block borrow propagate signal and cumulative block borrow generate signal generating means, operatively connected to said block borrow propagate signal and block borrow generate signal generating means, for receiving the block borrow propagate signal and the block borrow generate signal from said block borrow propagate signal and block borrow generate signal generating means, and for generating calculating a cumulative block borrow propagate signal and a cumulative block borrow generate signal based on the block borrow propagate signal and the block borrow generate signal; and real borrow signal generating means, operatively connected to said cumulative block borrow propagate signal and cumulative block borrow generate signal generating means and said block subtraction means, for receiving the borrow input signal, the cumulative block borrow propagate signal and the cumulative block borrow generate signal, and for directly calculating the real borrow output signal in the block look ahead borrow generator circuited based on the borrow input signal, the cumulative block borrow propagate signal and the cumulative block borrow generate signal, wherein said each of said block look ahead borrow generator circuits includes said cumulative block borrow propagate signal and cumulative block borrow generate signal generating means and said real borrow signal generating means, and wherein said block look ahead borrow generator circuit comprises a first and a second transfer gate circuits and an inverter circuit, an input of said first transfer gate circuit is supplied with an inverted borrow input signal, an input of said second transfer gate circuit is supplied with an inverted cumulative block borrow generate signal, a first control gate of said first transfer gate circuit and a second control gate of said second transfer gate circuit are connected and supplied with a cumulative block borrow propagate signal, a second control gate of said first transfer gate circuit and a first control gate of said second transfer gate circuit are connected and supplied with an inverted cumulative block borrow propagate signal, outputs of said first and second transfer gate circuits are commonly connected to an input of said inverter circuit, and said inverter circuit outputs a real borrow output signal.

* * * * *

UNITED STATES PATENT AND TRADEMARK OFFICE
CERTIFICATE OF CORRECTION

PATENT NO. : 5,434,810
DATED : July 18, 1995
INVENTOR(S) : GOTO et al.

It is certified that error appears in the above-indentified patent and that said Letters Patent is hereby corrected as shown below:

Title Page [56] References Cited, line 3, "10/1971" should be --1/1971--.

Col. 8, line 12, "+" should be --$\oplus$--;
line 55, "101" should be --$101_{-1}$--;

Col. 10, line 34, "firs" should be --first--;
line 63, "+" should be --$\oplus$--;

Col. 11, line 8, "+" should be --$\oplus$--;

Col. 16, line 46, "+" should be --$\oplus$--;

line 54, "$C_{-1}$" should be --$\overline{C_{-1}}$--;

line 60, "$C_{-1}$" should be --$\overline{C_{-1}}$--;

Col. 18, line 10, "equal" should be --equation--;
line 12, "$\Delta$" should be --$\oplus$--;

Col. 21, line 53, after "a=o" insert --(where, i=0,1,2,3)--;
Col. 22, line 46, "+" (both occurrences) should be --$\oplus$--;

Col. 28, line 24, "$\overline{C'_{-1}}$" should be --$C'_{-1}$--;

Col. 31, line 24, "$CP_i$*" should be --$CG_i$*--;
line 30, "+" should be --$\oplus$--;

UNITED STATES PATENT AND TRADEMARK OFFICE
CERTIFICATE OF CORRECTION

PATENT NO. : 5,434,810
DATED : July 18, 1995
INVENTOR(S) : GOTO et al.

It is certified that error appears in the above-indentified patent and that said Letters Patent is hereby corrected as shown below:

Col. 33, line 52, "+" should be --⊕--.

Col. 35, line 9, "+" should be --⊕--.

Col. 37, line 21, "propagate" should be --generate--.

Col. 38, line 68, "and ENOR" should be --an ENOR--.

Col. 43, line 1, after "circuit," insert --outputs of said first and second transfer gate circuits are commonly connected to an input of said third inverter circuit,--.
line 7, "adders" should be --subtracters,--;
line 47, "generate" should be --propagate signal, the cumulative borrow generate signal--.

Col. 44, line 33, "adders" should be --subtracters--;
line 45, after "receiving" insert --in the block subtracters--;
line 52, after "receiving" insert --in the block subtracters--;

Col. 45, line 32, "adders" should be --subtracters--.

Col. 46, line 35, "adders" should be --subtracters--.

Col. 47, line 38, "adders" should be --subtracters--.

UNITED STATES PATENT AND TRADEMARK OFFICE
CERTIFICATE OF CORRECTION

PATENT NO. : 5,434,810
DATED : July 18, 1995
INVENTOR(S) : GOTO et al.

It is certified that error appears in the above-indentified patent and that said Letters Patent is hereby corrected as shown below:

Col. 48, line 14, "and AND" should be --an AND--;
line 31, "adders" should be --subtracters--.

Col. 49, line 21, "adders" should be --subtracters--.

Col. 50, line 28, "adders" should be --subtracters--.

Col. 51, line 11, "adders" should be --subtracters--.

Col. 52, line 1, "real output" should be --real carry output--.
line 50, "form" should be --from--.

Col. 53, line 12, "real output" should be --real carry output--.

Col. 54, line 29, "real output" should be --real carry output--.

Col. 55, line 33, "real output" should be --real carry output--.

Col. 56, line 33, "fate" should be --gate--;
line 47, "real output" should be --real carry output--.

Col. 60, line 14, "real output" should be --real carry output--.

Col. 61, line 64, "signal" should be --signal,--.

UNITED STATES PATENT AND TRADEMARK OFFICE
CERTIFICATE OF CORRECTION

PATENT NO. : 5,434,810
DATED : July 18, 1995
INVENTOR(S) : GOTO et al.

It is certified that error appears in the above-indentified patent and that said Letters Patent is hereby corrected as shown below:

Col. 62, line 25, "carry" should be --borrow--.

Col. 63, line 38, "gage" should be --gate--.

Col. 66, line 57, "circuited" should be --circuit--.

Col. 68, line 6, "circuited" should be --circuit--.

Col. 69, line 11, "circuited" should be --circuit--;
line 35, "circiut" should be --circuit--.

Signed and Sealed this

Fourteenth Day of May, 1996

Attest:

BRUCE LEHMAN

*Attesting Officer*   *Commissioner of Patents and Trademarks*